US011177726B2

(12) United States Patent
Schuler et al.

(10) Patent No.: US 11,177,726 B2
(45) Date of Patent: Nov. 16, 2021

(54) SYSTEM AND APPARATUS FOR AXIAL FIELD ROTARY ENERGY DEVICE

(71) Applicant: Infinitum Electric Inc., Austin, TX (US)

(72) Inventors: Bernhard L. Schuler, Austin, TX (US); Rich Lee, Liberty Lake, WA (US); Jorgen Rasmussen, Otis Orchards, WA (US)

(73) Assignee: Infinitum Electric, Inc., Round Rock, TX (US)

( * ) Notice: Subject to any disclaimer, the term of this patent is extended or adjusted under 35 U.S.C. 154(b) by 670 days.

(21) Appl. No.: 16/031,879

(22) Filed: Jul. 10, 2018

(65) Prior Publication Data

US 2018/0323689 A1 Nov. 8, 2018

(51) Int. Cl.
*H02K 16/02* (2006.01)
*H02K 1/18* (2006.01)
(Continued)

(52) U.S. Cl.
CPC ............. *H02K 16/02* (2013.01); *H02K 1/182* (2013.01); *H02K 1/2793* (2013.01); *H02K 3/26* (2013.01);
(Continued)

(58) Field of Classification Search
CPC ............ H02K 3/26; H02K 3/28; H02K 16/02; H02K 16/00; H02K 11/30; H02K 1/182;
(Continued)

(56) References Cited

U.S. PATENT DOCUMENTS 3,230,406 A 1/1966 Henry-Baudot
3,944,857 A 3/1976 Faulhaber
(Continued)

FOREIGN PATENT DOCUMENTS

CN 1675815 A 9/2005
CN 101861693 A 10/2010
(Continued)

OTHER PUBLICATIONS

China National Intellectual Property Administration, Chinese Office Action in related CN Patent App No. 201880006674.9, dated Mar. 10, 2020; 6 pages.
(Continued)

*Primary Examiner* — Jue Zhang
(74) *Attorney, Agent, or Firm* — Dickinson Wright, PLLC; Michael E. Noe, Jr.

(57) ABSTRACT

An axial field rotary energy device can include a housing having an axis. A stator assembly is mounted to the housing and has stator panels that are axially-stacked and discrete panels from each other. Each stator panel includes a respective printed circuit board (PCB) having respective coils that are electrically conductive and interconnected within the respective PCB. In addition, a rotor assembly including rotors is rotatably mounted within the housing on opposite axial ends of the stator assembly. The rotors can be mechanically coupled together. Each rotor can include magnets having leading and trailing edges. The trailing edge of one magnet and the leading edge of an adjacent magnet can be parallel to each other to define a consistent circumferential spacing, relative to the axis, between adjacent ones of the magnets.

18 Claims, 43 Drawing Sheets

(51) Int. Cl.
  *H02K 1/27* (2006.01)
  *H02K 3/28* (2006.01)
  *H02K 21/24* (2006.01)
  *H02K 11/30* (2016.01)
  *H02K 3/26* (2006.01)
  *H02K 5/04* (2006.01)
  *H02K 16/00* (2006.01)
  *H02K 5/173* (2006.01)

(52) U.S. Cl.
  CPC .............. *H02K 3/28* (2013.01); *H02K 5/04* (2013.01); *H02K 11/30* (2016.01); *H02K 16/00* (2013.01); *H02K 21/24* (2013.01); *H02K 5/1732* (2013.01); *H02K 2203/03* (2013.01); *H02K 2213/03* (2013.01)

(58) Field of Classification Search
  CPC ...... H02K 1/2793; H02K 5/04; H02K 5/1732; H02K 2213/03; H02K 2203/03
  See application file for complete search history.

(56) References Cited

U.S. PATENT DOCUMENTS

| | | | |
|---|---|---|---|
| 4,578,608 A | 3/1986 | Meeh et al. |
| 4,707,645 A | 11/1987 | Miyao et al. |
| 4,760,294 A | 7/1988 | Hansen |
| 4,982,130 A | 1/1991 | Cap et al. |
| 5,021,698 A | 6/1991 | Pullen et al. |
| 5,099,162 A | 3/1992 | Sawada |
| 5,176,509 A | 1/1993 | Schmider et al. |
| 5,334,899 A | 8/1994 | Skybyk |
| 5,392,176 A | 2/1995 | Anderson |
| 5,644,183 A | 1/1997 | Van Loenen et al. |
| 5,666,011 A | 9/1997 | Hong |
| 5,789,841 A | 8/1998 | Wang |
| 5,969,909 A | 10/1999 | Cheong |
| 5,982,074 A | 11/1999 | Smith et al. |
| 6,005,324 A | 12/1999 | Kim |
| 6,348,751 B1 | 2/2002 | Jermakian et al. |
| 6,369,470 B1 | 4/2002 | Kylander et al. |
| 6,411,002 B1 | 6/2002 | Smith et al. |
| 6,664,673 B2 | 12/2003 | Lopatinsky et al. |
| 6,700,252 B2 | 3/2004 | Fleshman et al. |
| 6,707,221 B2 | 3/2004 | Carl |
| 6,713,911 B2 | 3/2004 | Yamaguchi |
| 6,787,965 B1 | 9/2004 | Horng et al. |
| 6,836,039 B2 | 12/2004 | Choi et al. |
| 6,909,215 B2 | 6/2005 | Bryant |
| 6,923,619 B2 | 8/2005 | Fedoseyev et al. |
| 6,998,751 B2 | 2/2006 | Lopatinsky et al. |
| 7,036,205 B2 | 5/2006 | Fukushima et al. |
| 7,081,698 B1 | 7/2006 | Burkholder et al. |
| 7,109,625 B1 | 9/2006 | Jore et al. |
| 7,112,910 B2 | 9/2006 | Lopatinsky et al. |
| 7,282,828 B2 | 10/2007 | Takeuchi |
| 7,291,956 B2 | 11/2007 | Itoh |
| 7,375,449 B2 | 5/2008 | Butterfield |
| 7,402,934 B1 | 7/2008 | Gabrys |
| 7,573,173 B1 | 8/2009 | Frownfelter |
| 7,608,964 B2 | 10/2009 | Yamagiwa |
| 7,663,269 B2 | 2/2010 | Laughlin |
| 7,663,279 B2 | 2/2010 | Tsai et al. |
| 7,741,804 B2 | 6/2010 | Fridhendler et al. |
| 7,800,274 B2 | 9/2010 | Yamaguchi et al. |
| 7,888,834 B2 | 2/2011 | Tsai et al. |
| 8,035,267 B2 | 10/2011 | Suzuki et al. |
| 8,115,361 B2 | 2/2012 | Iki et al. |
| 8,148,870 B2 | 4/2012 | Iki et al. |
| 8,193,678 B2 | 6/2012 | Horng et al. |
| 8,193,781 B2 | 6/2012 | Lin et al. |
| 8,362,751 B2 | 1/2013 | Lin et al. |
| 8,384,261 B2 | 2/2013 | Kinpara et al. |
| 8,536,747 B1 | 9/2013 | Baggett |
| 8,558,425 B2 | 10/2013 | Stahlhut et al. |
| 8,624,463 B2 | 1/2014 | Schmidt |
| 8,736,133 B1 | 5/2014 | Smith et al. |
| 8,785,784 B1 | 7/2014 | Duford et al. |
| 8,823,241 B2 | 9/2014 | Jore et al. |
| 9,154,024 B2 | 10/2015 | Jore et al. |
| 9,287,739 B2 | 3/2016 | Ashe et al. |
| 9,407,117 B2 | 8/2016 | Rimai et al. |
| 9,431,875 B2 | 8/2016 | Keogh et al. |
| 9,509,198 B2 | 11/2016 | Jahshan |
| 9,570,945 B2 | 2/2017 | Fischer |
| 9,583,982 B2 | 2/2017 | Ashe et al. |
| 9,673,684 B2 | 6/2017 | Shaw |
| 9,673,688 B2 | 6/2017 | Shaw |
| 9,762,099 B2 | 9/2017 | Jore et al. |
| 9,800,109 B2 | 10/2017 | Shaw |
| 9,859,763 B2 | 1/2018 | Shaw |
| 10,135,310 B2 | 11/2018 | Schuler |
| 10,141,804 B2 | 11/2018 | Schuler et al. |
| 10,170,953 B2 | 1/2019 | Shaw |
| 10,186,922 B2 | 1/2019 | Schuler |
| 10,211,694 B1 | 2/2019 | Shaw |
| 10,256,690 B2 | 4/2019 | Shaw |
| 2003/0020353 A1 | 1/2003 | Lopatinsky et al. |
| 2003/0042570 A1 | 3/2003 | Hanks |
| 2003/0067234 A1 | 4/2003 | White et al. |
| 2004/0108789 A1 | 6/2004 | Marshall |
| 2004/0245878 A1 | 12/2004 | Kim et al. |
| 2005/0218746 A1 | 10/2005 | Fukasaku et al. |
| 2006/0022543 A1 | 2/2006 | Takeuchi |
| 2006/0055265 A1 | 3/2006 | Zalusky |
| 2006/0202584 A1 | 9/2006 | Jore et al. |
| 2007/0296369 A1 | 12/2007 | Yeh |
| 2008/0018187 A1 | 1/2008 | Yamaguchi et al. |
| 2008/0042515 A1 | 2/2008 | Butterfield |
| 2008/0100166 A1 | 5/2008 | Stahlhut et al. |
| 2008/0101966 A1 | 5/2008 | Lopatinsky et al. |
| 2008/0272666 A1 | 11/2008 | Halstead |
| 2008/0278010 A1 | 11/2008 | Ishikawa et al. |
| 2009/0051317 A1 | 2/2009 | Fridhendler et al. |
| 2009/0140600 A1 | 6/2009 | Tsai et al. |
| 2009/0200890 A1 | 8/2009 | Halstead |
| 2010/0090553 A1 | 4/2010 | Ritchey |
| 2010/0119385 A1 | 5/2010 | Hanaoka et al. |
| 2010/0156401 A1 | 6/2010 | Nishiguchi et al. |
| 2010/0253170 A1 | 10/2010 | Bi et al. |
| 2010/0277025 A1 | 11/2010 | Doi et al. |
| 2010/0283252 A1 | 11/2010 | Fradella |
| 2010/0314974 A1 | 12/2010 | Horng et al. |
| 2011/0057536 A1 | 3/2011 | Horng et al. |
| 2011/0140558 A1 | 6/2011 | Kinpara et al. |
| 2011/0253310 A1 | 10/2011 | Benjamin |
| 2011/0273048 A1* | 11/2011 | Jore ............ H02K 21/24 310/156.37 |
| 2011/0291511 A1 | 12/2011 | Crocker |
| 2012/0001523 A1 | 1/2012 | Lordo |
| 2012/0169154 A1 | 7/2012 | Curodeau |
| 2012/0228972 A1 | 9/2012 | Moya et al. |
| 2012/0235523 A1 | 9/2012 | Moya et al. |
| 2012/0235530 A1 | 9/2012 | Moya et al. |
| 2012/0256422 A1 | 10/2012 | Fradella |
| 2012/0256585 A1 | 10/2012 | Partovi et al. |
| 2013/0049500 A1 | 2/2013 | Shan et al. |
| 2013/0076192 A1 | 2/2013 | Tanimoto |
| 2013/0066194 A1 | 3/2013 | Seter et al. |
| 2013/0069473 A1 | 3/2013 | Miyata et al. |
| 2013/0307356 A1 | 11/2013 | Tanimoto |
| 2013/0307366 A1 | 11/2013 | Naginsky et al. |
| 2014/0042842 A1 | 2/2014 | Tokoi et al. |
| 2014/0175922 A1 | 6/2014 | Jore et al. |
| 2014/0210285 A1 | 7/2014 | Fahimi |
| 2014/0306565 A1 | 10/2014 | James |
| 2014/0319949 A1 | 10/2014 | Langreck |
| 2015/0015102 A1 | 1/2015 | Wong et al. |
| 2015/0048713 A1 | 2/2015 | Caamano et al. |
| 2015/0076929 A1 | 3/2015 | Elenga et al. |
| 2015/0084446 A1 | 3/2015 | Atar |
| 2015/0111752 A1 | 4/2015 | Guina et al. |
| 2015/0214801 A1 | 7/2015 | Libault |
| 2015/0244213 A1 | 8/2015 | Tsai et al. |

(56) References Cited

U.S. PATENT DOCUMENTS

| | | | |
|---|---|---|---|
| 2015/0262610 A1* | 9/2015 | Lin | G11B 19/2009 360/99.08 |
| 2015/0318751 A1 | 11/2015 | Smith et al. | |
| 2015/0318772 A1 | 11/2015 | Jahshan | |
| 2015/0349609 A1 | 12/2015 | Tremelling et al. | |
| 2015/0369216 A1 | 12/2015 | Kisovec | |
| 2016/0036308 A1 | 2/2016 | Bailey et al. | |
| 2016/0126794 A1 | 5/2016 | Gery et al. | |
| 2016/0163445 A1 | 6/2016 | Bertels | |
| 2016/0218577 A1 | 7/2016 | Chen et al. | |
| 2016/0233751 A1 | 8/2016 | Theuret | |
| 2016/0285323 A1 | 9/2016 | Lin et al. | |
| 2016/0301275 A1 | 10/2016 | Head et al. | |
| 2016/0322884 A1 | 11/2016 | Perriere | |
| 2016/0329796 A1 | 11/2016 | Hano et al. | |
| 2016/0336824 A1 | 11/2016 | Duan et al. | |
| 2016/0336835 A1 | 11/2016 | Bickers et al. | |
| 2016/0336836 A1 | 11/2016 | Bickers et al. | |
| 2016/0341202 A1 | 11/2016 | Chai et al. | |
| 2017/0047792 A1 | 2/2017 | Klassen et al. | |
| 2017/0047793 A1 | 2/2017 | Klassen et al. | |
| 2017/0098973 A1 | 4/2017 | Shaw | |
| 2017/0155291 A1 | 6/2017 | Deak et al. | |
| 2017/0194823 A1 | 7/2017 | Tokoi et al. | |
| 2017/0229949 A1 | 8/2017 | Na et al. | |
| 2017/0317558 A1 | 11/2017 | Steg et al. | |
| 2018/0019646 A1* | 1/2018 | Quick | H02K 3/26 |
| 2018/0219445 A1 | 8/2018 | Jore et al. | |
| 2019/0074746 A1 | 3/2019 | Schuler et al. | |
| 2019/0393749 A1 | 12/2019 | Park et al. | |

FOREIGN PATENT DOCUMENTS

| | | |
|---|---|---|
| CN | 203377758 | 1/2014 |
| CN | 103930024 | 7/2014 |
| CN | 103930024 A | 7/2014 |
| CN | 105490476 | 4/2016 |
| CN | 105490476 A | 4/2016 |
| CN | 105720717 | 6/2016 |
| CN | 105896760 | 8/2016 |
| CN | 105896760 A | 8/2016 |
| CN | 106374643 | 2/2017 |
| EP | 3034763 | 6/2016 |
| EP | 3104504 | 12/2016 |
| GB | 1317092 | 5/1973 |
| GB | 2338117 A | 12/1999 |
| GB | 2485185 | 5/2012 |
| JP | S6253146 A | 3/1987 |
| JP | H06311682 A | 11/1994 |
| JP | H0865935 A | 3/1996 |
| JP | H10248224 A | 9/1998 |
| JP | 2004088969 A | 3/2004 |
| JP | 2004088997 A | 3/2004 |
| JP | 2004096872 A1 | 3/2004 |
| JP | 2005502291 A | 1/2005 |
| JP | 2005521378 A | 7/2005 |
| JP | 2006066527 A | 3/2006 |
| JP | 2010130818 A | 6/2010 |
| JP | 2010172094 A | 8/2010 |
| JP | 2010528581 | 8/2010 |
| JP | 4996712 | 8/2012 |
| JP | 2012161135 A | 8/2012 |
| JP | 2013051880 A | 3/2013 |
| JP | 2015136201 A | 7/2015 |
| WO | 2009001917 A1 | 12/2008 |
| WO | 2014164334 A1 | 10/2014 |
| WO | 2016021852 | 2/2016 |
| WO | 2016034570 | 3/2016 |
| WO | 2016127207 | 8/2016 |
| WO | 2016169332 | 10/2016 |
| WO | 2016185216 | 11/2016 |
| WO | 2016185218 | 11/2016 |
| WO | 2017032501 | 3/2017 |
| WO | 2017088082 | 6/2017 |

OTHER PUBLICATIONS

International Searching Authority, Search Report and Written Opinion in related PCT/US2019/023828, dated Jun. 14, 2019; 10 pages.

Japanese Patent Office, Notice of Reasons for Rejection dated Jan. 29, 2020 in Japanese Patent Application No. 2019-538400, 12 pages.

Japanese Patent Office, Notice of Reasons for Rejection dated Feb. 4, 2020 in Japanese Patent Application No. 2019-538321, 16 pages.

Japanese Notice of Rejection 2019-544059, dated Feb. 10, 2020; 20 pages.

The International Searching Authority, Notification of Transmittal of the International Search Report and Written Opinion of the International Searching Authority dated Oct. 23, 2019 in International Application No. PCT/US2019/041114, 11 pages.

International Search Report and Written Opinion of the International Searching Authority for PCT Patent Application No. PCT/US18/13145 dated Mar. 15, 2018; 8 pages.

International Search Report and Written Opinion of the International Searching Authority for PCT Patent Application No. PCT/US18/13154 dated Mar. 16, 2018; 8 pages.

International Search Report and Written Opinion of the International Searching Authority for PCT Patent Application No. PCT/US18/13162 dated Mar. 23, 2018; 7 pages.

International Search Report and Written Opinion of the International Searching Authority for PCT Patent Application No. PCT/US18/13167 dated May 4, 2018; 8 pages.

Office Action for U.S. Appl. No. 15/864,544 dated Apr. 19, 2018; 19 pages.

Office Action for U.S. Appl. No. 15/864,604 dated May 31, 2018; 16 pages.

Office Action for U.S. Appl. No. 15/864,663 dated May 16, 2018; 15 pages.

Office Action for U.S. Appl. No. 15/864,709 dated Apr. 12, 2018; 23 pages.

* cited by examiner

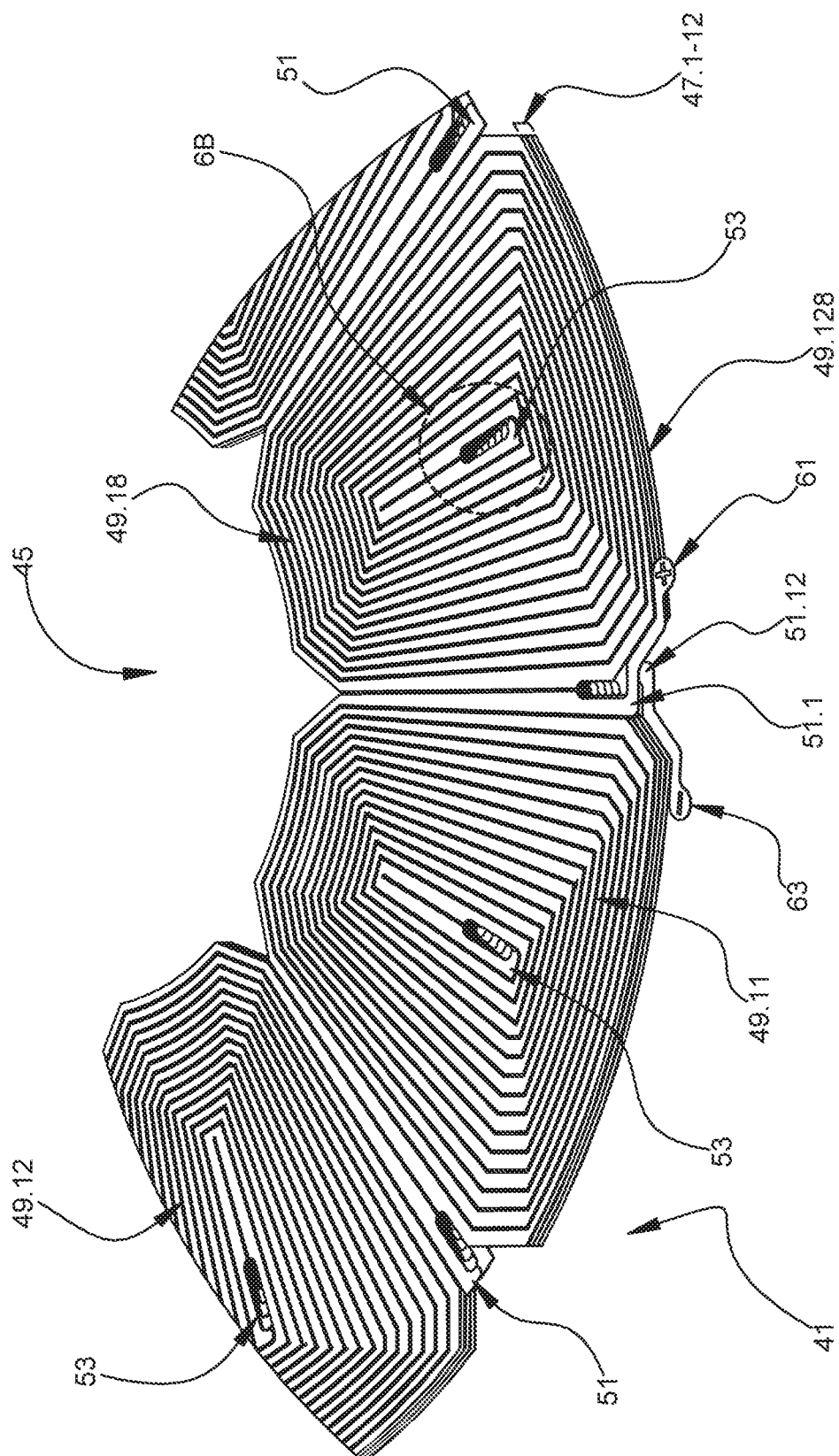

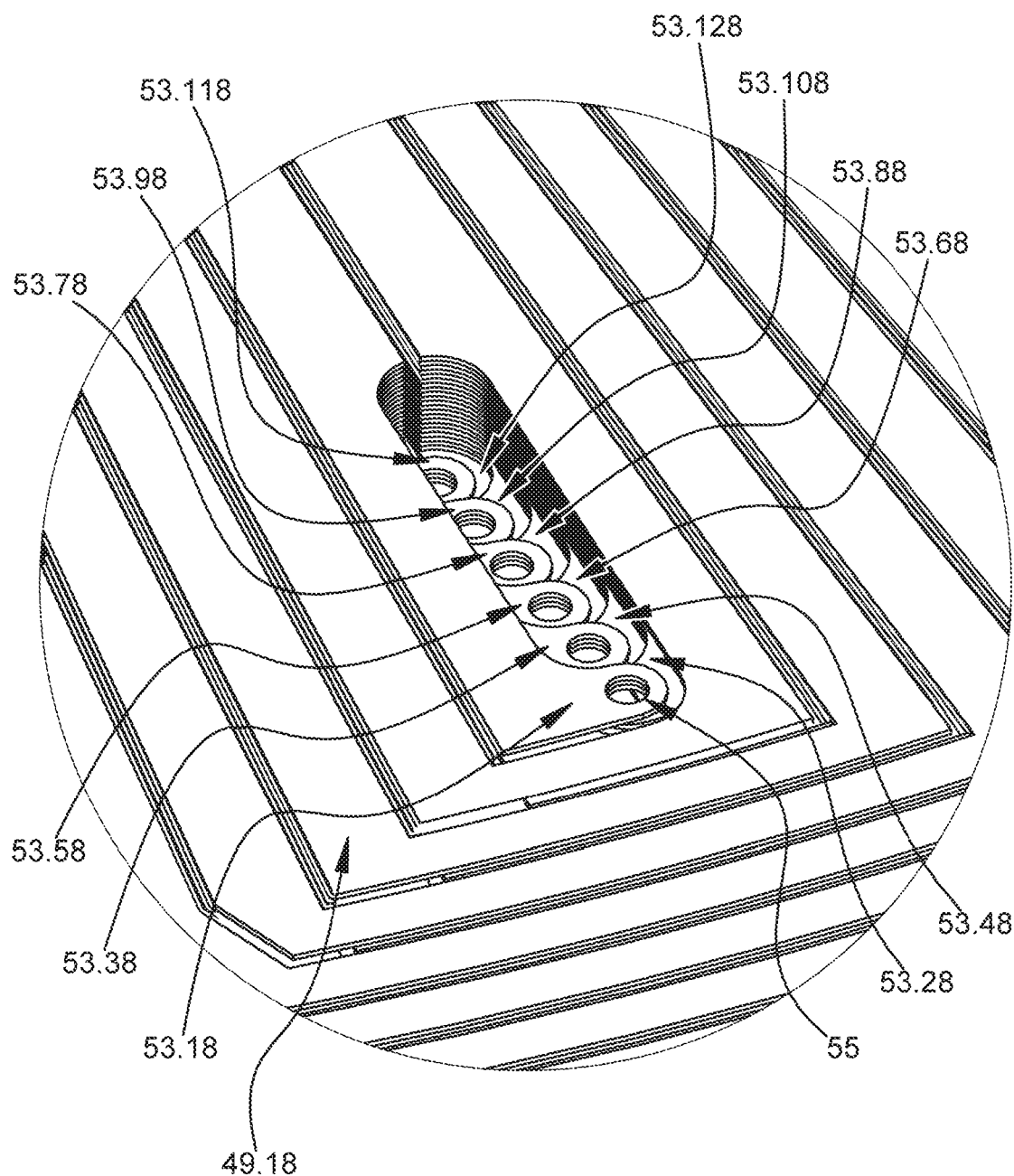

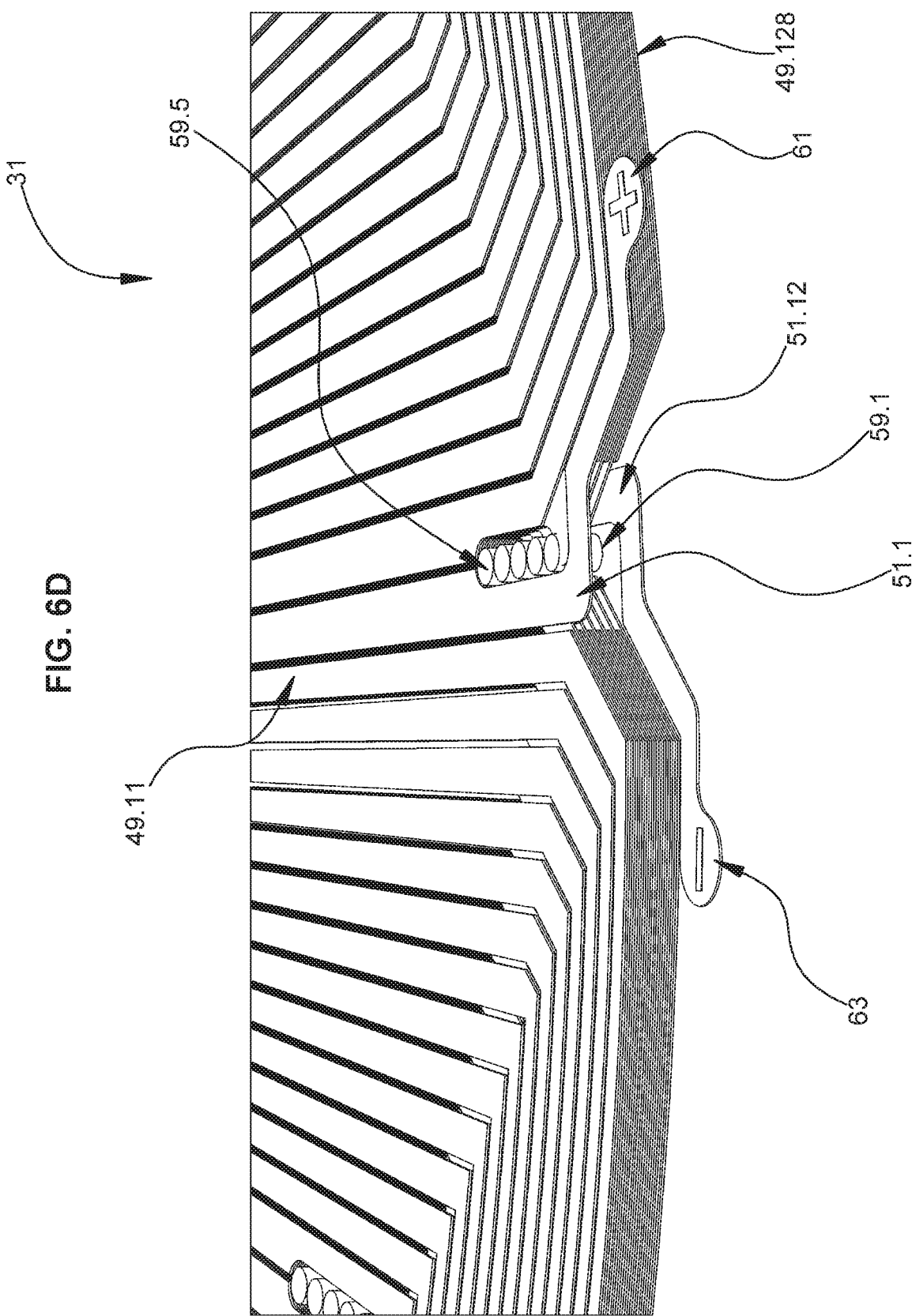

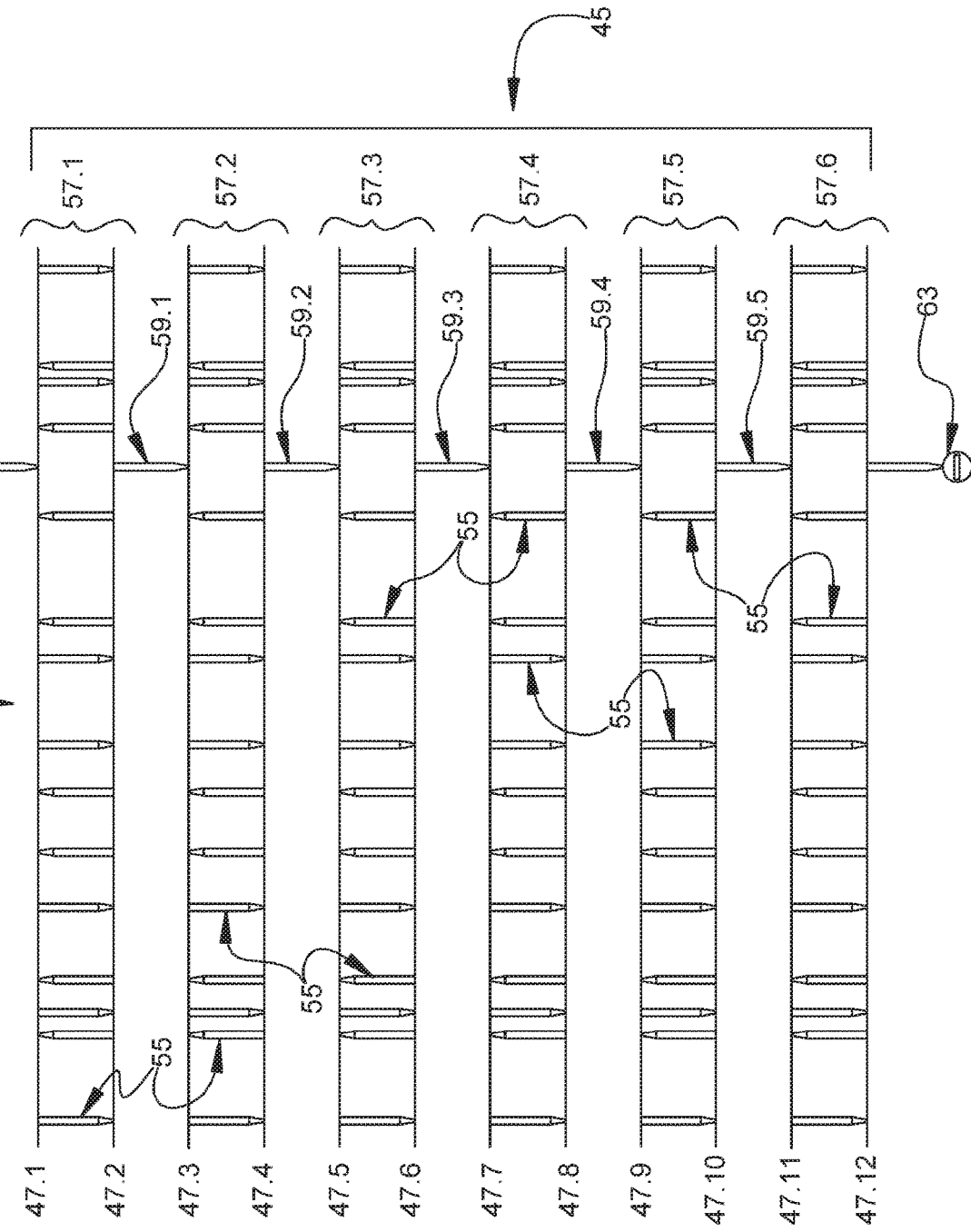

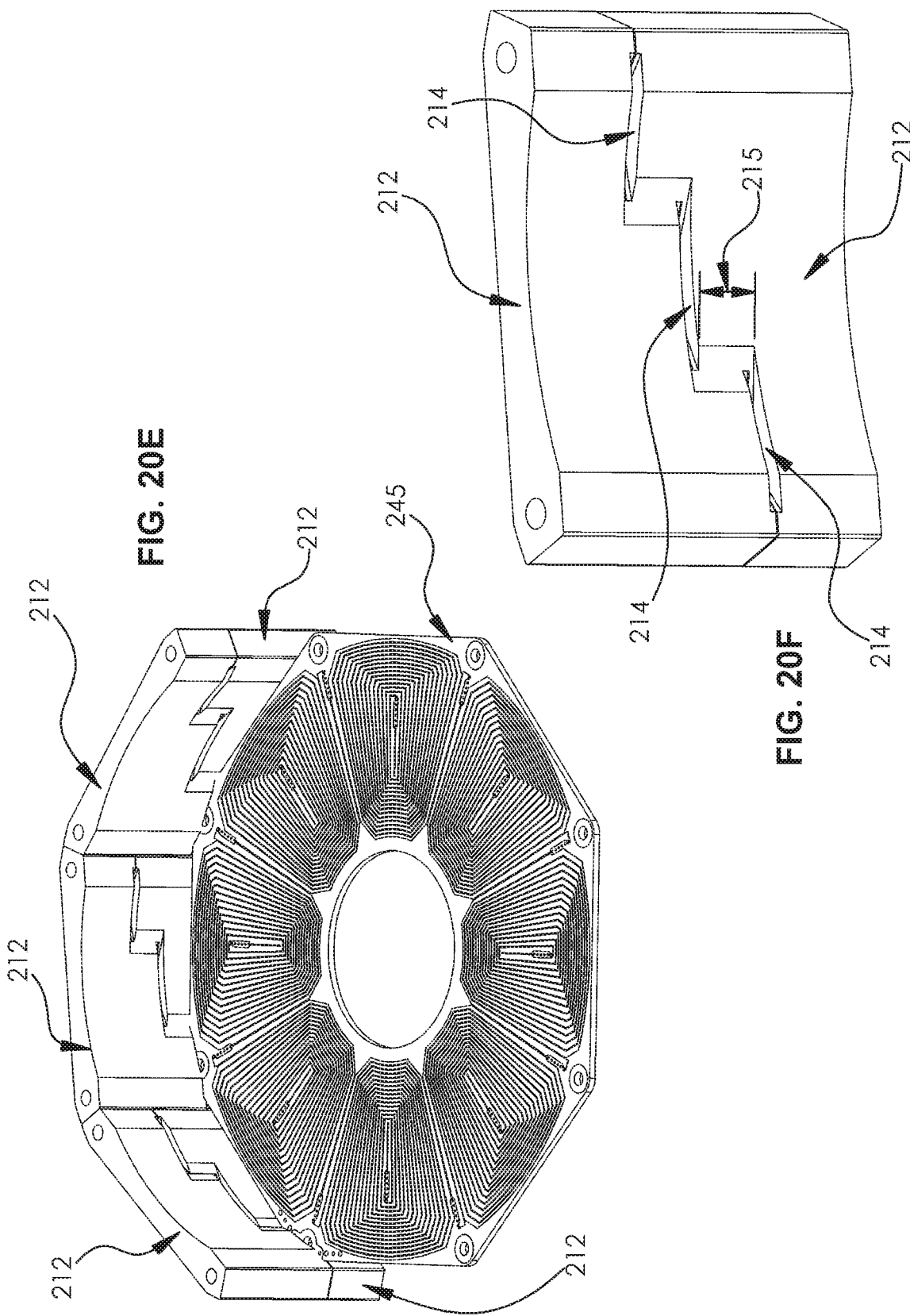

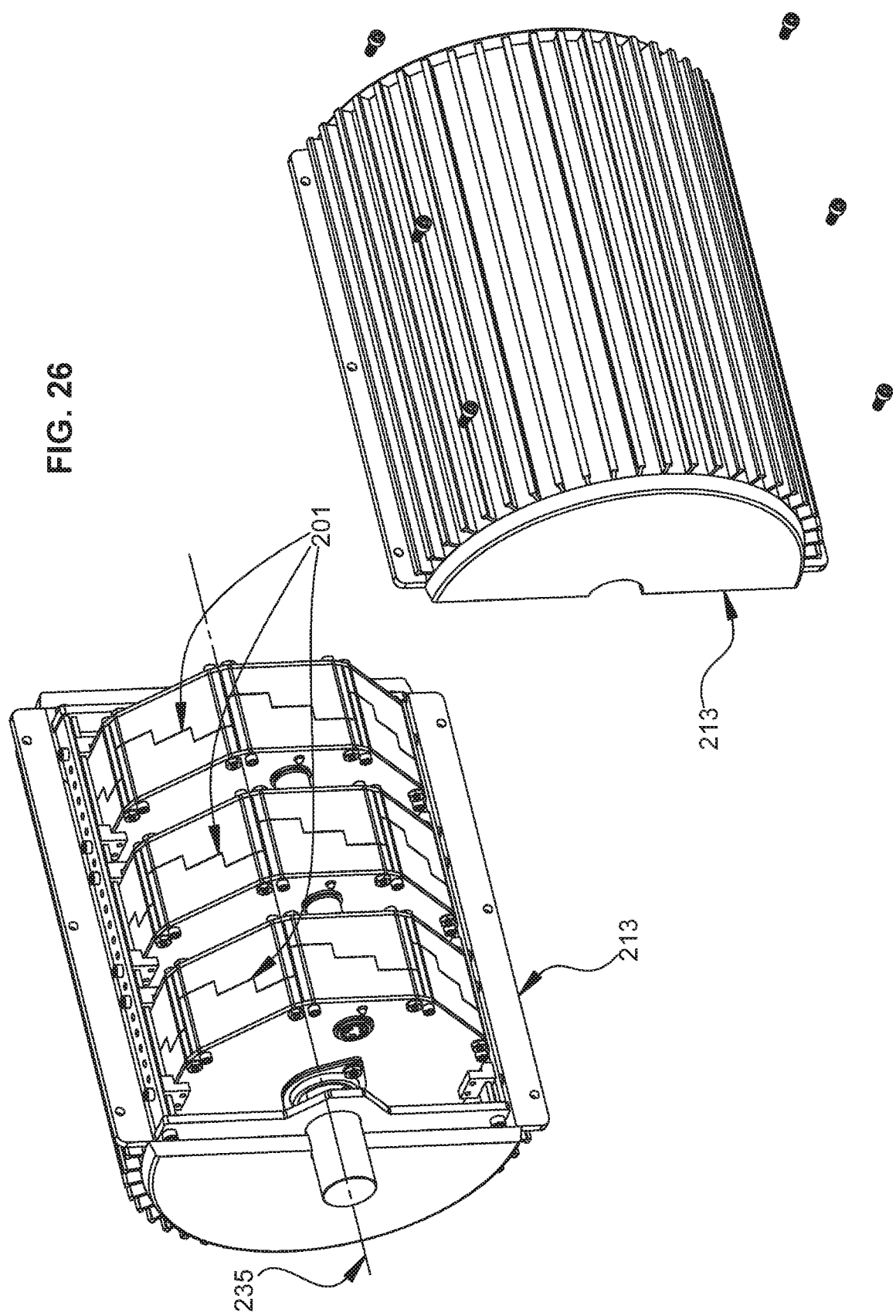

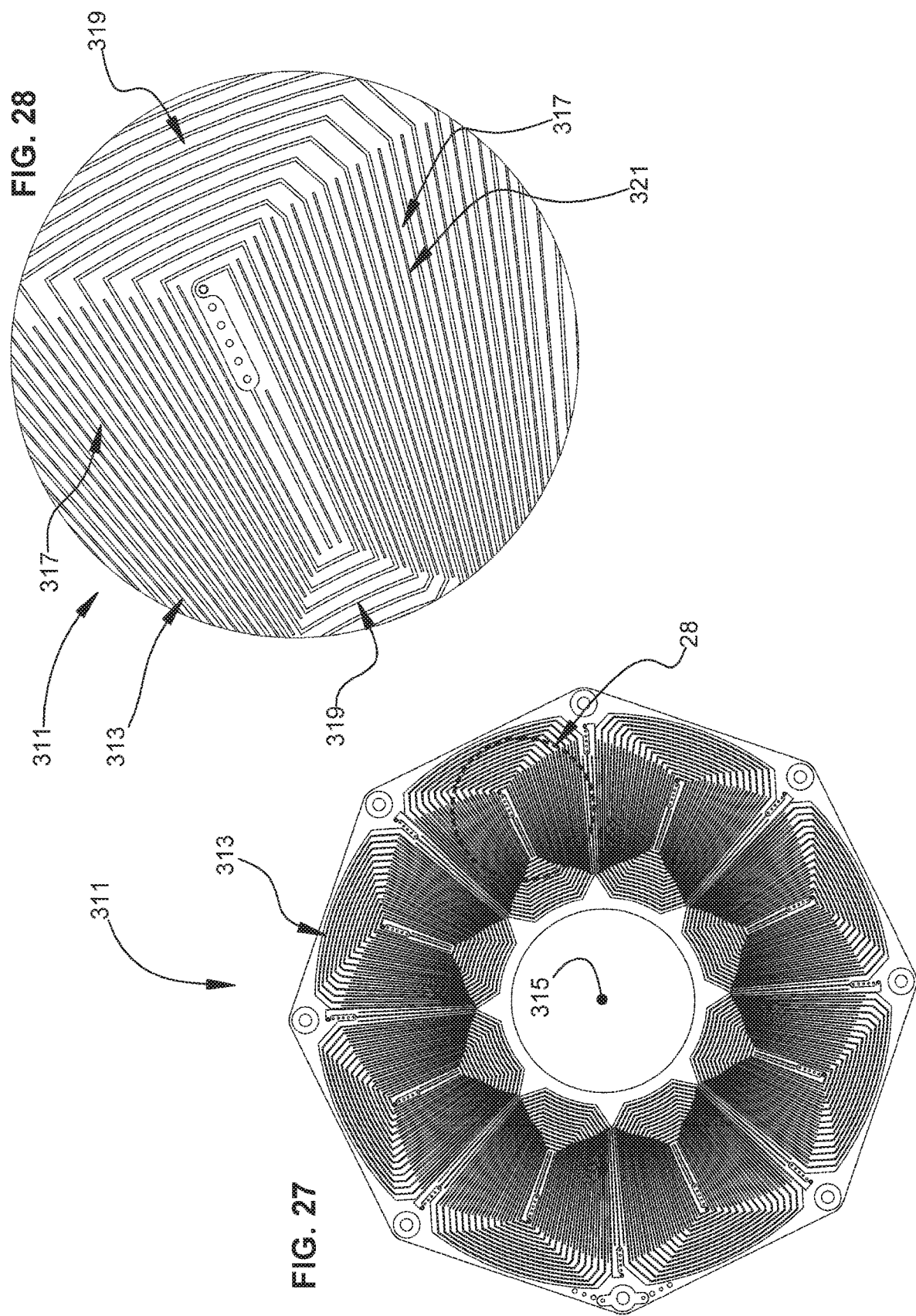

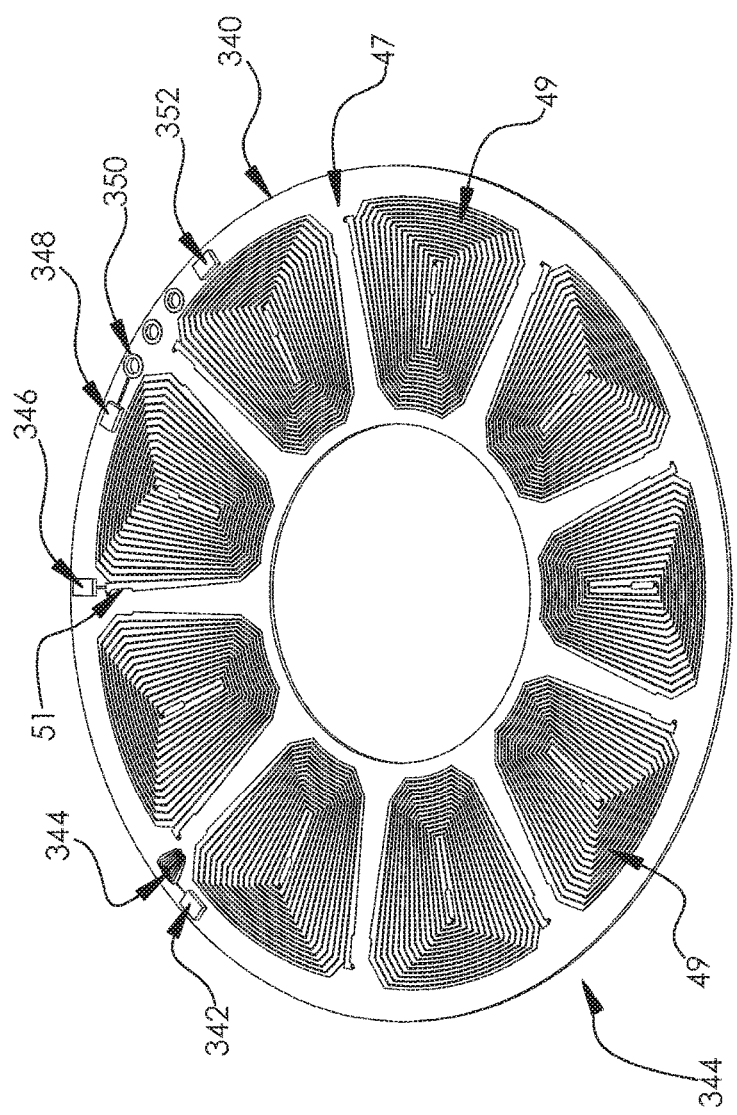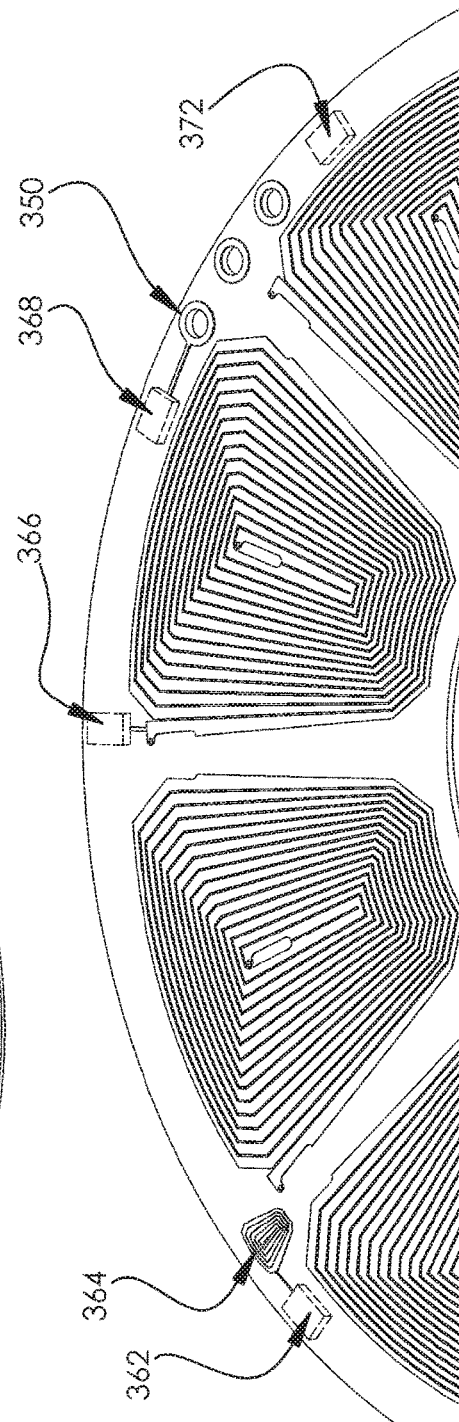

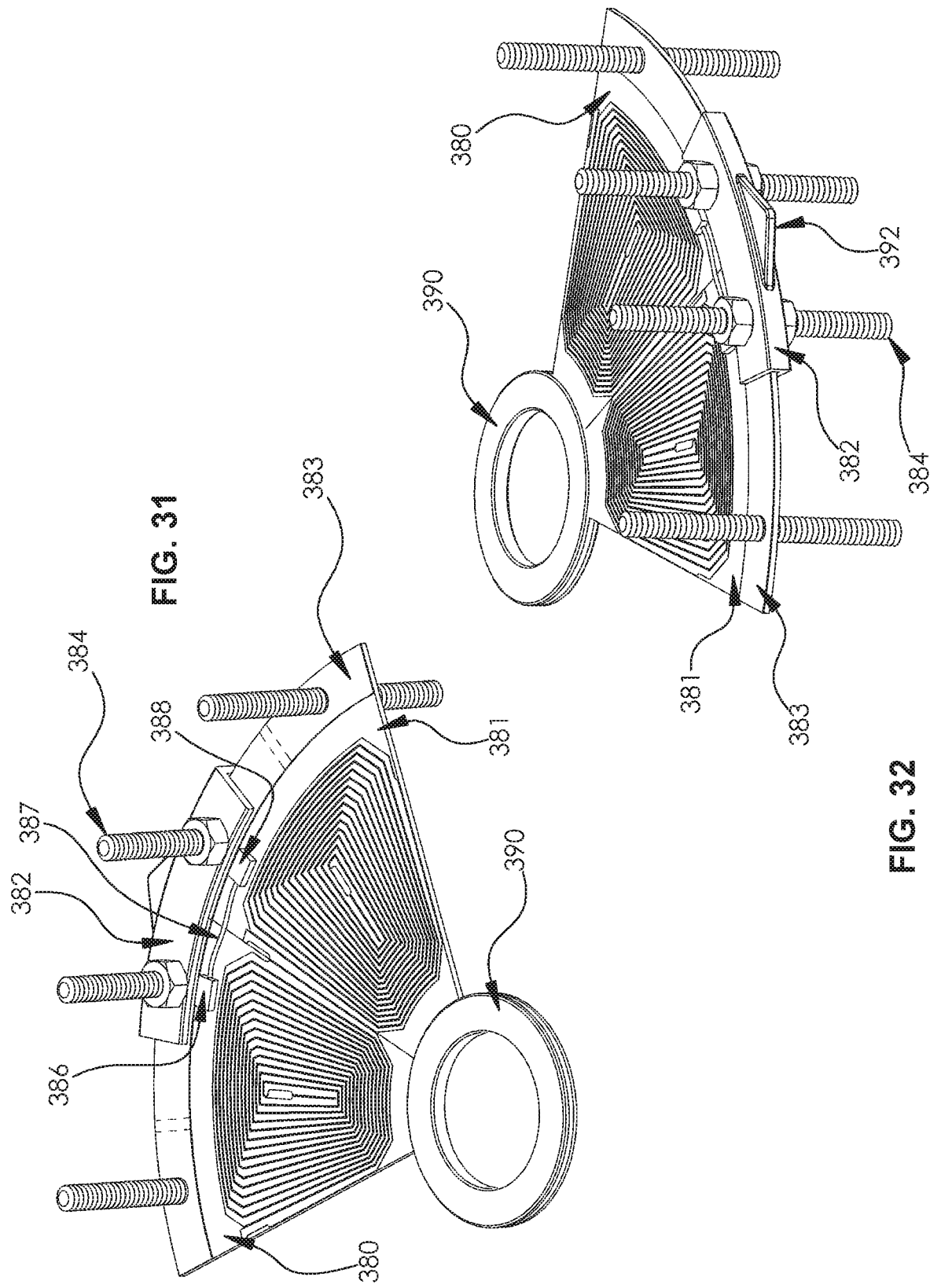

SYSTEM AND APPARATUS FOR AXIAL FIELD ROTARY ENERGY DEVICE

None.

BACKGROUND OF THE INVENTION

Field of the Disclosure

The present invention relates in general to an axial field rotary energy device and, in particular, to a system, method and apparatus for modular motors and generators having one or more printed circuit board (PCB) stators.

Description of the Prior Art

Conventional, axial air gap brushless motors with layered disk stators are known, such as U.S. Pat. No. 5,789,841. That patent discloses a stator winding that uses wires interconnected in a wave or lap configuration. Such motors are relatively large and difficult to manufacture. Axial field electric devices that use PCB stators also are known, such as U.S. Pat. Nos. 6,411,002, 7,109,625 and 8,823,241. However, some of these designs are complicated, relatively expensive and they are not modular. Thus, improvements in cost-effective axial field rotary energy devices continue to be of interest.

SUMMARY

Embodiments of a system, method and apparatus for an axial field rotary energy device are disclosed. For example, an axial field rotary energy device can include a housing having an axis with an axial direction. A stator assembly can be mounted to the housing and comprising a plurality of stator panels that are axially-stacked and discrete panels from each other. Each stator panel comprises a respective printed circuit board (PCB) having a respective plurality of coils that are electrically conductive and interconnected within the respective PCB. The respective PCB can be configured so that an electrical current that flows through any one of the respective plurality of coils likewise flows through all of the respective plurality of coils, such that each stator panel consists of a single electrical phase. In addition, a rotor assembly including a plurality of rotors can be rotatably mounted within the housing on opposite axial ends of the stator assembly. The rotors can be mechanically coupled together. Each rotor can include magnets having leading and trailing edges. The trailing edge of one magnet and the leading edge of an adjacent magnet can be parallel to each other to define a consistent circumferential spacing, relative to the axis, between adjacent ones of the magnets.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description can be had by reference to the embodiments thereof that are illustrated in the appended drawings. However, the drawings illustrate only some embodiments and therefore are not to be considered limiting in scope as there can be other equally effective embodiments.

FIG. 5 is an enlarged isometric view of an embodiment of only the coil layers of a stator.

FIG. 6B is an enlarged isometric view of a portion of the stator shown in FIG. 5.

FIG. 6D is an enlarged isometric view of a portion of the stator shown in FIG. 5.

FIG. 7 is a schematic, partially exploded side view of an embodiment of the traces on the layers of a stator.

FIGS. 20B-20H are isometric and sectional side views of embodiments of the module of FIG. 20A.

FIG. 26 is an exploded isometric view of an embodiment of a body for modules.

FIG. 27 is a top view of an embodiment of a PCB stator for an axial field rotary energy device.

FIG. 28 is an enlarged top view of a portion of an embodiment of the PCB stator of FIG. 27.

FIG. 29 is an isometric view of an embodiment of a stator that includes attached sensors.

FIG. 30 is an isometric view of an embodiment of a stator that includes embedded sensors.

FIG. 31 is an isometric view of an embodiment of an assembly for stator segments.

FIG. 32 is an opposite isometric view of an embodiment of an assembly for stator segments.

The use of the same reference symbols in different drawings indicates similar or identical items.

DETAILED DESCRIPTION

Figure 1:
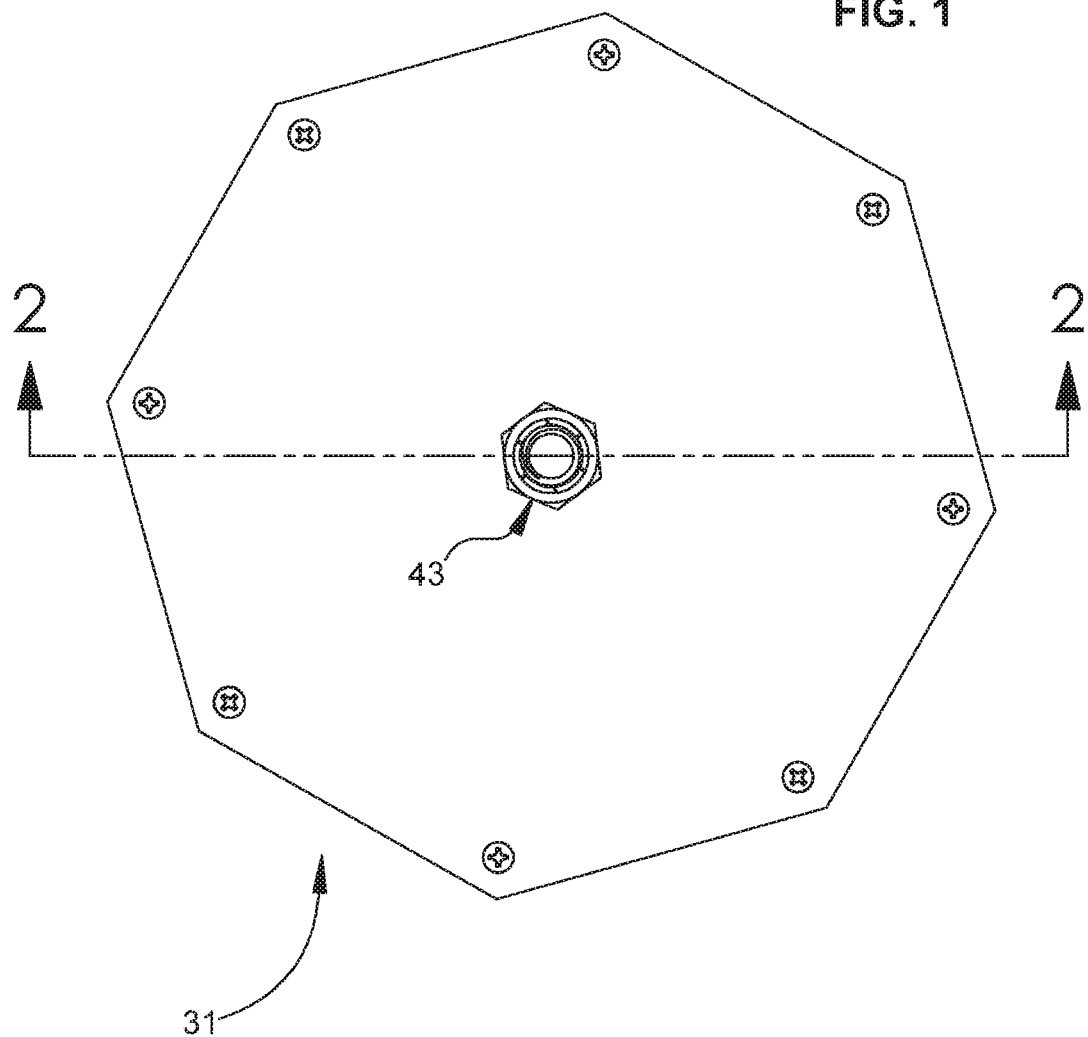
FIG. 1 is a top view of an embodiment of an axial field rotary energy device.
Figure 2:
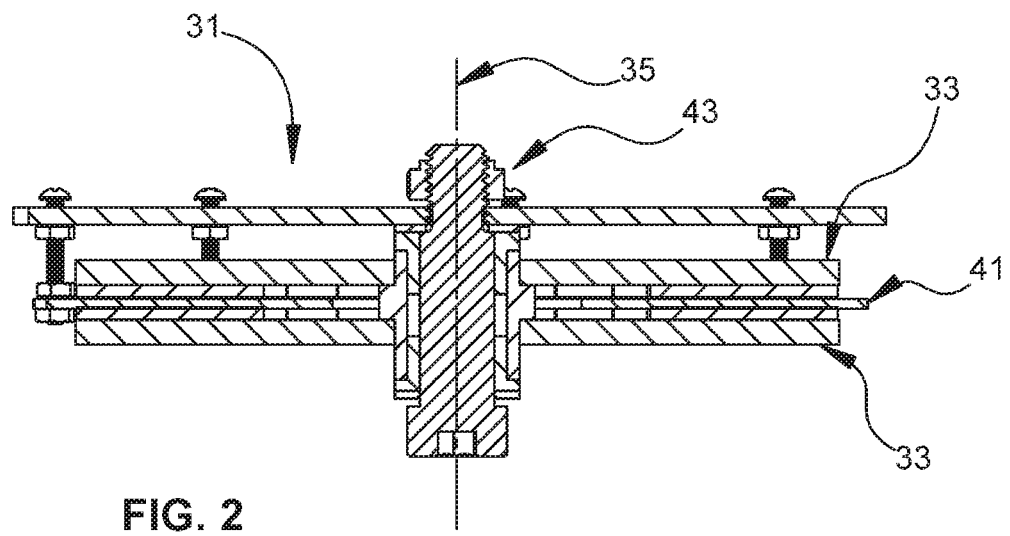
FIG. 2 is a sectional side view of the device of FIG. 1, taken along the line 2-2 of FIG. 1.
Figure 3:
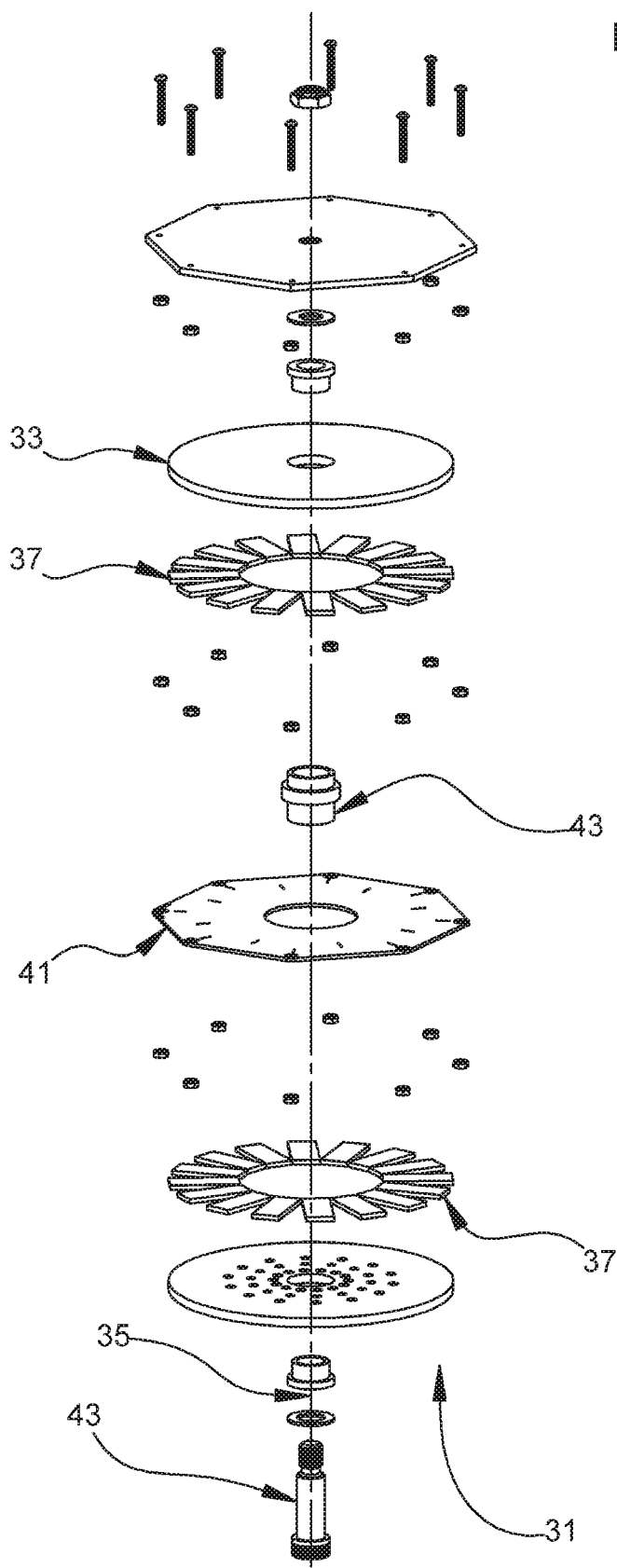
FIG. 3 is an exploded isometric view of an embodiment of the device of FIGS. 1 and 2.

FIGS. 1-3 depict various views of an embodiment of a device 31 comprising an axial field rotary energy device (AFRED). Depending on the application, device 31 can comprise a motor that converts electrical energy to mechanical power, or a generator that converts mechanical power to electrical energy.

I. Panels

Embodiments of device 31 can include at least one rotor 33 comprising an axis 35 of rotation and a magnet (i.e., at least one magnet 37). A plurality of magnets 37 are shown in the embodiment of FIG. 3. Each magnet 37 can include at least one magnet pole. The magnets 37 can comprise various shapes, such as trapezoidal, conical, etc.

Figure 4:
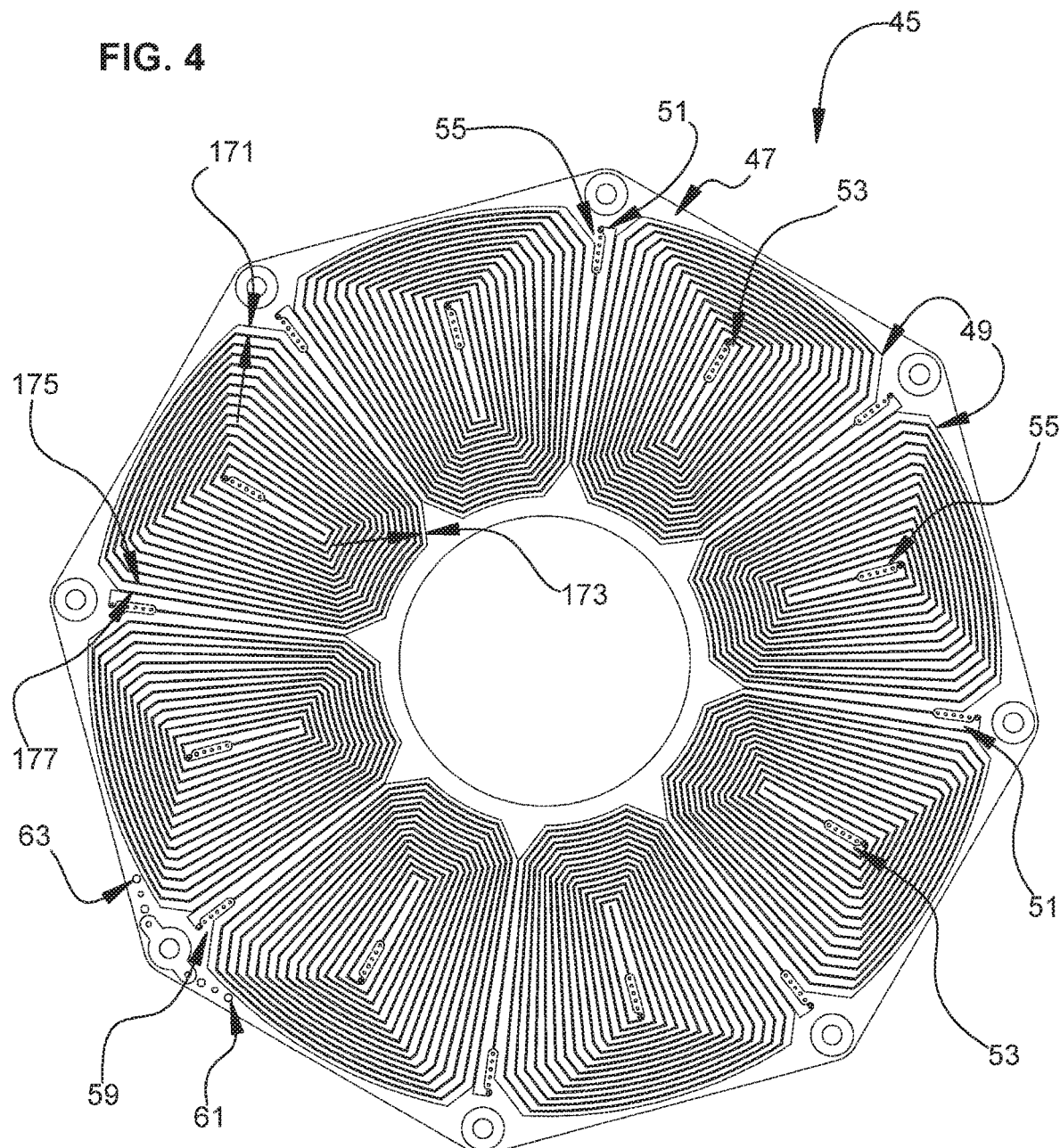
FIG. 4 is a top view of an embodiment of a single phase stator having a printed circuit board (PCB).

Device 31 also can include a stator 41 that is coaxial with the rotor 33. Rotor 33 can be coupled on a shaft 43 and with other hardware, such as one or more of the following items: a mount plate, fastener, washer, bearing, spacer or alignment element. Embodiments of the stator 41 can include a single unitary panel, such as the printed circuit board (PCB) 45 shown in FIG. 4. PCB 45 can include at least one PCB layer 47. For example, certain embodiments described herein include twelve PCB layers 47. PCB layers 47 can be parallel and spaced apart in the axial direction. Each PCB layer 47 can include at least one conductive trace 49. Each trace 49 is a separate conductive feature formed on a given PCB layer 47. For example, eight traces 49 are shown in FIG. 4. Traces 49 can be configured in a desired pattern, such as the coils illustrated in FIG. 4.

FIG. 4 depicts an embodiment of one PCB layer 47 within a twelve-layer PCB 45. The other eleven PCB layers are similar, with differences described below in regards to subsequent figures. On the illustrated PCB layer 47, each trace 49 (forming a single coil) includes a first terminal 51 at the outer edge of the coil, and a second terminal 53 in the center of coil. Traces 49 are connected to other traces 49 using vias 55. A first set of vias 55 is disposed adjacent to the first terminal 51 at the outer edge of each coil, and a second set of vias 55 is disposed adjacent to the second terminal in the center of each coil. In this embodiment, traces 49 on the illustrated PCB layer 47 are not directly connected to an adjacent trace 49 on this illustrated PCB layer 47, but rather are each directly connected to a corresponding trace 49 on another PCB layer 47, as more thoroughly explained in regards to FIG. 5 and FIGS. 6A-6D.

In this embodiment, each trace 49 is continuous and uninterrupted from its first terminal 51 to its second terminal 53, and connections to such trace 49 are made only to the first and second terminals 51, 53. Each trace 49 includes no other terminals for electrical connections. In other words, each trace 49 can be seamlessly continuous with no other electrical connections, including no additional vias 55, between the first and second terminals 51, 53. Also shown in FIG. 4, the width of a given trace 49 can be not uniform. For example width 171 corresponding to an outer trace corner can be wider than width 173 corresponding to an inner trace corner. Gap 175 between adjacent concentric trace portions forming a single coil can be the same or different than the gap 177 between adjacent traces (i.e., separate coils). In some embodiments, a given trace can comprise an outer width that is adjacent an outer diameter of the PCB and in a plane that is perpendicular to the axis 35, and an inner width that is adjacent an inner diameter of the PCB and in the plane. In some embodiments the outer width can be greater than the inner width. In some embodiments a given trace can comprise inner and outer opposing edges that are not parallel to each other.

FIG. 5 depicts an embodiment of a twelve-layer PCB 45 incorporating the PCB layer 47 shown in FIG. 4. Each of the twelve PCB layers 47 are closely spaced and form a "sandwich" of PCB layers 47, labeled as 47.1-12. On the uppermost PCB layer 47.1, a first trace 49.11 (also described herein as "coil 49.11") is shown whose first terminal 51.1 is coupled to an external terminal 61 for the device 31. On the lowermost PCB layer 47.12, a trace 49.128 is shown whose first terminal 51.12 is coupled to an external terminal 63 for the device 31. In this embodiment, there are eight traces 49 (coils) on each of twelve PCB layers 47.1-12. These traces are coupled together (as more fully described below) such that current flowing into the external terminal 61 will flow through the ninety-six coils, then flow out the external terminal 63 (or conversely flow into external terminal 63 and out external terminal 61). In this embodiment, only one trace 49 (e.g., coil 49.11) is coupled to the external terminal 61 for the device 31, and only one trace 49 (e.g., coil 49.128) is coupled to the external terminal 63 for the device 31. For a motor, both external terminals 61, 63 are input terminals and, for a generator, both external terminals 61, 63 are output terminals. As can be appreciated in this embodiment, each PCB layer includes a plurality of coils that are co-planar and angularly and symmetrically spaced apart from each other about the axis, and the coils in adjacent PCB layers, relative to the axis, are circumferentially aligned with each other relative to the axis to define symmetric stacks of coils in the axial direction.

Figure 6A:
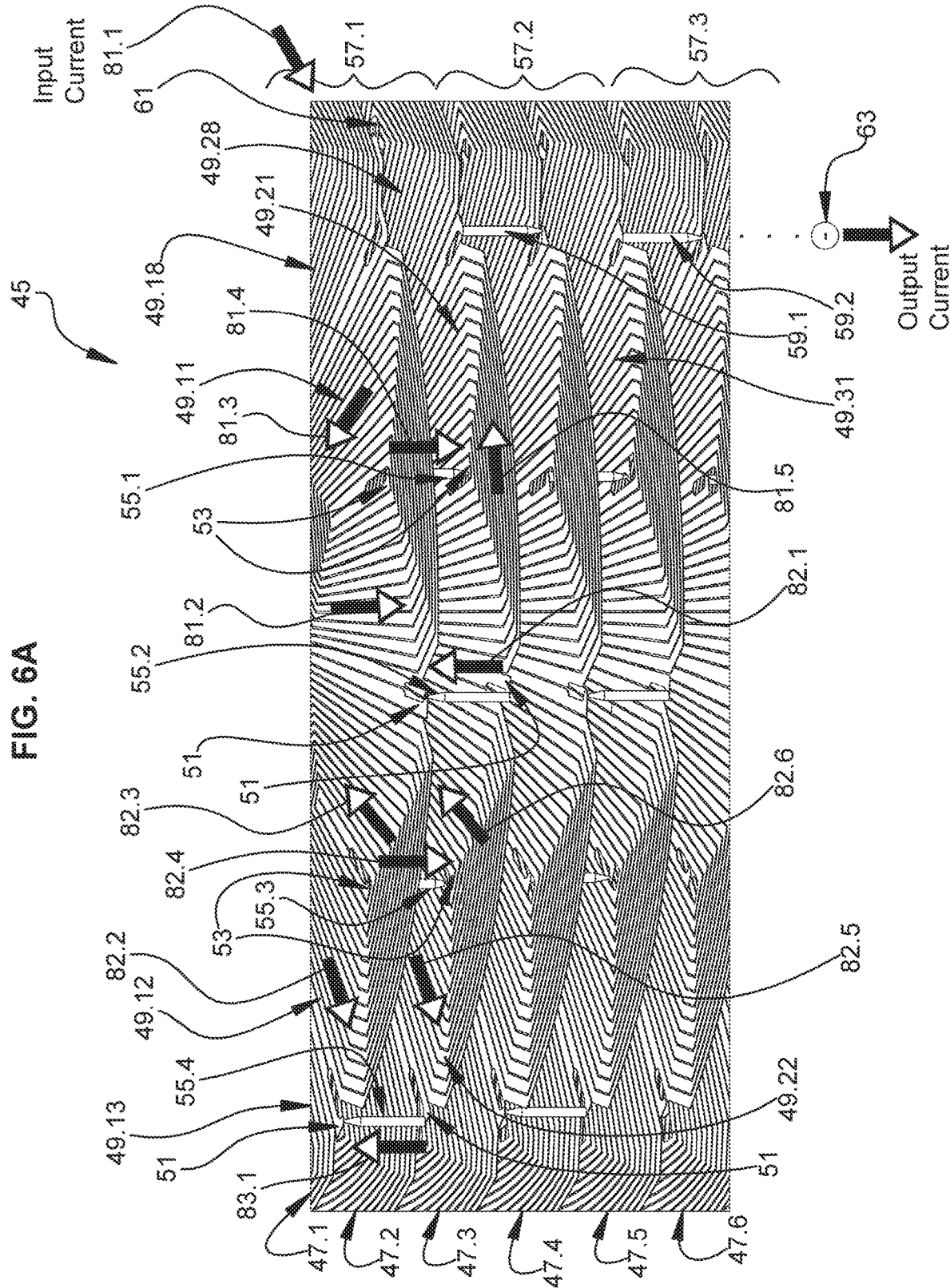
FIG. 6A is an enlarged, exploded, isometric view of another embodiment of only the coil layers of a stator.

FIG. 6A is an exploded view of a portion of the twelve-layer PCB 45 shown in FIG. 5, which is labeled to better illustrate how the coils are coupled together by vias 55, 59, and thus to better illustrate how current flows into the external terminal 61, through the ninety-six coils, then flows out the external terminal 63. Assume that input current 81.1 flows into external terminal 61. This current flows "spirally" around coil 49.11 (on PCB layer 47.1) as current 81.2 and 81.3, and reaches the second terminal 53 of coil 49.11. A via 55.1 couples the second terminal 53 of coil 49.11 to the second terminal of the corresponding coil 49.21 on PCB layer 47.2 directly below coil 49.11. Thus, the current flows through via 55.1 as current 81.4, then flows spirally around coil 49.21 as current 81.5 until it reaches the first terminal 51 for coil 49.21. A via 55.2 couples the first terminal 51 of coil 49.21 to the first terminal of coil 49.12 on PCB layer 47.1, which is adjacent to the first coil 49.11. In this embodiment, the traces 49 on the first PCB layer 47.1 are generally reversed (mirror-imaged) relative to those on the second PCB layer 47.2, so that the via 55.1 overlaps with both "tabs" on the respective second terminal 53 of coils 49.11 and 49.21, and likewise so that the via 55.2 overlaps with both "tabs" on the respective first terminal 51 of coils 49.12 and 49.21, as is more thoroughly described below in regards to subsequent figures. Thus, the current flows through via 55.2 as current 82.1 to the first terminal 51 of coil 49.12 on PCB layer 47.1.

From this terminal, the current flows through coils 49.12 and 49.22 similarly to that described for coils 49.11 and 49.21. For example, the current flows around coil 49.21 (on PCB layer 47.1) as current 82.2 and 82.3 to the second terminal 53 of coil 49.21, flows through via 55.3 as current 82.4 to the second terminal 53 of coil 49.22, then flows as current 82.5 and 82.6 around coil 49.22 until it reaches the first terminal 51 for coil 49.22. As before, a via 55.4 couples the first terminal 51 of coil 49.22 to the first terminal 51 of coil 49.13 on PCB layer 47.1, which is adjacent to coil 49.12. This coupling configuration is replicated for all remaining traces 49 on the upper two PCB layers 47.1, 47.2, and the current flows through these remaining traces 49 until it reaches the last coil 49.28 on PCB layer 47.2. The current, after having already flowed through all sixteen coils on the upper two PCB layers 47.1, 47.2, is now directed to the next PCB layer 47.3. Specifically, a via 59.1 couples the first terminal 51 of coil 49.28 to the first terminal of coil 49.31 on PCB layer 47.3, which is directly below coils 49.11 and 49.21. In this embodiment there is only one such via 59 coupling a coil on PCB layer 47.2 to a coil on PCB layer 47.3. Conversely, there are fifteen such vias 55 coupling together coils on PCB layers 47.1, 47.2. In this embodiment such coupling occurs only at the first and second terminals 51, 53 of the coils.

The vias 55 between the third and fourth PCB layers 47.3, 47.4 are configured identically as those between the first and second PCB layers 47.1, 47.2 described above, and thus the via configuration and the corresponding current flow need not be repeated. This continues downward through the PCB layer "sandwich" until reaching the lowermost PCB layer 47.12 (not shown here). As described above, the first terminal 51 for trace (coil) 49.128 is coupled to the external terminal 63. Consequently, the current that flows inward through external terminal 61, after flowing through all ninety-six coils, flows outward through external terminal 63.

FIG. 6B is an enlarged view of a group of vias 55 shown in FIG. 5. This via group is adjacent to the respective second terminal 53 for each of a group of vertically aligned coils 49.1-12 on each of the twelve PCB layers 47.1-12. As noted above, the traces 49 on the second PCB layer 47.2 are generally reversed (mirror-imaged) relative to those on the first PCB layer 47.1, so that the via 55 overlaps with both "tabs" on the respective second terminal 53 of these vertically adjacent coils. As shown in FIG. 6B, on coil 49.18 (first layer, eighth coil) the second terminal 53.18 includes a tab extending to the side of the trace. In mirror-image fashion, on coil 49.28 (second layer, eighth coil) the second terminal 53.28 includes a tab extending in the opposite direction to the side of the trace, so that these two tabs overlap. A via 55 couples together these two overlapping tabs. In like manner, since the embodiment shown includes 12 PCB layers 47, each of five additional vias 55 respectively couples overlapping terminals 53.38 and 53.48, overlapping terminals 53.58 and 53.68, overlapping terminals 53.78 and 53.88, overlapping terminals 53.98 and 53.108, and overlapping terminals 53.118 and 53.128.

Figure 6C:
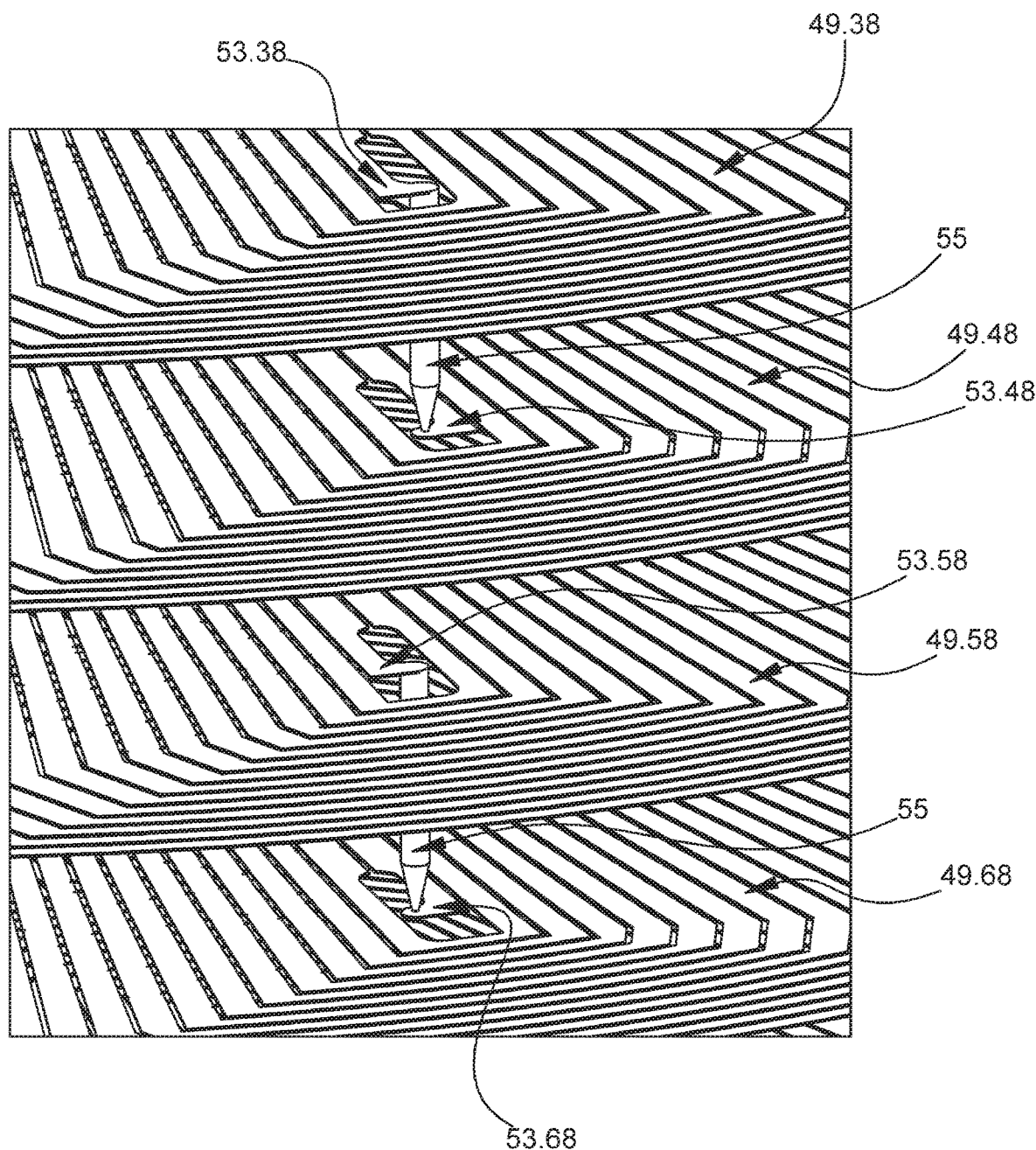
FIG. 6C is an enlarged, exploded, isometric view of a portion of the stator shown in FIG. 5.

FIG. 6C shows two of these vias 55 in an exploded format. Terminal 53.38 of coil 49.38 overlaps with terminal 53.48 of coil 49.48, and are coupled together by a first via 55. Terminal 53.58 of coil 49.58 overlaps with terminal 53.68 of coil 49.68, and are coupled together by a second via 55. As can be clearly appreciated in the figures, these pairs of overlapping tabs, together with their corresponding vias 55, are staggered in a radial direction so that such vias 55 can be implemented using plated through-hole vias. Alternatively, such vias 55 can be implemented as buried vias, in which case the vias need not be staggered, but rather can be vertically aligned.

FIG. 6D is an enlarged view of a group of vias 59 also shown in FIG. 5. In this embodiment, these vias 59 are disposed in the gap between one specific adjacent pair of vertically aligned coils 49 (e.g., between uppermost layer coil 49.11 and 49.18), whereas vias 55 are disposed in the other gaps between other adjacent pairs of vertically aligned coils 49. In this figure, the vias 59 are shown as plated through-hole vias. Vias 55, 59 overlap with both "tabs" on the respective first terminal 51 of the corresponding coils. Vias 55 couple horizontally adjacent coils on vertically adjacent layers, while vias 59 couple horizontally aligned coils on vertically adjacent layers, both as shown in FIG. 6A. There are only five vias 59 shown in this embodiment because the first terminal 51 on the uppermost coil 49.11 is coupled to the external terminal 61, and the first terminal 51 of coil 49.128 on the lowermost PCB layer 47.12 is coupled to the external terminal 63, leaving only 10 PCB layers (47.2-11) having coils whose respective first terminals 51 are coupled together in pairs. For example, the innermost via 59.5 couples a respective coil on PCB layer 47.10 to a respective coil on PCB layer 47.11.

In various embodiments, each trace 49 can be electrically coupled to another trace 49 with at least one via 55. In the example of FIG. 6A, each PCB layer 47 has eight traces 49 and only one via 55 between traces 49. In some embodiments, every trace 49 is electrically coupled to another trace 49. Together, two traces 49 define a trace pair 57. In FIG. 7, there are twelve PCB layers 47.1-12, and there are six trace pairs 57.1-6.

Each trace pair 57 can be electrically coupled to another trace pair 57 with at least one other via 59 (e.g., such as only one via 59). In some versions, the traces 49 (e.g., coils) in each trace pair 57 (e.g., coil pair) can be located on different PCB layers 47, as shown in FIG. 6A. In other versions, however, the traces 49 in each trace pair 57 can be co-planar and located on the same PCB layer 47.

In some embodiments, at least two of the traces 49 (e.g., coils) are electrically coupled in series. In other versions, at least two of the traces 49 (e.g., coils) are electrically coupled in parallel. In still other versions, at least two of the traces 49 are electrically coupled in parallel, and at least two other traces 49 are electrically coupled in series.

Embodiments of the device 31 can include at least two of the trace pairs 57 electrically coupled in parallel. In other versions, at least two of the trace pairs 57 are electrically coupled in series. In still other versions, at least two of the trace pairs 57 are electrically coupled in parallel, and at least two other trace pairs 57 are electrically coupled in series.

As depicted in FIGS. 4 and 6, each PCB layer 47 (only the top PCB layer 47 is shown in the top views) comprises a PCB layer surface area (LSA) that is the total surface area (TSA) of the entire (top) surface of the PCB 45. The TSA does not include the holes in the PCB 45, such as the center hole and the mounting holes that are illustrated. The one or more traces 49 (eight coils shown in FIG. 4) on the PCB layer 47 can comprise a coils surface area (CSA). The CSA includes the entire footprints of the coils (i.e., within their perimeters), not just their "copper surface area". The CSA can be in a range of at least about 50% of the PCB layer surface area, such as at least about 55%, at least about 60%, at least about 65%, at least about 70%, at least about 75%, at least about 80%, at least about 85%, at least about 90%, at least about 95%, at least about 97%, or even at least about 99% of the PCB layer surface area. In other embodiments, the coils surface area can be not greater than 99% of the PCB layer surface area, such as not greater than about 95%, not greater than about 90%, not greater than about 85%, not greater than about 80%, not greater than about 75%, or even not greater than about 70% of the PCB layer surface area. In other embodiments, the coils surface area can be in a range between any of these values.

The CSA also can be calculated with respect to any sensors or circuitry (such as IOT elements) on or in the PCB. The IOT elements can be limited to not greater than 50% of the TSA. Additionally, the IOT elements can be embedded within the CSA or embedded in at least part of the TSA this is not included in the CSA.

The total area of each trace that forms a coil (i.e., including the conductive traces, but cannot necessarily include the spaces between the conductive traces) can be viewed as a coil surface area. It is believed that performance of the device 31 is improved with increasing aggregate coil surface area, relative to the underlying PCB layer surface area on which the coil(s) is formed.

In some embodiments (FIG. 4), the device 31 can comprise a stator 41 comprising a single electrical phase. Versions of the stator 41 can consist of a single electrical phase. Each PCB layer 47 can comprise a plurality of coils that are co-planar and symmetrically spaced apart about the axis 35 (FIGS. 2 and 3). In one example, each coil consists of a single electrical phase.

Figure 8:
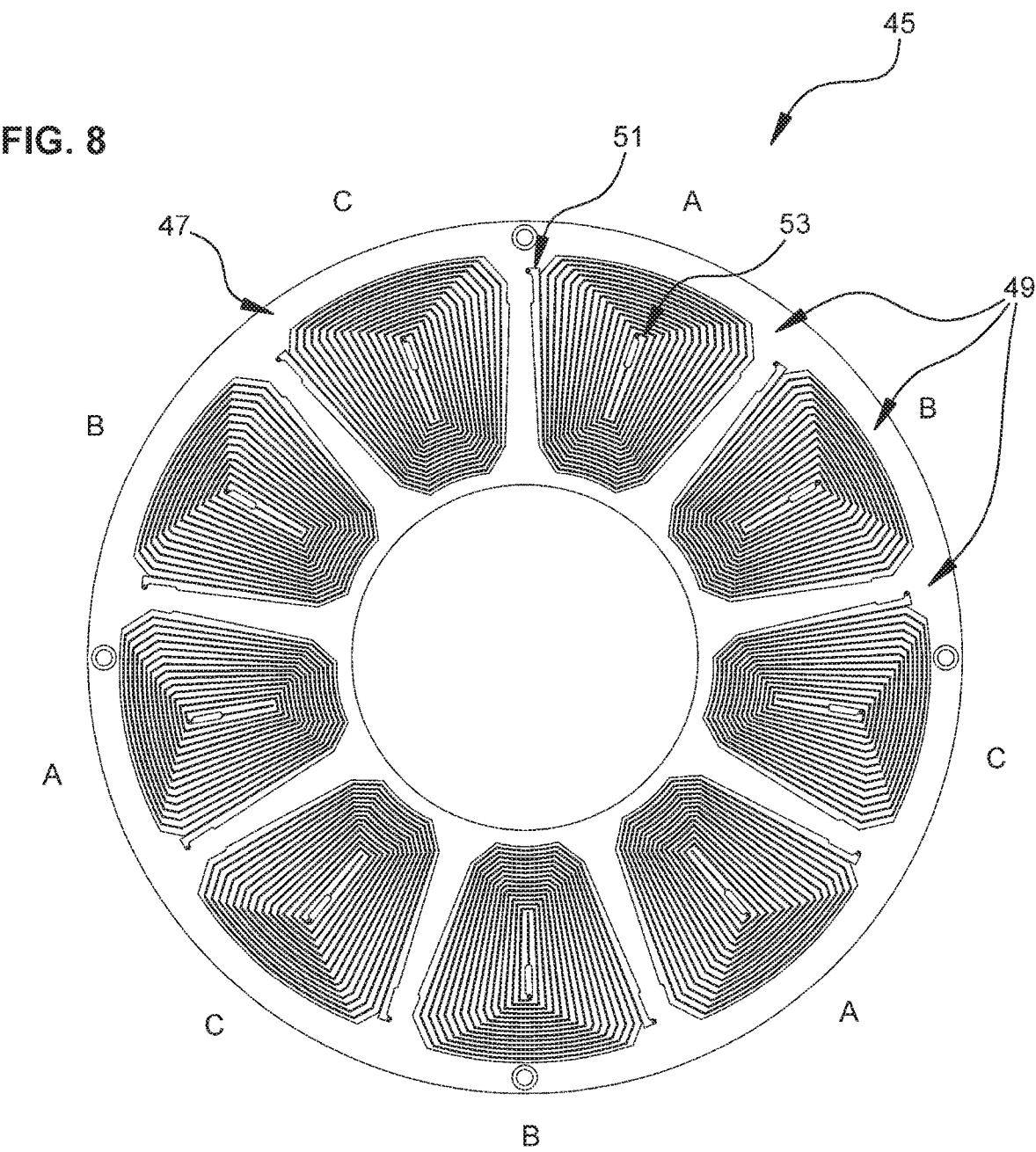
FIG. 8 is a top view of an embodiment of a multi-phase stator having a PCB.

FIG. 8 depicts an embodiment of the stator 41 comprising at least two electrical phases (e.g., three phases shown). Each PCB layer 47 can include a plurality of coils (such as traces 49) as shown for each electrical phase. For example, FIG. 8 illustrates coils corresponding to three phases A, B and C. The coils for each electrical phase A, B, C can be angularly offset from each other with respect to the axis 35 (FIGS. 2 and 3) within each PCB layer 47 to define a desired phase angle shift between the electrical phases A, B, C. In FIG. 6, there are nine traces 49 on each PCB layer 47. Since the embodiment of stator 41 in FIG. 8 is three phases, each trace 49 in phase A is 120 electrical degrees apart from other traces 49 for phase A, and 40 electrical degrees apart from adjacent traces 49 for phases B and C. The traces 49 for phase B (relative to phases A and C) and for phase C (relative top phases A and B) are spaced likewise.

In some embodiments, each coil (e.g., trace 49) can consist of a single electrical phase. Alternatively, the coils can be configured to enable the stator 41 with two or more electrical phases (e.g., three phases shown in FIG. 8).

Figure 9:
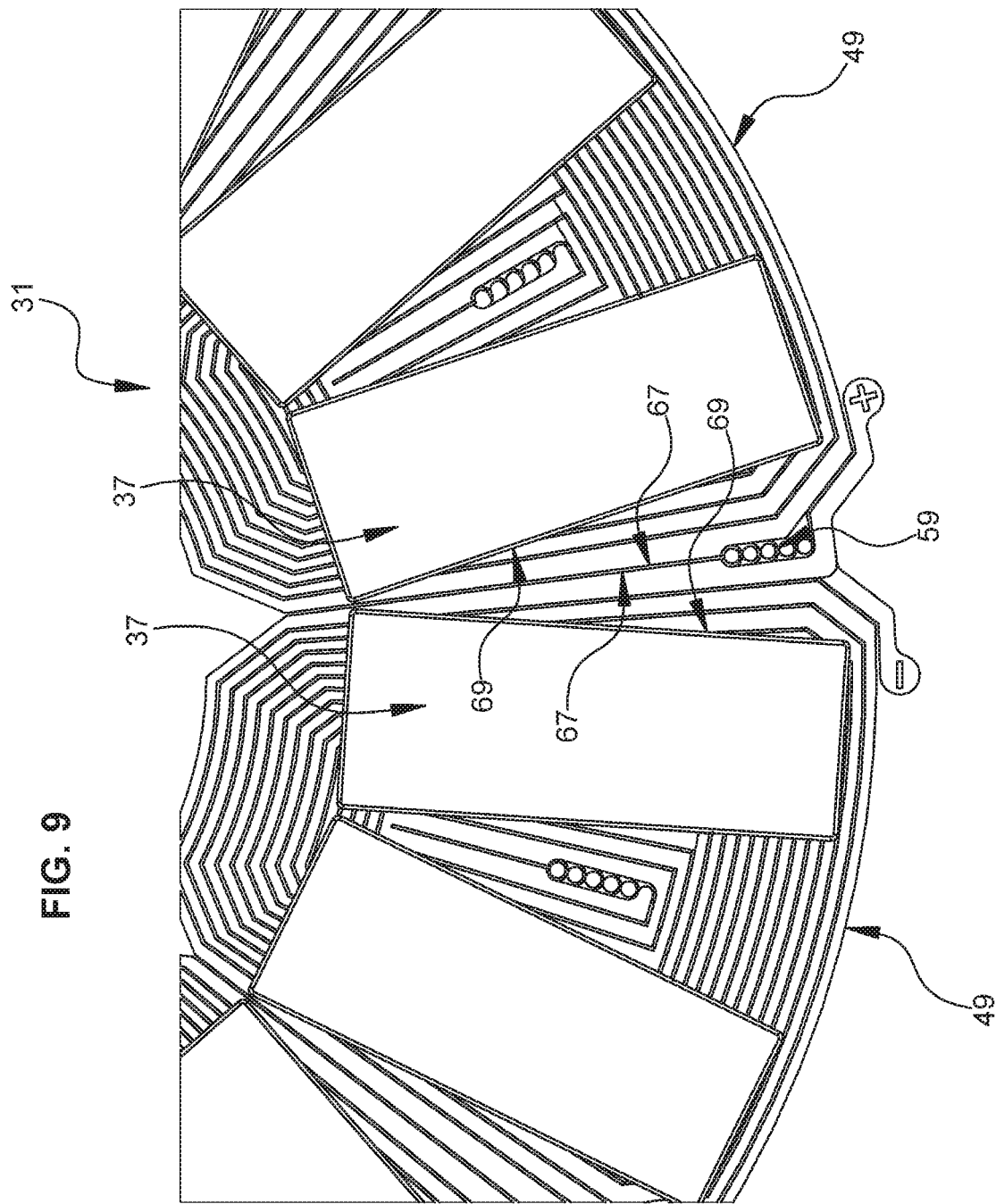
FIG. 9 is a top view of an alternate embodiment of the top coil layer of a stator and magnets of the vertically adjacent rotors.

The example in FIG. 9 is a simplified view of only some interior components of an embodiment of device 31. Each of the magnets 37 can include a magnet radial edge or element 67 (also referred to herein as a "magnet radial edge 67"), and each of the traces 49 can include a trace radial edge or element 69 (also referred to herein as a "coil radial edge 69"). The magnets 37 are part of the rotor 33 (FIG. 2) and rotate about the axis 35 with respect to the stationary stator 41. When radial edge portions of the magnets 37 and the traces 49 rotationally align relative to the axis during operation of the device 31, at least portions of the radial elements 67, 69 can be skewed (i.e., not parallel) relative to each other. In some embodiments, when radial edge portions of the magnets and coils rotationally align relative to the axis, the magnet radial edges and coil radial edges are not parallel and are angularly skewed relative to each other. FIG. 9 illustrates a rotation position of the magnets 37 for which a radial edge portion of the magnet 37 (i.e., the magnet radial edge 69 nearing the corner of the magnet 37) is rotationally aligned with a radial edge portion of the coil 49, and which illustrates the skew between the magnet radial edge 69 and the coil radial edge 67. In one version, the radial elements 67, 69 can be leading radial edges or trailing radial edges of the magnets 37 and traces 49. In another example, the magnet and trace radial edges or elements 67, 69 can be linear as shown, and no portions of the magnet and trace radial elements 67, 69 are parallel when the magnets 37 and traces 49 rotationally align in the axial direction.

In some embodiments, the magnet radial elements 67 can be angularly skewed relative to the trace radial elements 69, and the angular skew can be greater than 0 degrees, such as greater than 0.1 degrees, at least about 1 degree, at least about 2 degrees, at least about 3 degrees, at least about 4 degrees, or even at least about 5 degrees. In other versions, the angular skew can be not greater than about 90 degrees, such as not greater than about 60 degrees, not greater than about 45 degrees, not greater than about 30 degrees, not greater than about 25 degrees, not greater than about 15 degrees, not greater than about 10 degrees, or even not greater than about 5 degrees. Alternatively, the angular skew can be in a range between any of these values.

In an alternate embodiment, at least portions of the radial elements 67, 69 can be parallel to each other during rotational alignment.

II. Segments

Figure 10:
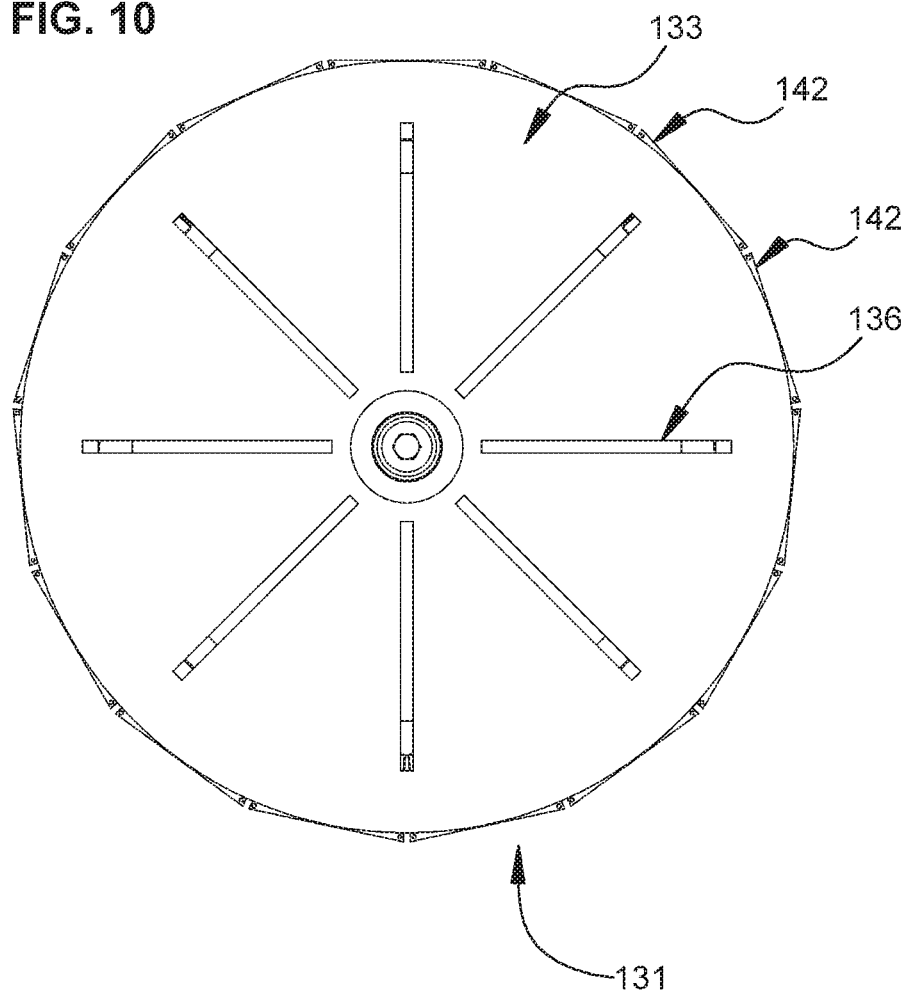
FIG. 10 is a simplified top view of an embodiment of another embodiment of an axial field rotary energy device.
Figure 11:
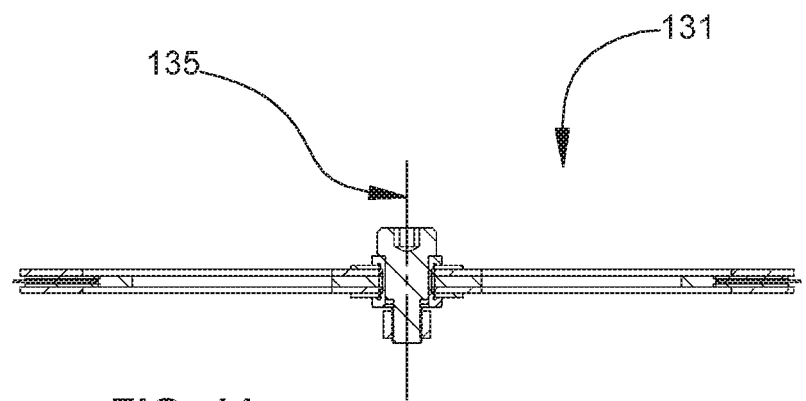
FIG. 11 is a simplified sectional side view of the device of FIG. 10.
Figure 12:
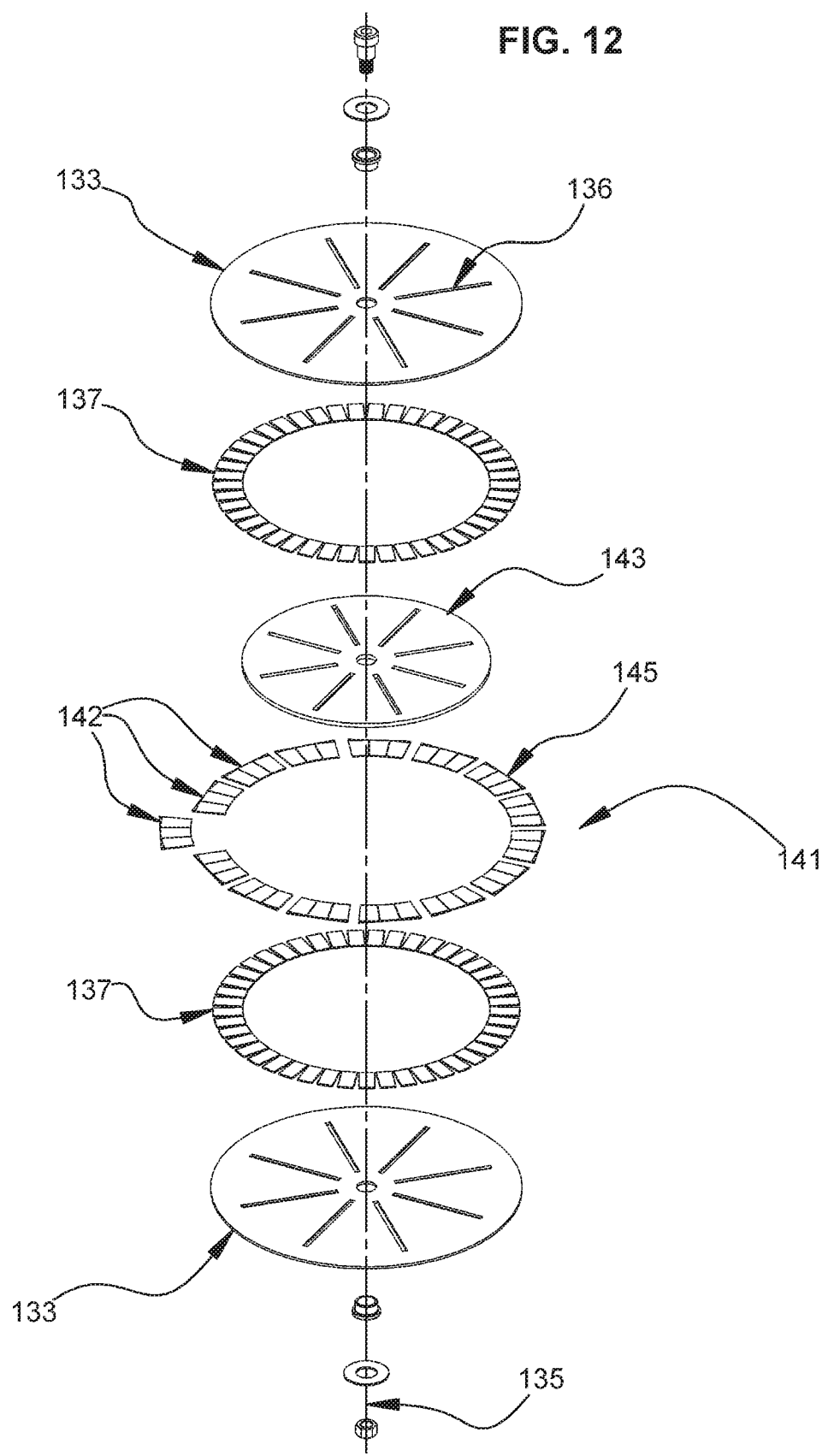
FIG. 12 is a simplified, exploded, isometric view of an embodiment of the device of FIGS. 10 and 11.

Some embodiments of an axial field rotary energy device can be configured in a manner similar to that described for device 31, including assembly hardware, except that the stator can be configured somewhat differently. For example, FIGS. 10-12 depict a simplified version of a device 131 with only some elements shown for ease of understanding. Device 131 can include a stator 141 that is coaxial with a rotor 133. Optionally, each rotor 133 can include one or more slits or slots 136 (FIG. 10) that extend therethrough. In some versions, the slots 136 are angled with respect to axis 135 (FIG. 12) and, thus, are not merely vertical. The angles of the slots 136 can be provided at constant slopes, and can facilitate a cooling air flow within the device 131. Slots 136 can enable air flow to be pulled or pushed through and/or around the rotors 133 and effectively cool the stators 141. Additional slots can be provided in rotor spacers, such as rotor spacer 143 (FIG. 12), particularly in embodiments having a plurality of stator segments, and particularly in embodiments having an inner diameter R-INT of the stator assembly (FIG. 14) irrespective of the outer diameter R-EXT.

Rather than comprising a single panel PCB 45 as described for stator 41, the stator 141 can include a plurality of stator segments 142, each of which can be a separate PCB 145. The stator segments 142 can be coupled together, such as mechanically and electrically coupled together. Each stator segment 142 can include a printed circuit board (PCB) having one or more PCB layers 147 (FIG. 13) as described elsewhere herein. In one example, each PCB 145 can have an even number of PCB layers 147. In an alternate embodiment, the PCB 145 can have an odd number of PCB layers 147.

Figure 13:
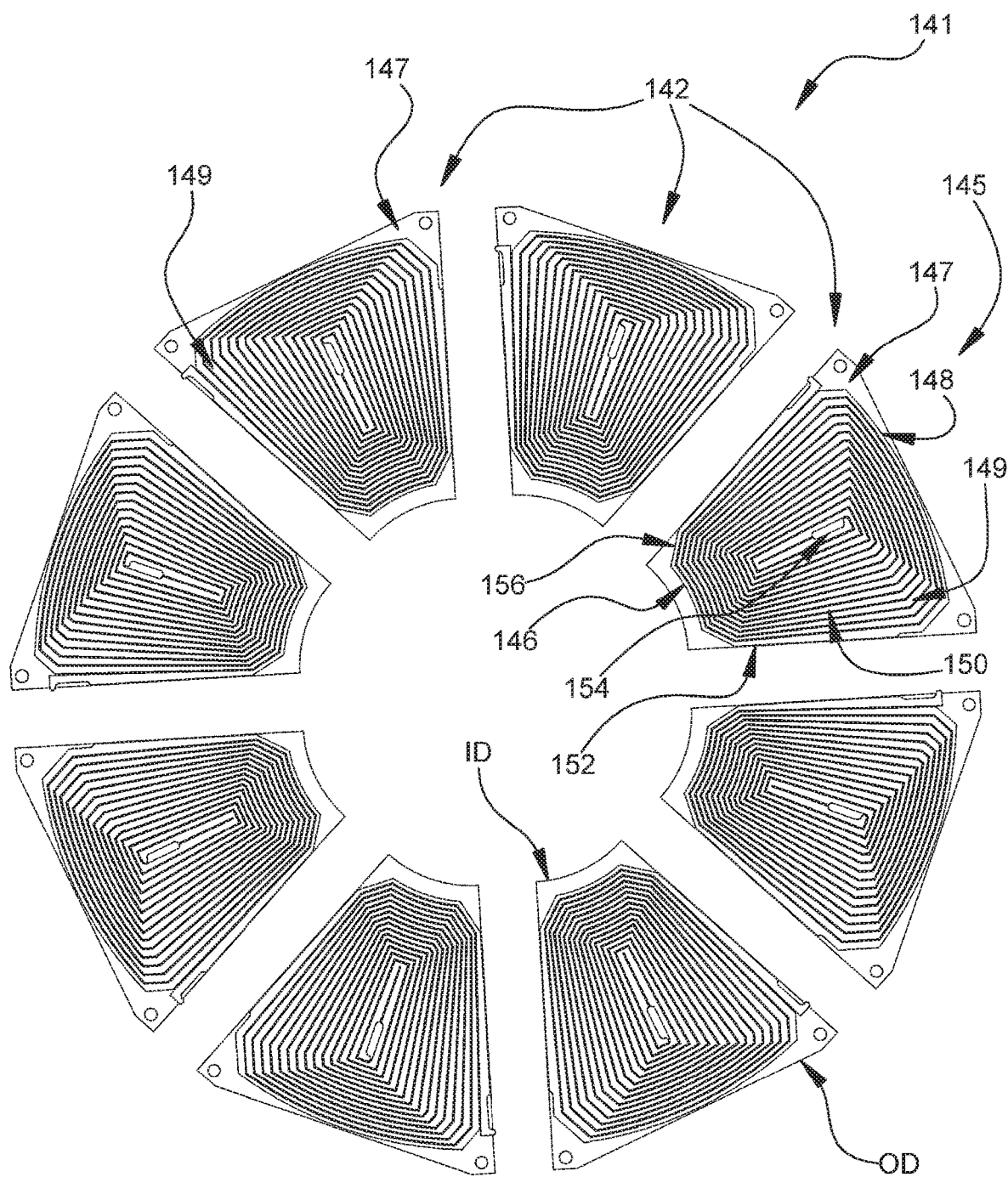
FIG. 13 is a simplified top view of an embodiment of a segmented stator.
Figure 14:
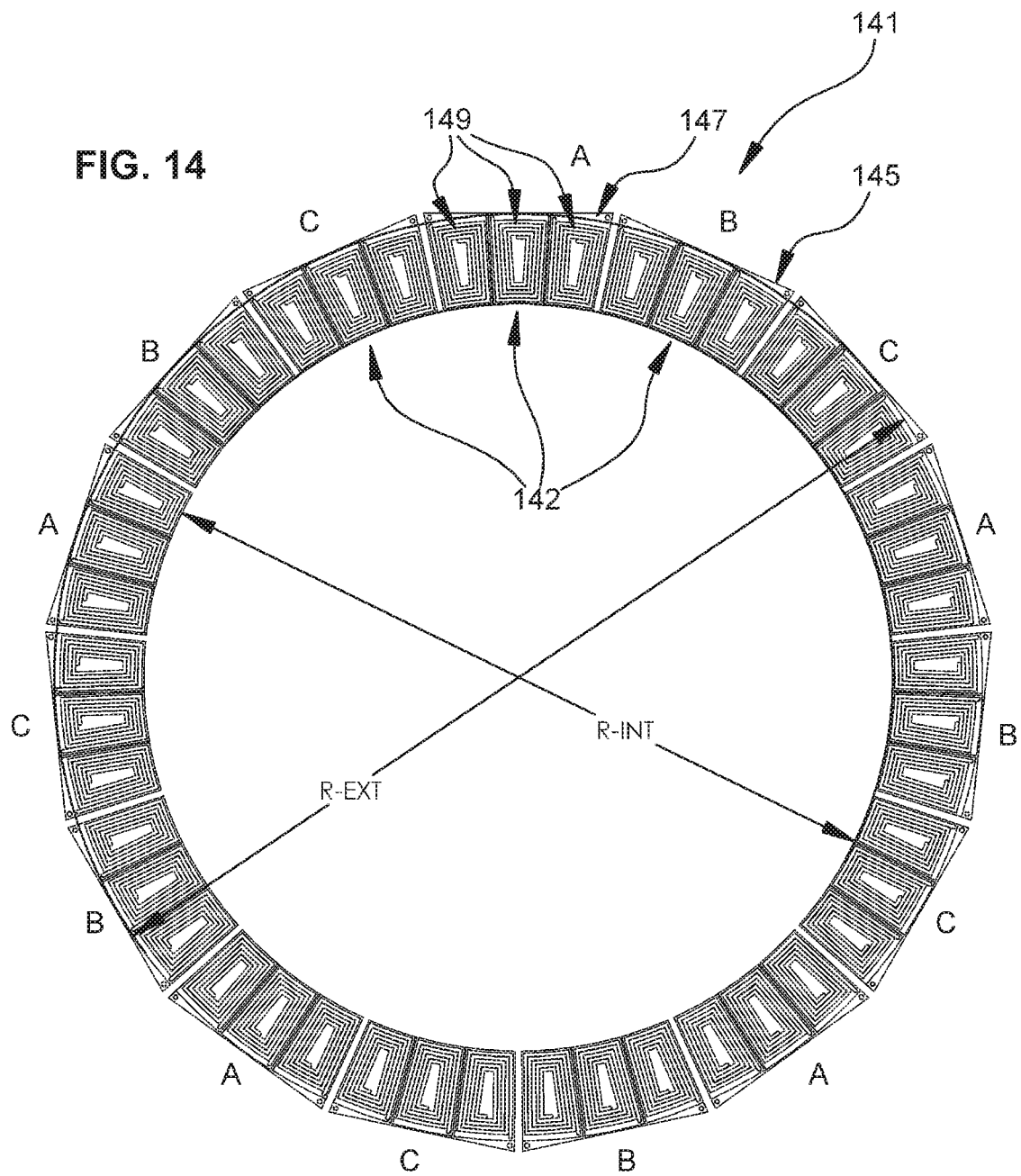
FIG. 14 is a simplified top view of another embodiment of a segmented stator.

Embodiments of the stator segments 142 can comprise or correspond to only one electrical phase. Moreover, the stator 141 of device 131 can consist of or correspond to only one electrical phase. In other versions, the stator 141 can comprise or correspond to a plurality of electrical phases. As shown in FIG. 13, each stator segment 142 includes at least one PCB layer 147 having at least one conductive trace 149, such as the coil illustrated (FIG. 14). In some versions (FIG. 14), each stator segment 142 can have at least one PCB layer 147 having a plurality of traces 149 (e.g., coils) that are co-planar and angularly spaced apart from each other relative to the axis 135 (FIGS. 11 and 12). In one example, each trace 149 can comprise a single electrical phase. In another version, each stator segment 142 can include a plurality of PCB layers 147, each of which can be configured to correspond to only one electrical phase. In some versions, each PCB layer 147 on each stator segment 142 can include a plurality of axially co-planar traces 149 that are configured to correspond to only one electrical phase.

In some embodiments (FIG. 13), each PCB layer 147 can include at least one radial trace 150 that extends from about an inner diameter (ID) of the PCB 145 to about an outer diameter (OD) of the PCB 145. In one example, each PCB layer 147 can include a trace 149 that is continuous from an outermost trace portion 152 to a concentric innermost trace portion 154. The traces 149 can include radial traces 150 having linear sides and chamfered corners 156. The linear sides of the radial traces can be tapered, having an increasing trace width with increasing radial distance. Inner end turn traces 146 and outer end turn traces 148 extend between the radial traces 150 to form a concentric coil.

Regarding the tapered traces and coils, the tapers can improve the amount of conductive material (e.g., copper) that can be included in a PCB stator. Since many motors and generators comprise a round shape, the coils can be generally circular and, to fit together collectively on a stator, the perimeters of the coils can be somewhat pie-slice-shaped or triangular. In some versions, the coils can have a same width in a plane perpendicular to the axis, and in other versions the coils can be tapered to increase the conductor (e.g., copper) densities of the coils. Improving copper density can have significant value to reduce electrical resistance, $I^2R$ losses and heat generation, and increase the ability to carry a higher electrical current to provide a machine with higher efficiency.

Figure 15:
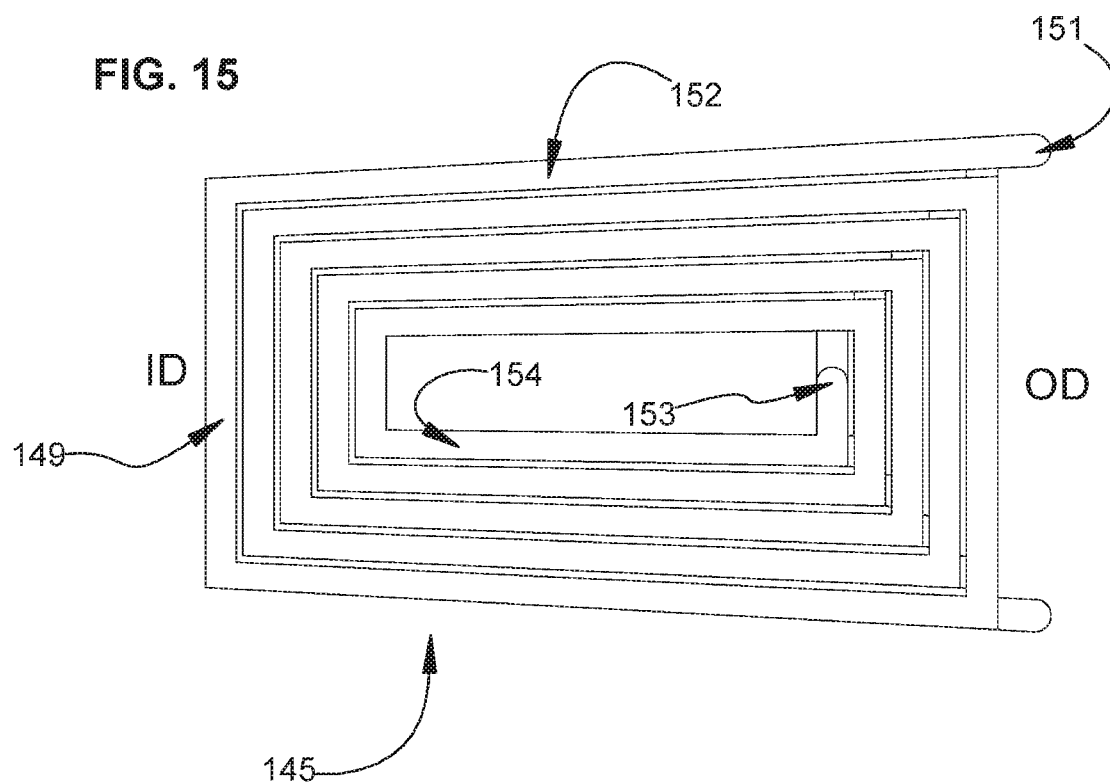
FIG. 15 is a simplified top view of an embodiment of traces for a PCB.
Figure 16:
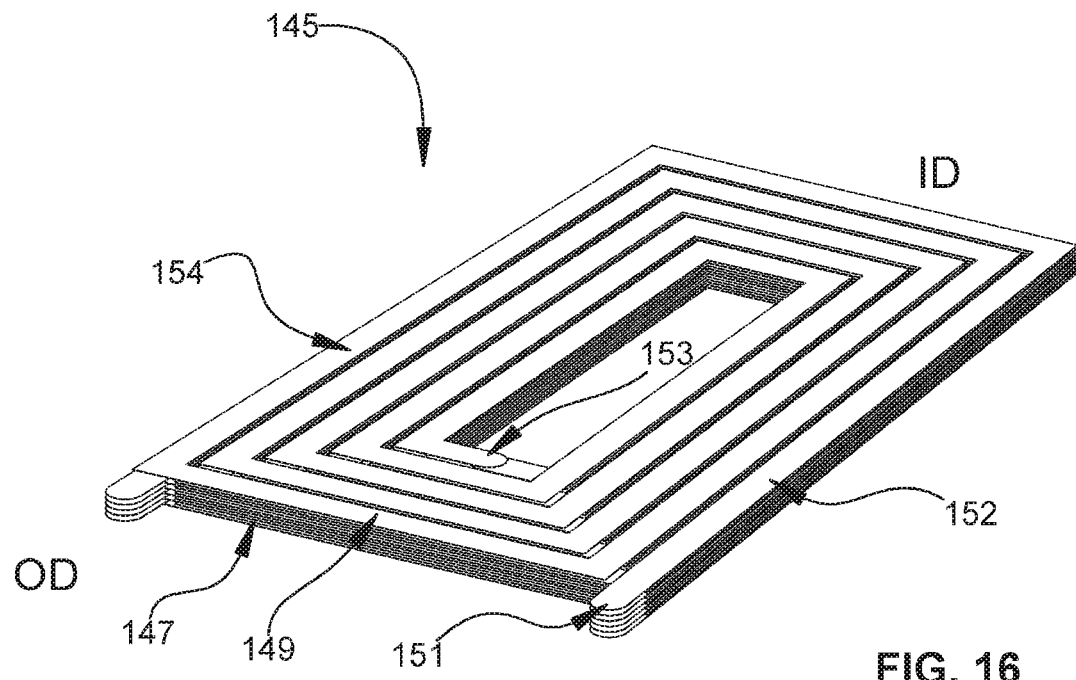
FIG. 16 is a simplified isometric view of the embodiment of FIG. 15.
Figure 17:
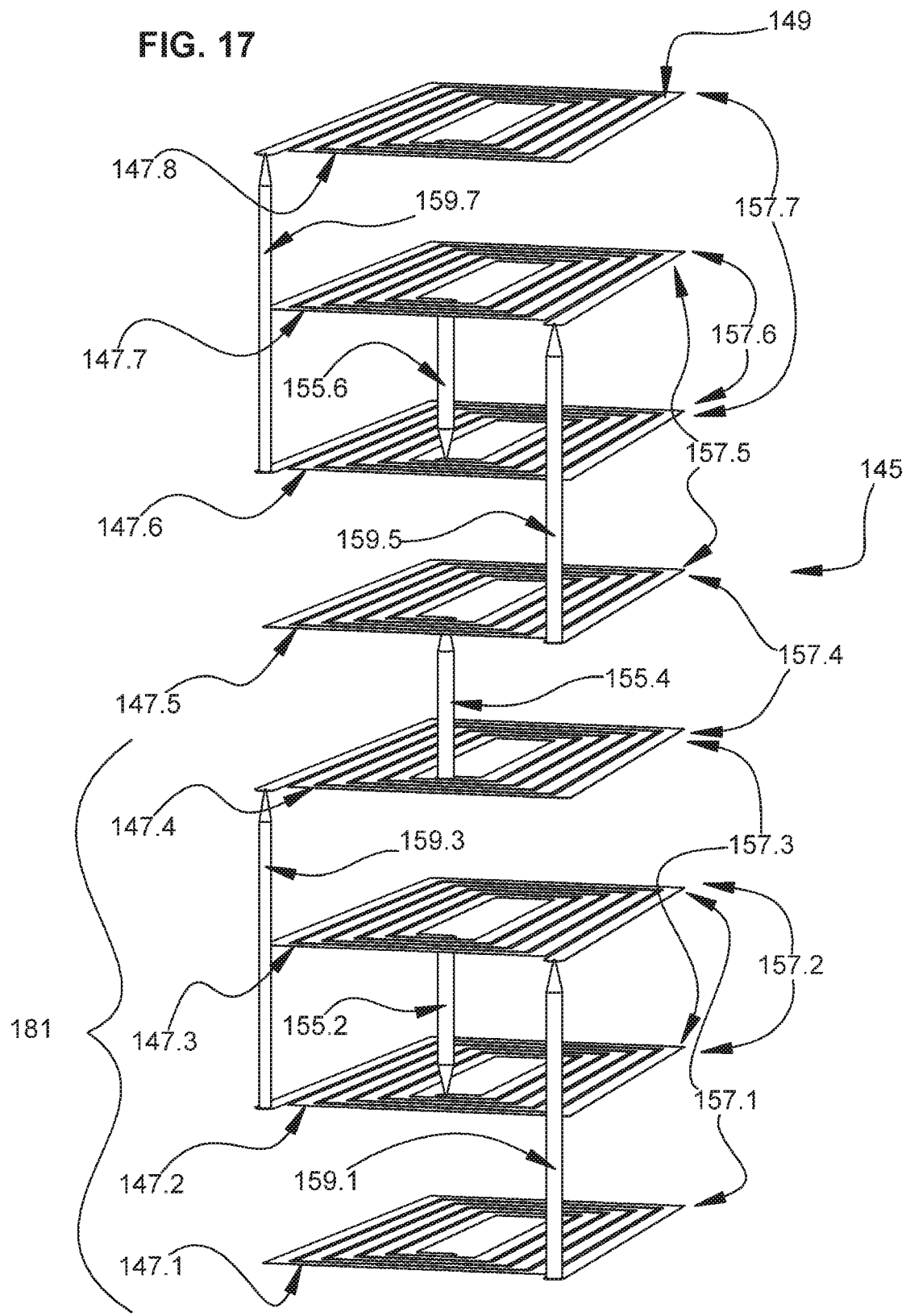
FIG. 17 is a schematic, exploded, isometric view of an embodiment of trace layers of the PCB of FIGS. 15 and 16.
Figure 18:
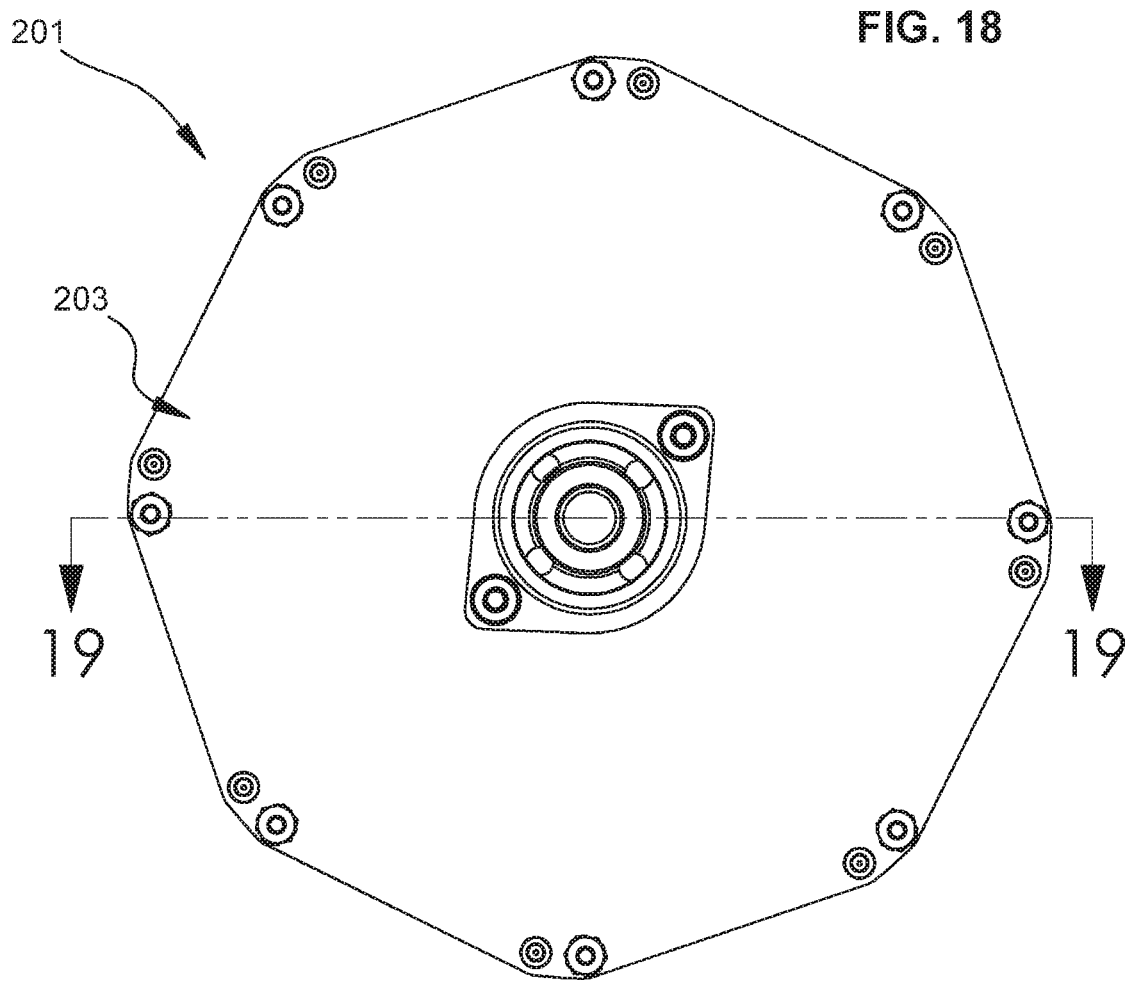
FIG. 18 is a top view of an embodiment of a module.
Figure 19:
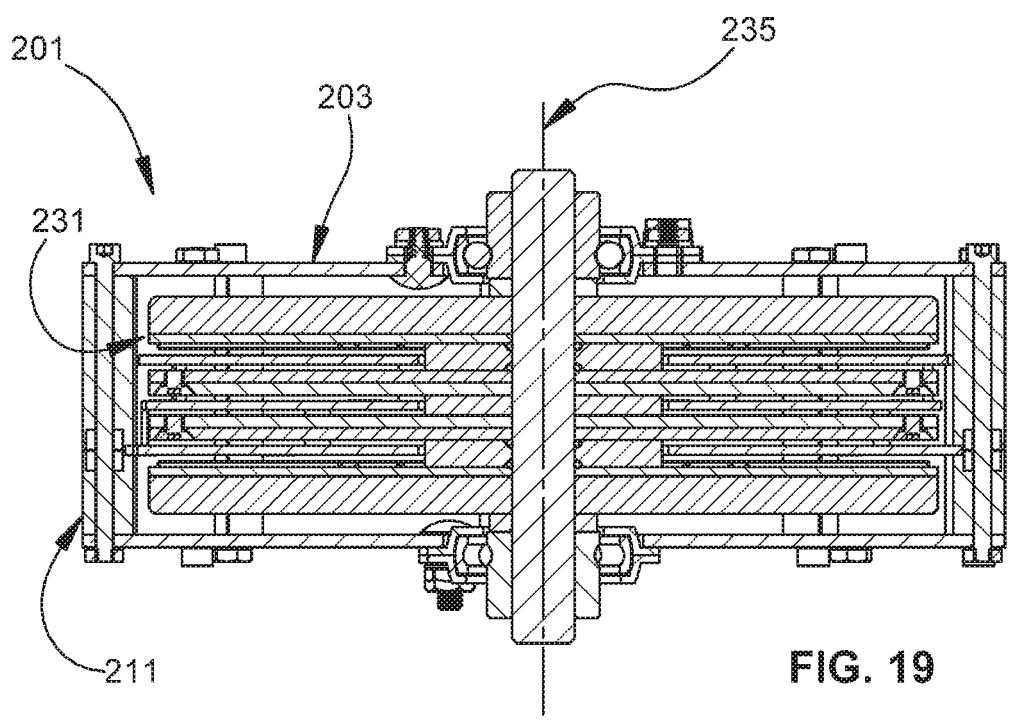
FIG. 19 is a sectional side view of the module of FIG. 18, taken along the line 19-19 of FIG. 18.
Figure 20A:
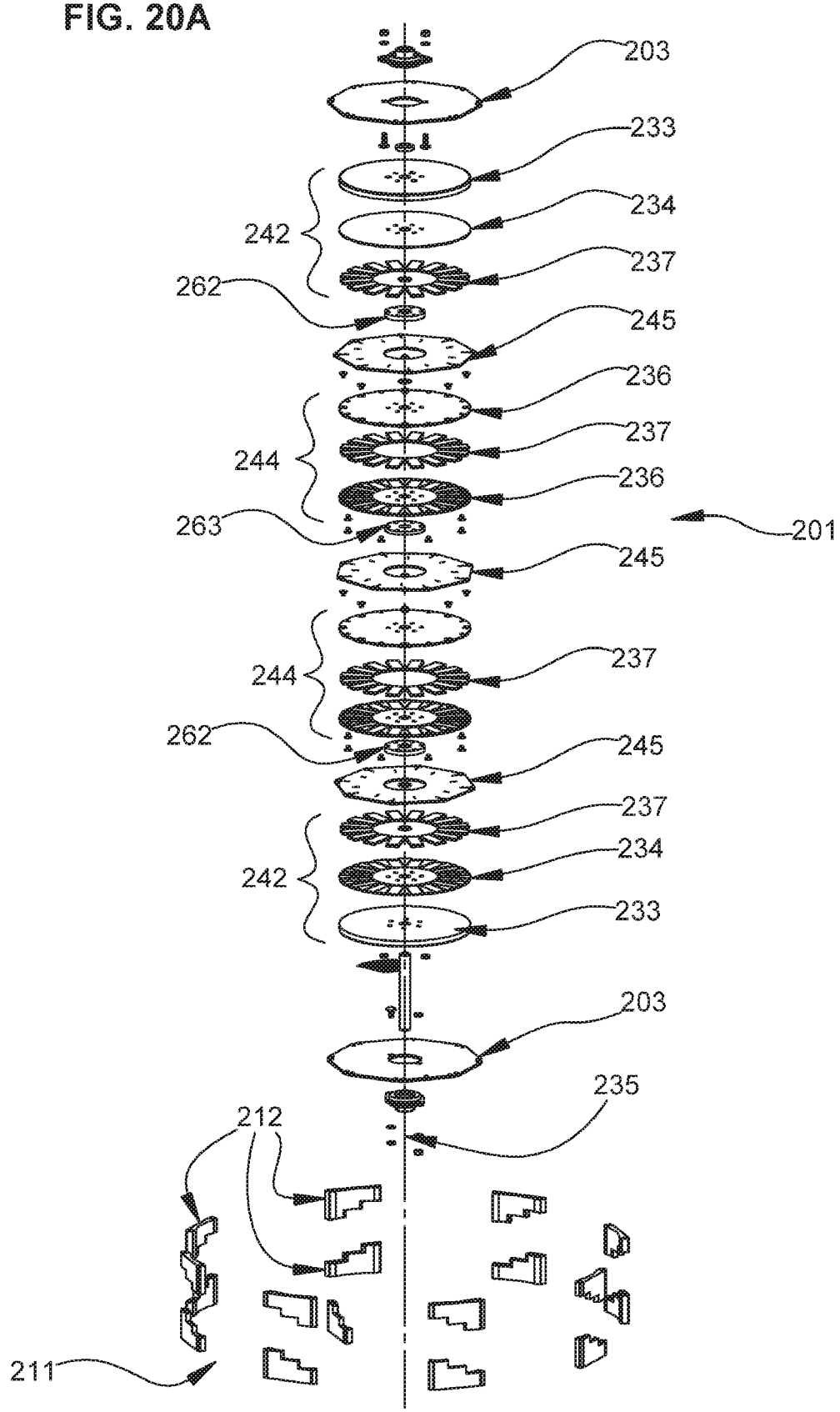
FIG. 20A is an exploded isometric view of an embodiment of the module of FIGS. 18 and 19.
Figure 20B:
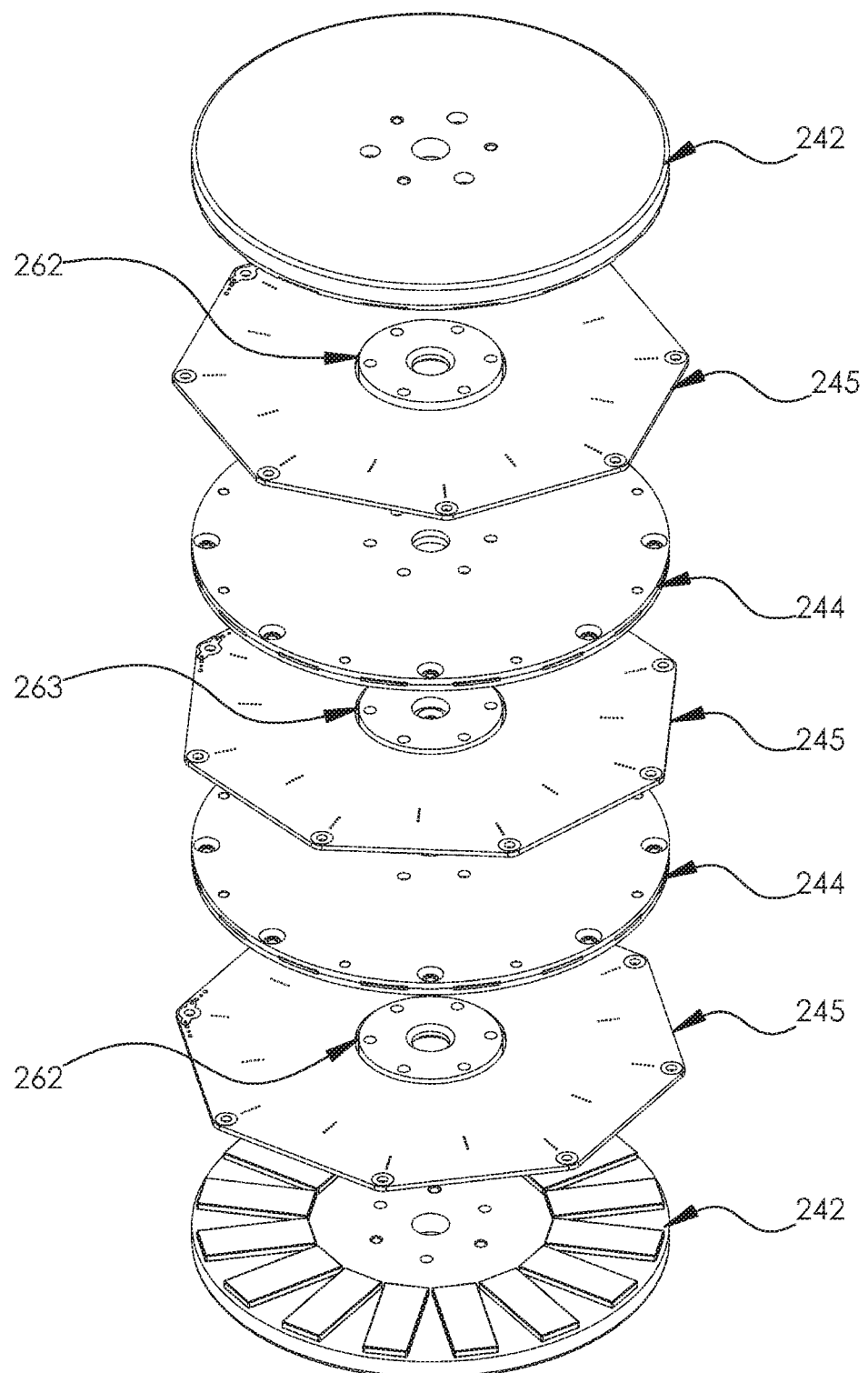
Figure 20C:
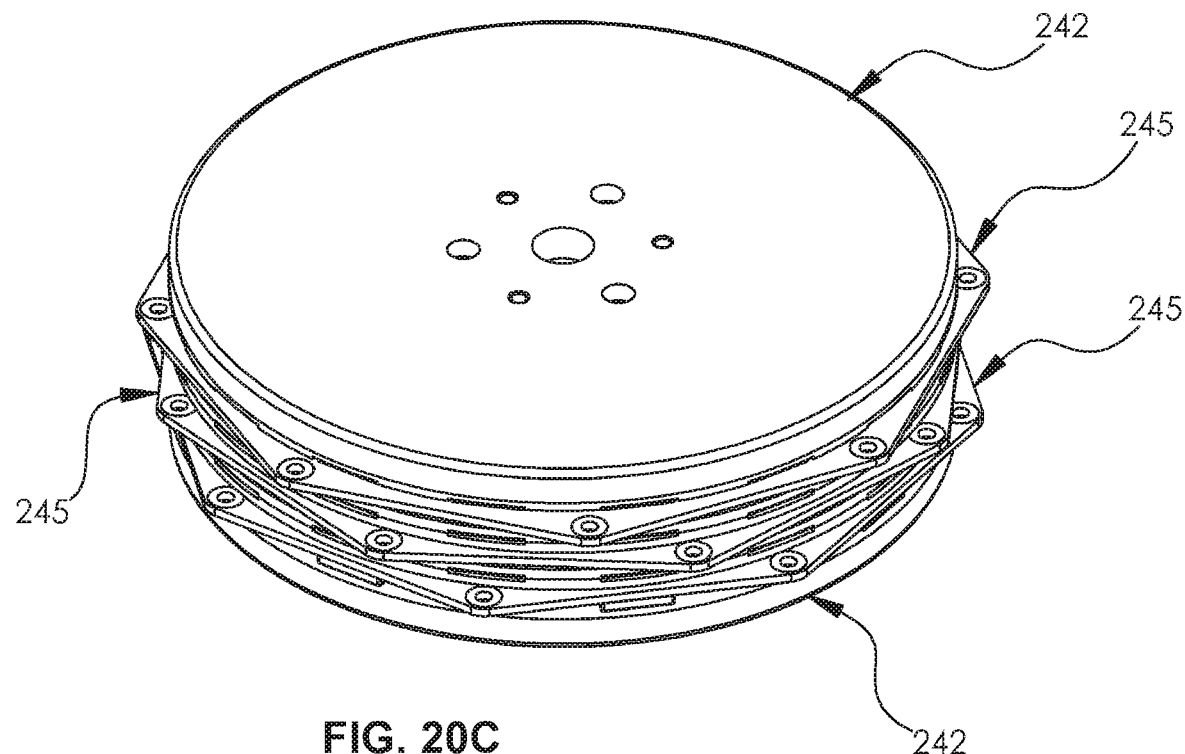
Figure 20D:
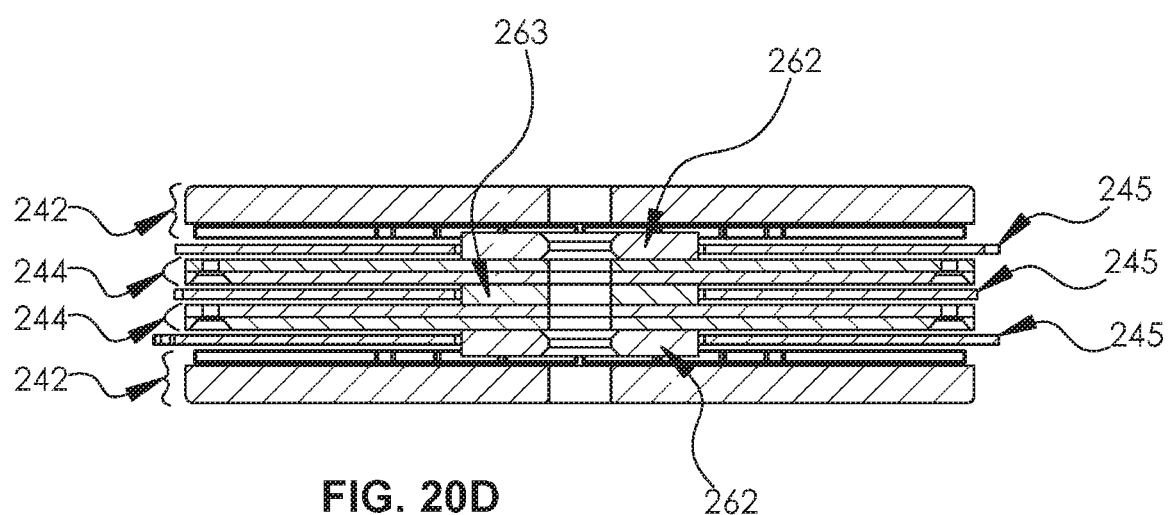
Figure 20G:
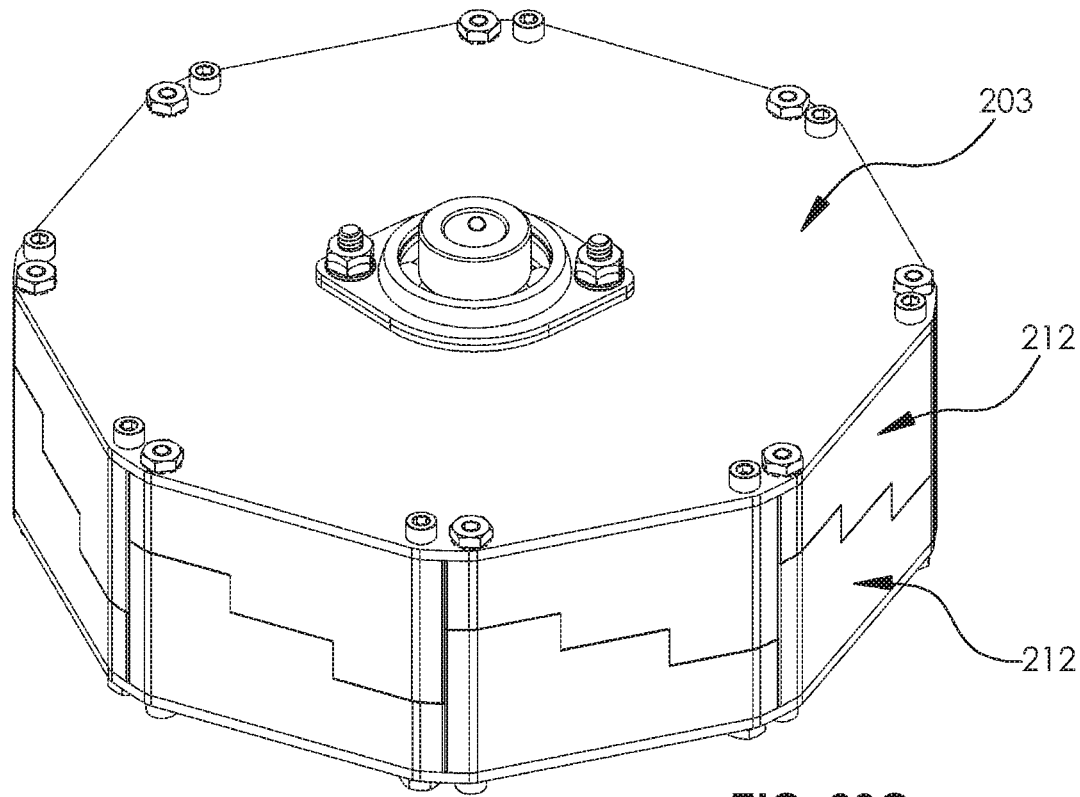
Figure 20H:
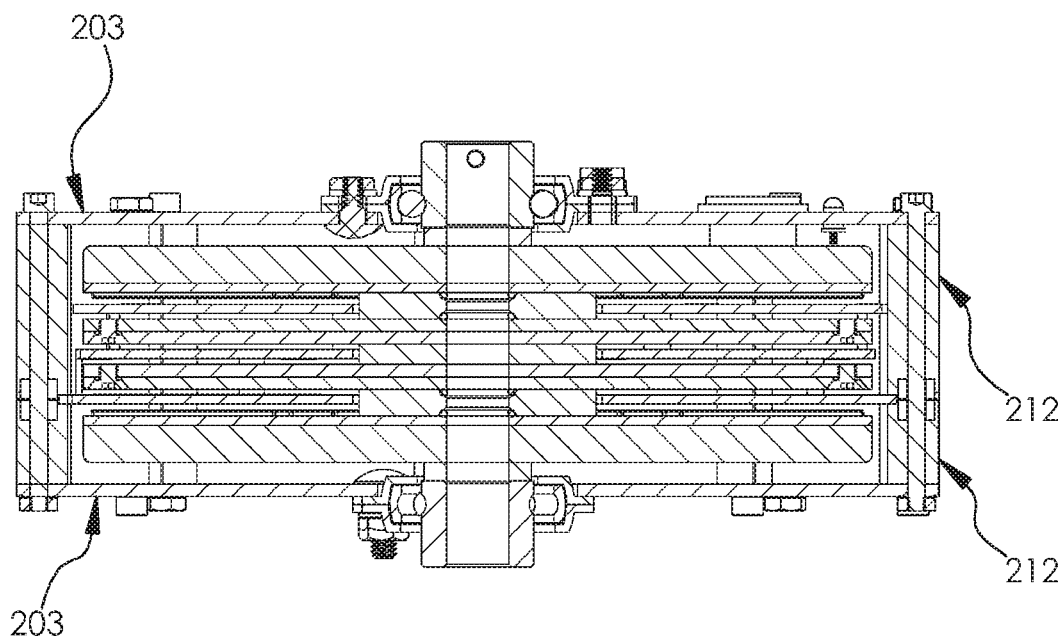

In another version, each PCB layer 147 can include only linear traces 149 (FIGS. 15-17). Linear traces 149 can be continuous from an outermost trace 152 to a concentric innermost trace 154. In one example, no trace 149 of the PCB layers 147 is non-linear. However, embodiments of the only linear traces 149 can include turns, such as, for example, rounded corners or chamfered corners. As used herein, a "turn" includes a trace portion connecting a radial trace to an end turn trace. In other embodiments, the PCB layer 147 can include one or more non-linear, such as curvilinear traces.

As noted herein, the PCB 145 can include a plurality of PCB layers 147 that are spaced apart from each other in the axial direction. The PCB layers 147 can comprise layer pairs 157 (FIG. 17; see pairs 157.1 to 157.4). Each layer pair 157 can be defined as two PCB layers that are electrically coupled together. In one version, at least one of the PCB layers 147 is electrically coupled to another PCB layer 147 in series or in parallel. In another version, at least one layer pair 157 is electrically coupled to another layer pair 157 in series or in parallel. In one embodiment, at least one of the layer pairs 157 comprises two PCB layers 147.6 and 147.7 that are axially adjacent to each other. In another embodiment, at least one of the layer pairs 157 comprises two PCB layers 147.1 and 147.3 that are not axially adjacent to each other. Similarly, at least one of the layer pairs 157 can be axially adjacent to the layer pair 157 to which said at least one of the layer pairs is electrically coupled. Conversely, at least one of the layer pairs 157 can be not axially adjacent to the layer pair 157 to which said at least one of the layer pairs 157 is electrically coupled.

Embodiments of the PCB layers 147 can include at least one layer set 181 (FIG. 17). For example, layer set 181 can include a first layer 147.1, a second layer 147.2, a third layer 147.3 and a fourth layer 147.4. In some versions, a first via 159 can couple the first layer 147.1 to the third layer 147.3, a second via 155 can couple the third layer 147.3 to the second layer 147.2, and a third via 159 can couple the second layer 147.2 to the fourth layer 147.4. In one example, the first, second and third vias 159, 155, 159 are the only vias that intra-couple the layer set 181. In these examples, the two, directly axially adjacent PCB layers 147.1 and 147.2 are not directly electrically coupled to each other. In FIG. 17 each of the vias 159 couples a pair of non-adjacent PCB layers 147 while bypassing (i.e., making no contact to) the intervening PCB layer 147. For example, via 159.1 couples PCB layer 147.1 to PCB layer 147.3, and makes no contact with PCB layer 147.2. Conversely, each of the vias 155 couples a pair of adjacent PCB layers 147. For example, via 155.2 couples PCB layer 147.2 to PCB layer 147.3. Each via 155, 159 that couples together a respective pair of PCB layers, forms a corresponding layer pair 157. For example, layer pair 157.1 includes PCB layer 147.1 and PCB layer 147.3. Layer pair 157.2 includes PCB layer 147.2 and PCB layer 147.3. Layer pair 157.3 includes PCB layer 147.2 and PCB layer 147.4. Layer pair 157.4 includes PCB layer 147.4 and PCB layer 147.5. Layer pair 157.5 includes PCB layer 147.5 and PCB layer 147.7. Layer pair 157.6 includes PCB layer 147.6 and PCB layer 147.7. Layer pair 157.7 includes PCB layer 147.6 and PCB layer 147.8.

In FIG. 17, each via is shown having a blunt end and a pointed end. This shape is not intended to imply any structural difference between the two ends of each via, but rather is intended to provide a consistent indication of the direction of current flow through each via. Moreover, while each via is also shown as extending vertically only as far as necessary to couple the corresponding pair of PCB layers 147, in certain embodiments each via can be implemented as a plated through-hole via extending through the entire PCB (e.g., see vias 59 in FIG. 6D). Each of such plated through-hole vias can make contact with any PCB layer 147 having a trace 149 that overlaps such a via. In the embodiment shown in FIG. 17, a given through-hole via overlaps and makes a connection with only two PCB layers 147, while the traces 149 of all remaining PCB layers 147 do not overlap the given via and are not connected to the given via. Alternatively, some embodiments can include buried vias that vertically extend only between the corresponding PCB layers 147 to be connected.

III. Modules

FIGS. 18, 19, 20A-20H disclose embodiments of a module 201 for one or more axial field rotary energy devices 231. Device(s) 231 can comprise any of the axial field rotary energy device embodiments disclosed herein. In the embodiments shown in these figures, the module 201 includes a housing 203 having a side wall 211, three stators (shown as PCB stator panel 245), and four rotor assemblies 242, 244. Each rotor assembly 244 is vertically disposed between two stators 245, and includes a pair of identical rotor panels 236 and a group of rotor permanent magnets 237. Each rotor panel 236 includes a set of recessed indentations to position each of the rotor magnets 237, and the two rotor panels 236 are secured together to sandwich each of the group of rotor magnets between the opposing upper and lower rotor panels 236. Each rotor assembly 242 is vertically disposed between a stator 245 and a housing 203, and includes a torque plate 233, a rotor panel 234, and a group of rotor permanent magnets 237.

The vertical spacing between rotor assemblies (e.g., 242, 244) is maintained by spacers (e.g., 262, 263) that extend from one rotor assembly to the adjacent rotor assembly through a hole in the intervening stator panel 245. The rotor spacing corresponds to the thickness of the stator panel 245 and the desired air gap spacing (such as above and/or below) the stator panel 245. Each rotor spacer can define the air gap between the rotor assembly and the stator (and also can define the height 215 of the side wall slots, as noted below). Each rotor spacer is positioned between two rotor assemblies. For example, rotor spacer 262 is positioned between the uppermost rotor assembly 242 and the adjacent inner rotor assembly 244 (and likewise for the lowermost rotor assembly 242). Each rotor spacer 263 is positioned between adjacent inner rotor assemblies 244. As is depicted here, such rotor spacer 263 can have a different thickness as rotor spacer 262, due to mechanical differences in the uppermost and lowermost rotor assemblies 242 relative to the inner rotor assemblies 244, to define the same air gap spacing between all rotors and stators. The use of the rotor spacers 262, 263 enables stacking multiple rotors (e.g., rotor assemblies 242, 244), which can provide significant flexibility in the configuration of module 201.

Figure 25:
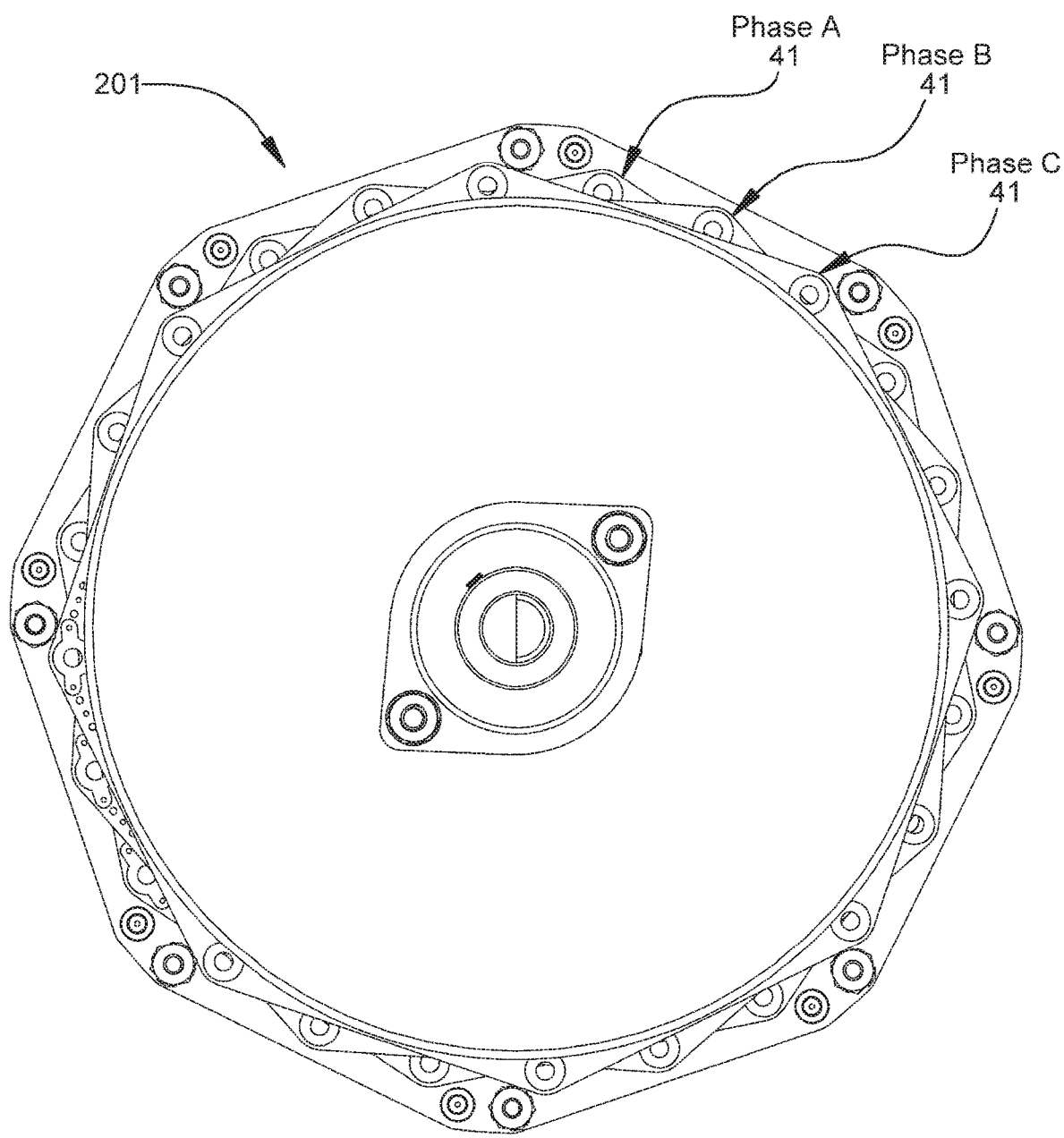
FIG. 25 is a top, interior view of an embodiment of a module.

Embodiments of the housing 203 can include a side wall 211 (FIGS. 20A-20H and 21). Side wall 211 can be configured to orient the stator (e.g., stator panel 245) at a desired angular orientation with respect to the axis 235. For applications including a plurality of stators 245, the side wall 211 can comprise a plurality of side wall segments 212. The side wall segments 212 can be configured to angularly offset the plurality of stators 245 at desired electric phase angles (see, e.g., FIGS. 20C and 25) for the module 201, relative to the axis. In one example, the side wall 211 can include a radial inner surface having one or more slots 214 formed therein. Each slot 214 can be configured to receive and hold the outer edge of the stator 245 to maintain the desired angular orientation of the stator 245 with respect to the axis 235. In the embodiment shown in FIGS. 20A-20H, each side wall 211 includes three slots 214 formed between mating pairs of side wall segments 212. In some embodiments the upper and lower sidewall segments 212 of such mating pair are identical and thus can be used interchangeably, but in other contemplated embodiments the upper and lower side wall segments 212 can be different due to asymmetrical slots 214, differences in mounting hole placement, or some other aspect.

In addition to providing the angular offset of the stators 245 as described above, the slots 214 can be configured to axially, such as vertically, position the outer edge of each stator 245 at prescribed axial positions with respect to other stators 41. Since the rotor spacers 262, 263 determine the axial spacing between each stator 245 (at the innermost extent thereof) and the corresponding rotor assembly (e.g., 242, 244 in FIGS. 20A, 20B, and 20D) on either axial side (e.g., above and below) each stator 245, the combination of the side wall slots 214 (i.e., the height 215 of such slots 214) and the rotor spacers 262, 263 serve to maintain a precise air gap spacing between stators 245 and rotor assemblies 242, 244. In other embodiments having a single stator 245, each side wall segment 212 can be configured to provide one side wall slot 214. The group of side wall segments 212 together provide numerous slots 214 (e.g., eight such slots 214) radially spaced around the module 201. Collectively such side wall slots 214 can be viewed as facilitating the air gap spacing between the stator and the adjacent rotor.

Versions of the module 201 can include a housing 203 having mechanical features (e.g., keyed shafts 209 in FIG. 21) configured to mechanically couple the housing 203 to a second housing 203 of a second module 201. In addition, housing 203 can be configured with electrical elements (e.g., electrical connector couplings 204 in FIGS. 21 and 22) to electrically couple the housing 203 to the second housing 203. In one example, the module 201 is air cooled and is not liquid cooled. In other versions, liquid-cooled embodiments can be employed.

Figure 22:
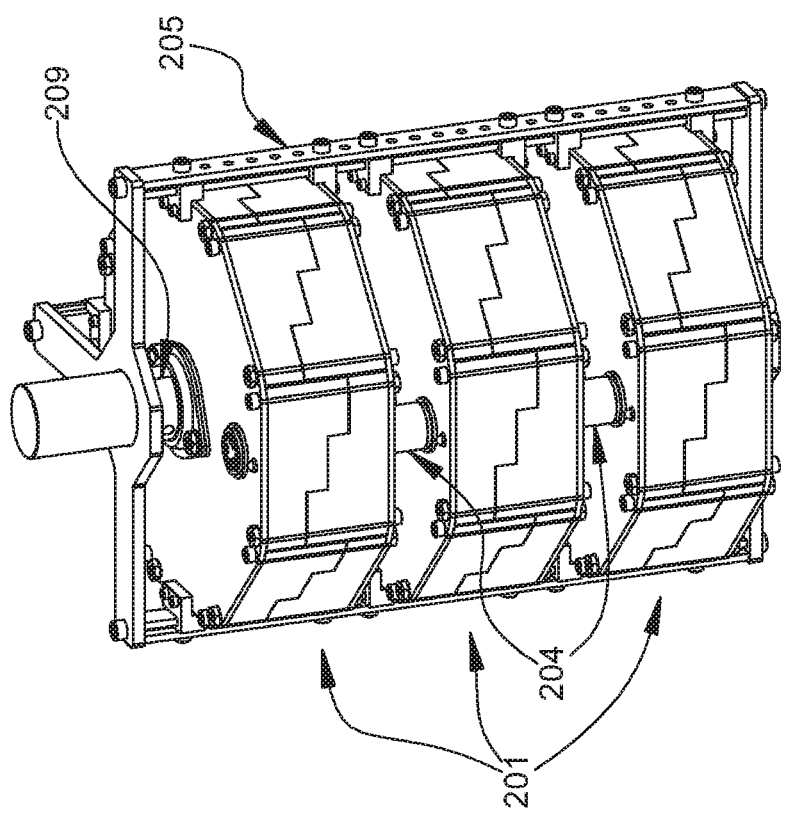
FIG. 22 is an assembled isometric view of an embodiment of the module of FIG. 21.
Figure 21:
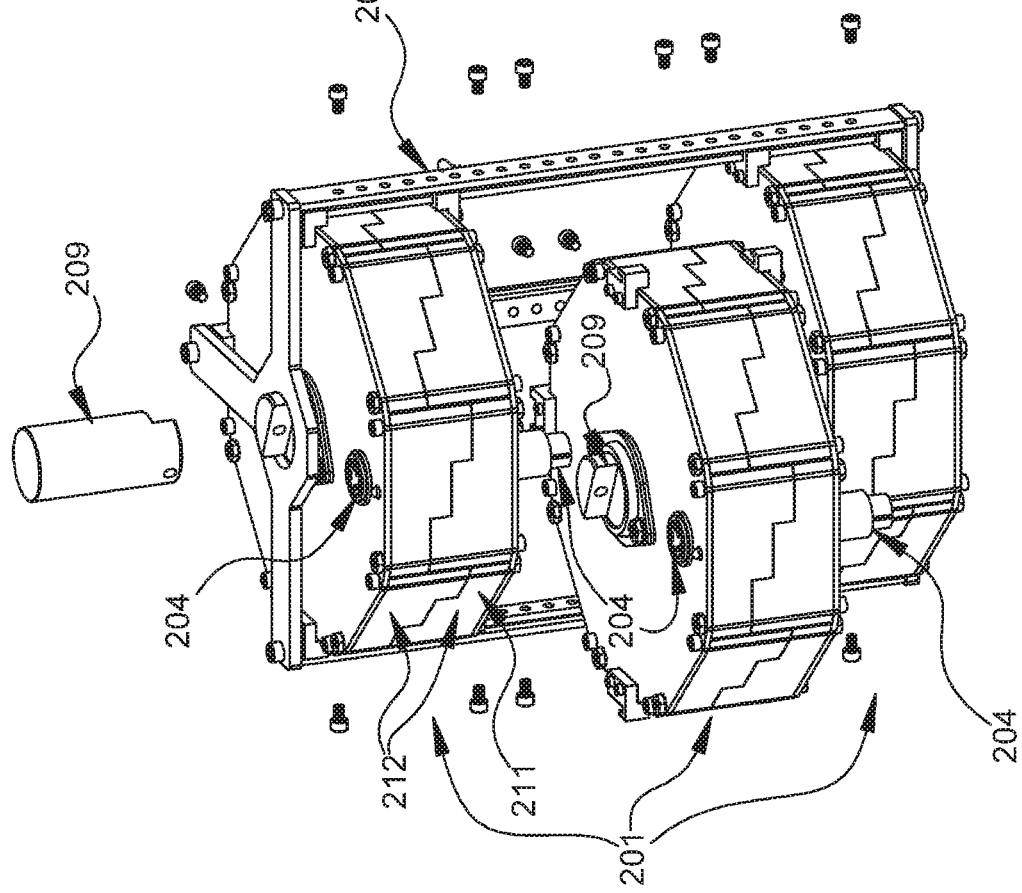
FIG. 21 is an exploded isometric view of another embodiment of a module.

In some examples, the module 201 can be configured to be indirectly coupled to the second module 201 with an intervening structure, such as a frame 205 (FIGS. 21-22). The module 201 can be configured to be directly coupled to the frame 205, such that the module 201 is configured to be indirectly coupled to the second module 201 with other components depending on the application. In another example, the module 201 can be configured to be directly coupled to the second module 201 without a frame, chassis or other intervening structure.

In some embodiments, at least one rotor 233, at least one magnet 237 and at least one stator 241 having at least one PCB 245 with at least one PCB layer 147 having at least one trace 149, can be located inside and surrounded by the housing 203.

In some versions, each module 201 consists of a single electrical phase. In other versions each module 201 comprises a plurality of electrical phases. Examples of each module 201 can include a plurality of PCB panels 245 (FIGS. 20A-20H). Each PCB panel 245 can comprise a single electrical phase or a plurality of electrical phases. The PCB panels can be unitary panels or can comprise stator segments as described elsewhere herein.

In one version, the module 201 and the second module 201 can be configured to be identical to each other. In another version, the module 201 and the second module 201 can differ. For example, the module 201 can differ from the second module 201 by at least one of the following variables: power input or output, number of rotors 233, number of magnets 237, number of stators 41 (see previous drawings), number of PCBs 245, number of PCB layers 47 (see previous drawings), number of traces 49 (see previous drawings), and angular orientation with respect to the axis 235. For example, in some embodiments one or more of these variables can be modified to achieve differences in power efficiency, torque, achievable revolutions per minute (RPM), so that different modules 201 can be utilized to better tailor operation as a function of the load or other desired operating parameter.

Figure 23:
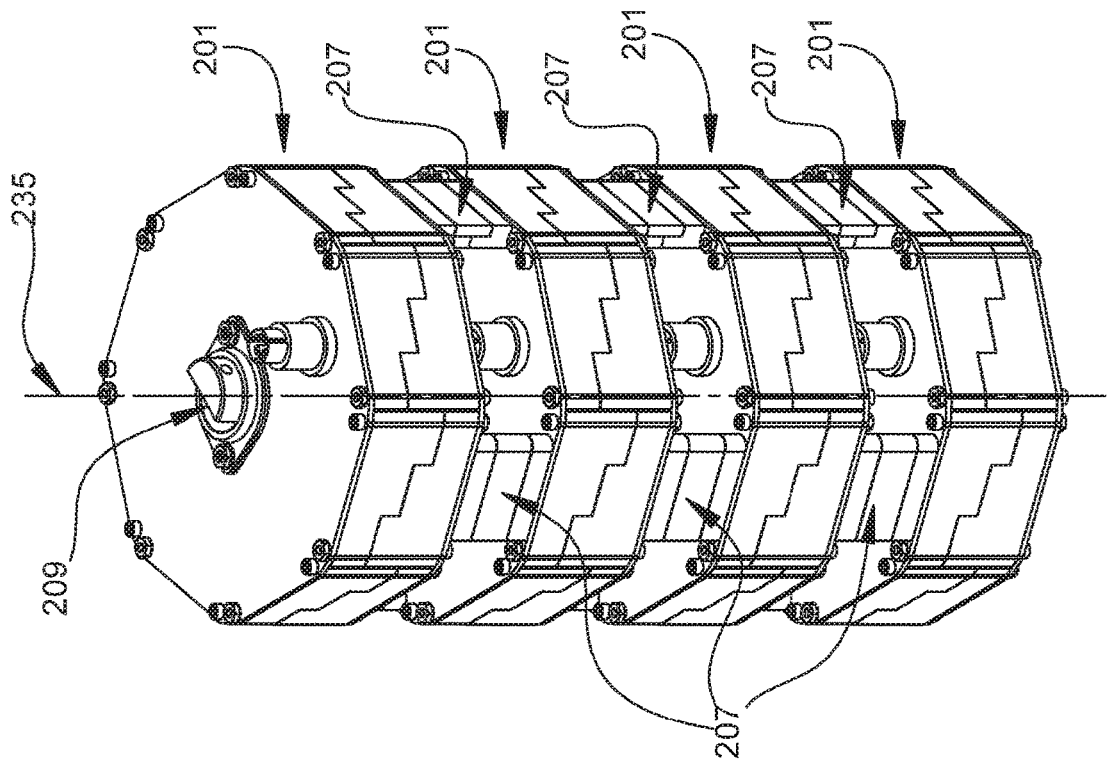
FIGS. 23 and 24 are isometric views of an embodiment of stacked modules with latches open and closed, respectively.
Figure 24:
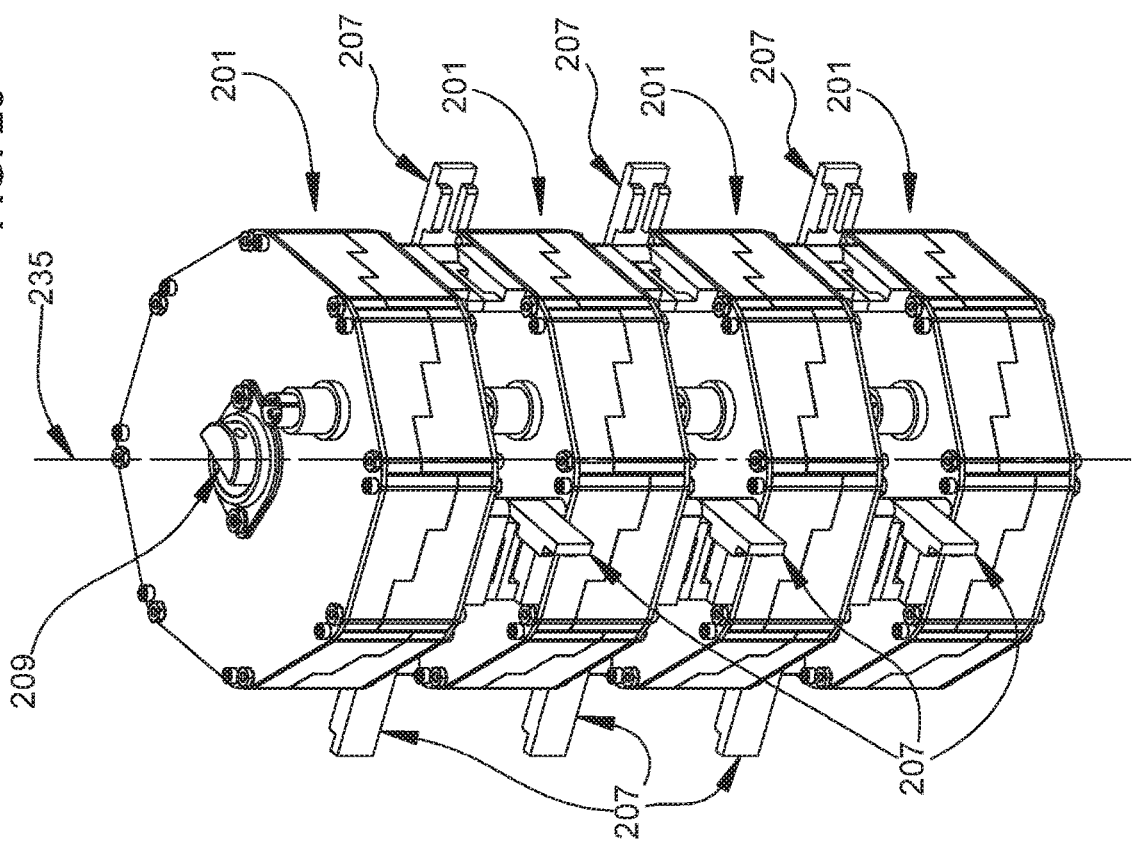

Some embodiments of the module 201 can include at least one latch 207 (FIGS. 23 and 24) configured to mechanically secure the modules together. FIG. 23 depicts modules nested together with the latches 207 open, and FIG. 24 depicts modules nested together with the latches 207 closed. In one example, the latches 207 can be symmetrically arrayed with respect to the axis 235. In another version, a top module (not shown) can be configured to be axially on top of another module, and the top module can differ structurally from the second module. For example, the top module 201 can include latches 207 only on its bottom side, and omit such latches 207 on its top side. As another example, the shaft 209 can extend from the bottom module 201, but not from the top module 201.

As shown in FIGS. 21-24, the module 201 can include a keyed shaft 209. Module 201 can be mounted to the keyed shaft which can be configured to mechanically couple to another module 201.

Some embodiments can further comprise a body 213 (FIG. 26) (also referred to herein as an "enclosure"). Body 213 can be configured to contain and coaxially mount a plurality of the modules 201 within the body 213. In the example illustrated, the body 213 comprises two halves that are coupled together with fasteners. For versions where each module 201 comprises a single electrical phase, and the body 213 can be configured to maintain the modules 201 at a desired electrical phase angle with respect to the axis 235. For versions where the body 213 comprises a plurality of electrical phases, and the body 213 can be configured to maintain the modules 201 at desired electrical phase angles with respect to the axis 235.

In other versions, there can be a plurality of bodies 213. Each body 213 can include mechanical features such as coupling structures configured to mechanically couple each body 213 to at least one other body 213, and electrical elements configured to electrically couple each body 213 to at least one other body 213. Each body 213 can be configured to directly or indirectly couple to at least one other body 213.

In some generator embodiments, a body (or more than one intercoupled bodies) can include a number of electrical phases (such as about 4 to 99; e.g., at least 10, 11, 12, 13, 14, 15 or more) electrical phases of alternating current output. Thus, the AC current output can act like a DC-like output ripple without being rectified or requiring a power conversion. In other versions, such AC current output can be rectified.

Embodiments of a system for providing energy also are disclosed. For example, the system can include a plurality of modules 201 comprising axial field rotary energy devices. The modules 201 can be interchangeably connectable to each other to configure the system for a desired power output. Each module can be configured based on any of the embodiments described herein. The system can comprise a generator or a motor. Embodiments of the system can include at least two of the modules 201 configured to differ. For example, the modules 201 can differ from each other by at least one of the following variables: power output or input, number of rotors, number of magnets, number of stators, number of PCBs, number of PCB layers, number of coils, and angular orientation with respect to the axis.

Embodiments of a method of repairing an axial field rotary energy device are disclosed as well. For example, the method can include the following steps: providing a body 213 having a plurality of modules 201. Each module 201 can be configured as described for any of the embodiments disclosed herein. The method also can include mechanically and electrically coupling the modules 201 such that the modules 201 are coaxial; operating the axial field energy device; detecting a problem with one of the modules 201 and stopping operation of the axial field energy device; opening the body 213 and de-attaching the problem module 201 from all other modules 201 to which the problem module 201 is attached; installing a replacement module 201 in the body 213 in place of the problem module 201 and attaching the replacement module 201 to the other modules 201 to which the problem module 201 was attached; and then re-operating the axial field energy device.

Other embodiments of the method include angularly aligning the modules to at least one desired electrical phase angle with respect to the axis. In another version, the method can include providing a plurality of bodies 213, and mechanically and electrically coupling the bodies 213.

Still other embodiments of a method of operating an axial field rotary energy device can include providing an enclosure having a plurality of modules, each module comprises a housing, rotors rotatably mounted to the housing, each rotor comprises an axis and a magnet, stators mounted to the housing coaxially with the rotors, each stator comprises a printed circuit board (PCB) having a coil, each stator consists of a single electrical phase, and selected ones of the stators are set at desired phase angles with respect to the axis; mechanically and electrically coupling the modules such that the modules are coaxial within the enclosure; and then operating the axial field energy device. In other words, setting the single phase stators at the same phase angle can form a single phase machine, and setting the single phase stators at varying phase angles can form a multi-phase machine (or more than 2 phases).

Optionally, the enclosure and each module can comprise a single electrical phase, and the method can comprise angularly aligning the modules at a desired electrical phase angle with respect to the axis. The method can include the enclosure with a plurality of electrical phases, each module comprises a single electrical phase, and angularly orienting the modules at desired electrical phase angles with respect to the axis. The enclosure and each module can include a plurality of electrical phases, and angularly misaligning the modules at desired electrical phase angles with respect to the axis.

Some versions of the method can include providing a plurality of bodies, and the method further comprises mechanically and electrically coupling the bodies to form an integrated system. Each module can include a plurality of stators that are angularly offset from each other with respect to the axis at desired electrical phase angles. In one example, each stator consists of only one PCB. In other examples, each stator comprises two or more PCBs that are coupled together to form each stator. In still another version, the enclosure can have a number electrical phases of alternating current (AC) output that is substantially equivalent to a clean direct current (DC)-like ripple without a power conversion, as described herein.

In other versions, a method of repairing an axial field rotary energy device can include providing a plurality of bodies that are coupled together, each enclosure having a plurality of modules, each module comprising a housing, a rotor rotatably mounted to the housing, the rotor comprises an axis and a magnet, a stator mounted to the housing coaxially with the rotor, and the stator comprises a printed circuit board (PCB); mechanically and electrically coupling the modules; operating the axial field rotary energy device; detecting an issue with a first module in a first enclosure and stopping operation of the axial field rotary energy device; opening the first enclosure and disassembling the first module from the first enclosure and any other module to which the first module is attached; installing a second module in the first enclosure in place of the first module and attaching the second module to said any other module to which the first module was attached; and then re-operating the axial field rotary energy device.

Embodiments of each module can have only one orientation within the enclosure, such that each module can be installed or uninstalled relative to the enclosure in singular manners. The purpose of such designs is so the person doing work on the system cannot re-install new modules into an existing system the wrong position. It can only be done in only one orientation. The method can occur while operation of the AFRED is suspended, and treatment of the first module occurs without interrupting said any other module, and without modifying or impacting said any other module.

FIG. 27 depicts another embodiment of a PCB stator 311 for an axial field rotary energy device, such as those disclosed herein. PCB stator 311 comprises a substrate having one or more traces 313 that are electrically conductive. In the version shown, PCB stator 311 comprises eight coils of traces 313. In addition, PCB stator 311 can comprise more than one layer of traces 313. The traces 313 on each layer are co-planar with the layer. In addition, the traces 313 are arrayed about a central axis 315 of the PCB stator.

FIG. 28 is an enlarged top view of a portion of the PCB stator of FIG. 27. In the embodiment shown, each trace 313 comprises radial portions 317 (relative to axis 315) and end turns 319 extending between the radial portions 317. Each trace 313 can be split with a slit 321. In some versions, only radial portions 317 comprise slits 321. Slits 321 can help reduce eddy current losses during operation. Eddy currents oppose the magnetic field during operation. Reducing eddy currents increases magnetic strength and increases efficiency of the system. In contrast, wide traces can allow eddy currents to build. The slits in the traces 313 can reduce the opportunity for eddy currents to form. The slits can force the current to flow through the traces 313 more effectively.

The axial field rotary energy device can comprise a "smart machine" that includes one or more sensors integrated therewith. In some embodiments, such a sensor can be configured to monitor, detect, or generate data regarding operation of the axial field rotary energy device. In certain embodiments, the operational data can include at least one of power, temperature, rate of rotation, rotor position, or vibration data.

Versions of the axial field rotary energy device can comprise an integrated machine that includes one or more control circuits integrated therewith. Other versions of the axial field rotary energy device can comprise a fully integrated machine that includes one or more sensors and one or more control circuits integrated therewith. For example, one or more sensors and/or control circuits can be integrated with the PCB and/or integrated with the housing. For motor embodiments, these control circuits can be used to drive or propel the machine. For example, in some motor embodiments, such a control circuit can include an input coupled to receive an external power source, and can also include an output coupled to provide a current flowing through one or more stator coils. In some embodiments the control circuit is configured to supply torque and/or torque commands to the machine. In some generator embodiments, such a control circuit can include an input coupled to receive the current flowing through the coil, and can also include an output coupled to generate an external power source.

For example, one or more sensors and/or control circuits can be integrated with the PCB stator 311. FIG. 29 shows another exemplary stator 340 having integrated sensors (e.g., 342, 346) that are attached to its uppermost PCB layer 47. One such sensor 342 is coupled to a secondary coil 344 that can be used to transmit/receive data to/from an external device, and can be also used to couple power to the sensor 342. In some embodiments the secondary coil can be configured to utilize magnetic flux developed during operation to provide power for the sensor 342. In some embodiments the secondary coil can be configured to receive inductively coupled power from an external coil (not shown). The secondary coil 344 may also be referred to herein as a micro-coil, or a miniature coil, as in certain embodiments such a secondary coil can be much smaller than a stator coil 49, but no relative size inference is intended. Rather, such a secondary coil 344 is distinct from the stator coils 49 that cooperate with the rotor magnets, as described above. Such a secondary coil integrated with the PCB stator 311 can, in certain embodiments, be disposed on the PCB stator 311 (e.g., fabricated on, or attached to, its uppermost PCB layer 47). Such a secondary coil integrated with the PCB stator 311 can, in certain embodiments, be disposed within (i.e., embedded within) the PCB stator 311. In some embodiments, the secondary coil 344 provides power to a sensor connected thereto. Such coupled power can be primary or auxiliary power for the sensor.

Sensor 346 is coupled to the first terminal 51 for one of the traces 49 on the upper PCB layer 47, and can sense an operating parameter such as voltage, temperature at that location, and can also be powered by the attached coil (e.g., one of the coils 49). Sensor 348 is coupled to an external terminal 350, and likewise can sense an operating parameter such as voltage, temperature at that location, and can also be powered by the voltage coupled to the external terminal 350. Sensor 350 is disposed at an outer edge of the PCB stator 340, but is coupled to no conductor on the PCB layer 47.

In some embodiments, such a sensor can be embedded directly in one of the coils 49 and can be electrically powered directly by the coil 49. In some embodiments, such a sensor can be powered and connected to the coil 49 through a separate connection that is disposed on or within the PCB layer 47, such as the connection between the first terminal 51 and sensor 346. Such a connection can be disposed on the PCB layer 47 or disposed within the PCB (e.g., on an internal layer of the PCB). In other embodiments, the sensor and/or circuitry can get power from an external power source. For example, one type of external power source can be a conventional wall electrical socket which can be coupled to the housing of the motor or generator.

The sensors can provide operators of generator or motor products with real time operational data as well as, in certain embodiments, predictive data on various parameters of the product. This can include how the equipment is operating, and how and when to schedule maintenance. Such information can reduce product downtime and increase product life. In some embodiments, the sensor can be integrated within the housing. In some examples, the sensors can be embedded within the PCB stator 340, as is shown in FIG. 30 (e.g., sensors 362, 366, 368, 372, and coil 364).

One example of a sensor for these applications is a Hall effect sensor. Hall effect sensors are used for proximity switching, positioning, speed detection, and current sensing applications. In its simplest form, the Hall effect sensor operates as an analog transducer, directly returning a voltage.

Another example of a sensor is an optical sensor. Optical sensors can measure the intensity of electromagnetic waves in a wavelength range between UV light and near infrared light. The basic measurement device is a photodiode. Combining a photodiode with electronics makes a pixel. In one example, the optical sensor can include an optical encoder that uses optics to measure or detect the positions of the magnetic rotor.

Another example of a sensor is a thermocouple sensor to measure temperature. Thermocouples comprise two wire legs made from different metals. The wires legs are welded together at one end, creating a junction. The junction is where the temperature is measured. When the junction experiences a change in temperature, a voltage is created.

Another optional sensor is an accelerometer. Accelerometers are an electromechanical device used to measure acceleration forces. Such forces can be static, like the continuous force of gravity or, as is the case with many mobile devices, dynamic to sense movement or vibrations. Acceleration is the measurement of the change in velocity, or speed divided by time.

A gyro sensor, which functions like a gyroscope, also can be employed in these systems. Gyro sensors can be used to provide stability or maintain a reference direction in navigation systems, automatic pilots, and stabilizers.

The PCB stator 340 also can include a torque sensor. A torque sensor, torque transducer or torque meter is a device for measuring and recording the torque on a rotating system, such as the axial field rotary energy device.

Another optional sensor is a vibration sensor. Vibration sensors can measure, display and analyze linear velocity, displacement and proximity, or acceleration. Vibration, even minor vibration, can be a telltale sign of the condition of a machine.

In various embodiments, the sensors depicted in FIG. 29 and FIG. 30 can also represent control circuits integrated with the PCB stator 345. Such control circuits can be disposed on a surface of the PCB (analogously to the sensors depicted in FIG. 29), disposed within (i.e., embedded within) the PCB (analogously to the sensors depicted in FIG. 30), and/or integrated with or within the housing (e.g., housing 203 in FIG. 18).

In some generator embodiments, the control circuit can implement power conversion from an AC voltage developed in the stator coils to an external desired power source (e.g., an AC voltage having a different magnitude than the coils voltage, a DC voltage developed by rectifying the coils voltage). In some motor embodiments, the control circuit can implement an integrated drive circuitry that can provide desired AC current waveforms to the stator coils to drive the motor. In some examples, the integrated drive can be a variable frequency drive (VFD), and can be integrated within the same housing as the motor. The sensors and/or circuitry disclosed herein can be wirelessly or hard-wired to any element of, on or inside the housing. Alternatively, the sensors and/or circuitry can be located remotely relative to the housing. In an example, the control circuit 566 (FIG. 39) can comprise a circular, donut-like shape, similar to the PCB stators shown in the drawings. Such designs can facilitate and/or enable the device to retain its form factor.

Each of these sensors and control circuits can include a wireless communication circuit configured to communicate with an external device through a wireless network environment. Such wireless communication can be unidirectional or bidirectional, and can be useful for monitoring a status of the system, operating the system, communicating predictive data, etc. The wireless communication via the network can be conducted using, for example, at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM), as a cellular communication protocol.

Additionally or alternatively, the wireless communication can include, for example, short-range communication. The short-range communication can be conducted by, for example, at least one of wireless fidelity (WiFi), Bluetooth®, near field communication (NFC), or GNSS. GNSS can include, for example, at least one of global positioning system (GPS), Glonass® global navigation satellite system, Beidou® navigation satellite system, or Galileo®, the European global satellite-based navigation system. In the present disclosure, the terms 'GPS' and 'GNSS' are interchangeably used with each other. The network can be a communication network, for example, at least one of a computer network (for example, local area network (LAN) or wide area network (WAN)), the Internet, or a telephone network.

In certain embodiments, such a wireless communication circuit can be coupled to a secondary coil (e.g., secondary coil 344) to communicate telemetry information, such as the operational data described above.

FIGS. 31 and 32 show an embodiment of an assembly for mechanically coupling together stator segments 380 to form a stator. A clasp 382 slides over portions of a mounting pad 381 on two adjacent stator segments 380, which is secured by a pair of nuts on each of two bolts (e.g., bolt 384). The clasp 382 includes an alignment tab 392 that can be positioned into a side wall slot 214 as described above. The inner diameter edge of the two adjacent stator segments 380 slides into a channeled rotor spacer 390 in the shape of an annular ring. In some embodiments this rotor spacer 390 can ride on a thrust bearing with the rotor to allow the rotor spacer 390 and stator to remain stationary while the rotor rotates. In other embodiments a rotor spacer as described above (e.g., FIGS. 18, 20A-20H) can fit within the open center of the channeled rotor spacer 390.

Electrical connection between adjacent stator segments 380, 381 can be implemented using a wire 387 between respective circuits 386, 388. Circuit 386 can connect to a trace on the upper layer (or another layer using a via) of the stator segment 380. Similarly, circuit 388 can connect to a trace on any layer of the stator segment 381. Such circuits 386, 388 can include any of the sensors described above (FIGS. 29-30), but can also merely provide an electrical connection from the respective PCB to the wire 387. In other embodiments, electrical connection also can be made via the mounting surface of the PCB being a conductive material and connected to the coil and then coupling those components through the clasp, which also can include conductive material on the inner surface thereof.

Electrical connection can also be implemented using the clasp 382 in combination with an electrically conductive mounting pad 383. If the mounting pad 383 is continuous and unbroken, the clasps 382 can provide a common electrical connection around the circumference of the stator. If such mounting pads are discontinuous and broken into two pieces (as shown by the dash lines, with each piece coupled to a respective terminal of a trace on that segment, the clasps 382 can serially connect such stator segments.

The axial field rotary energy device is suitable for many applications. The PCB stator 340 can be configured for a desired power criteria and form factor for devices such as permanent magnet-type generators and motors. Such designs are lighter in weight, easier to produce, easier to maintain and more capable of higher efficiency.

Examples of permanent magnet generator (PMG) applications can include a wind turbine generator, micro-generator application, permanent magnet direct drive generator, steam turbine generator, hydro generator, thermal generator, gas generator, wood-fire generator, coal generator, high frequency generator (e.g., frequency over 60 Hz), portable generator, auxiliary power unit, automobiles, alternator, regenerative braking device, PCB stator for regenerative braking device, back-up or standby power generation, PMG for back up or standby power generation, PMG for military usage and a PMG for aerospace usage.

In other embodiments, examples of a permanent magnet motor (PMM) can include an AC motor, DC motor, servo motor, stepper motor, drone motor, household appliance, fan motor, microwave oven, vacuum machine, automobile, drivetrain for electric vehicle, industrial machinery, production line motor, internet of things sensors (IOT) enabled, heating, ventilation and air conditioning (HVAC), HVAC fan motor, lab equipment, precision motors, military, motors for autonomous vehicles, aerospace and aircraft motors.

Figure 33:
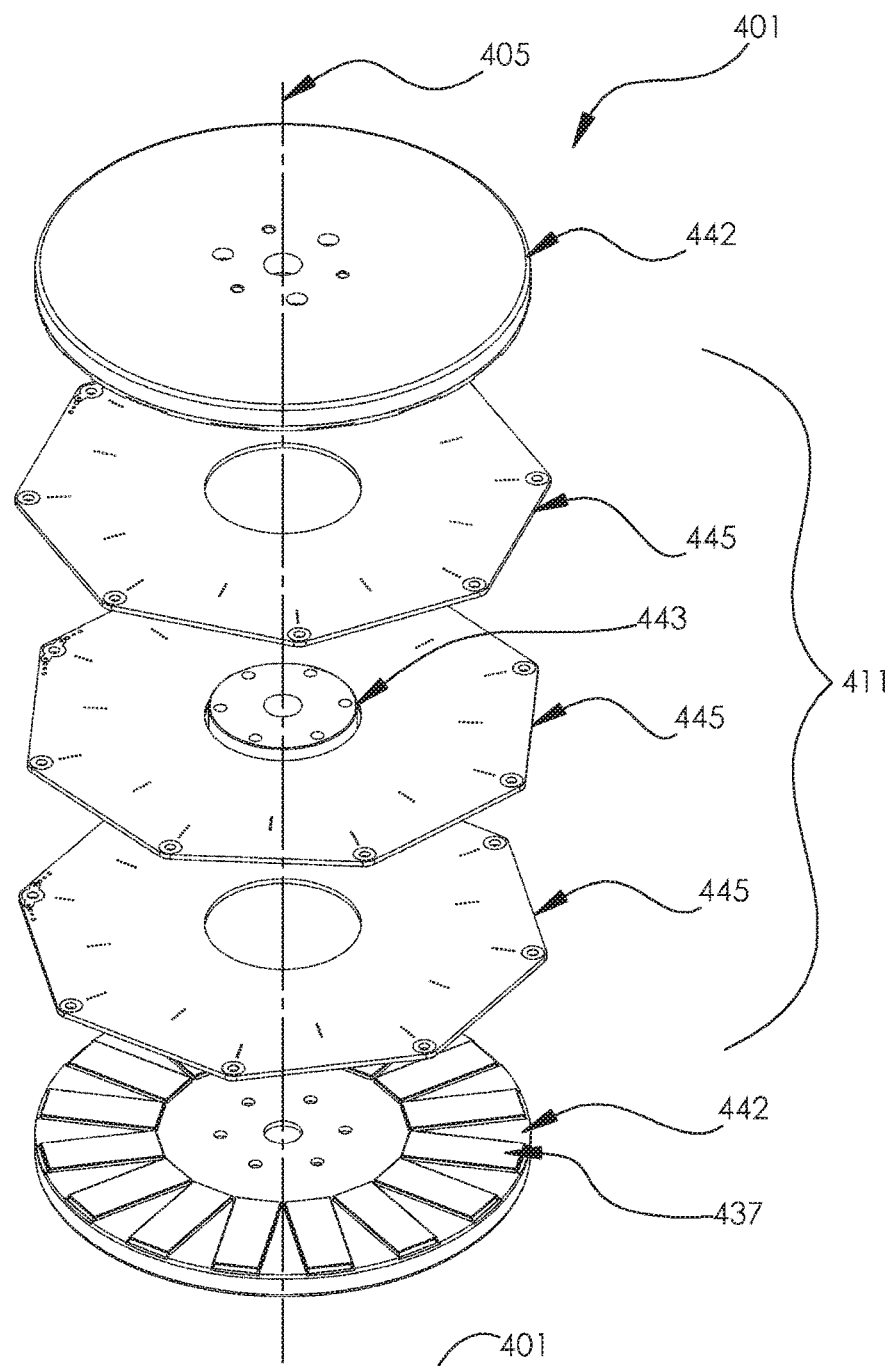
FIG. 33 is an exploded isometric view of another embodiment of a device.
Figure 34:
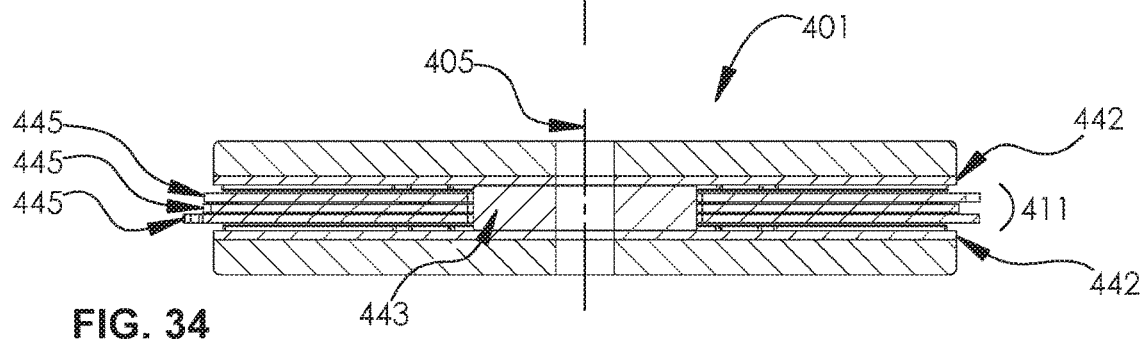
FIG. 34 is an axial sectional view of an embodiment of the device of FIG. 33.

FIGS. 33 and 34 depict another embodiment of an axial field rotary energy device 401. In these examples, the device 401 can include any of the features, elements or components disclosed herein. The illustrated version can include a housing (e.g., housing 203 in FIG. 18) having an axis 405 with an axial direction. A stator assembly 411 can include a plurality of stator panels 445 that are discrete panels from each other. The stator panels 445 can be mechanically and stationarily coupled to the housing. Each stator panel 445 can include a printed circuit board (PCB) having coils that are electrically conductive, as disclosed herein. Embodiments of each stator panel 445 can consist of a single electrical phase. The device 401 also can include rotors 442 rotatably mounted within the housing on opposite axial ends of the stator assembly 411. The rotors 442 can be mechanically coupled together with a component, such as a rotor spacer 443. Versions of each rotor 442 can include magnets 437. In some examples, no rotor 442 is disposed between axially adjacent ones of the stator panels 445.

The stator panels 445 can be coupled in an axially abutting relationship. Moreover, the stator panels 445 can be mechanically coupled directly to each other in the axially abutting relationship. In addition, the stator panels 445 can be rotationally aligned at a single angle with respect to the axis 405. In some examples, the stator panels 445 can be electrically coupled together to form a single electrical circuit for the device 401. In other embodiments of the device 401, no axial spacer is disposed between axially adjacent ones of the stator panels 445. As shown and described for other examples herein, the coils of the stator panels 445 can extend in a radial direction with respect to the axis 405, each coil can include edges that extend in the radial direction, and the coil edges can be substantially parallel to each other. In other words, the coils can have inner and outer opposing edges that are parallel to each other.

Embodiments of the device 401 can include the stator assembly 411 with a plurality of electrical phases. The stator panels 445 can be rotationally offset from each other relative to the axis 405. In some examples, the stator panels 445 are not electrically coupled together to form a single electrical circuit for the device 401. In one particular version, the stator assembly 411 can consist of only three stator panels 442. In another particular example, the rotors 442 can consist of only two rotors 442. The device 401 can further include a spacer (not shown) of any type (e.g., metal, paper, etc.) disposed between axially adjacent ones of the stator panels 445. Embodiments of the device 401 can further include axial spacers (not shown) between the stator assembly 411 and the rotors 442. Versions of the axial spacers can set axial air gap spacings between the stator assembly 411 and the rotors 442.

Figure 35:
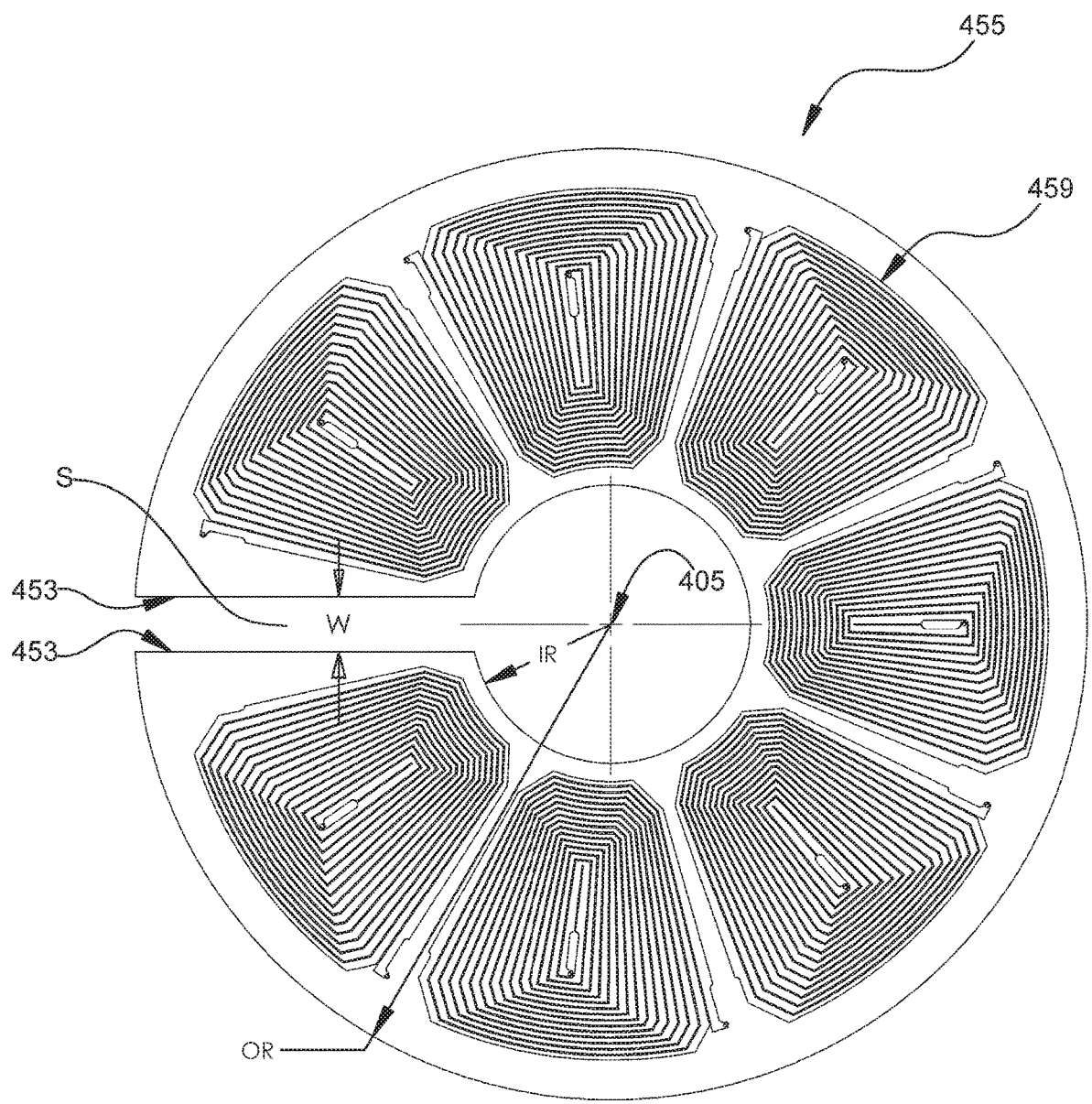
FIG. 35 is a top view of another embodiment of a stator panel.

As shown in FIG. 35, embodiments of the coils 459 can be asymmetrically arrayed about the axis 405. In some versions, each stator panel 455 can include an inner radius IR, an outer radius OR and a slot S extending continuously in a radial direction between the inner radius IR and the outer radius OR. In an example, the slot S can include a circumferential width W, relative to the axis 405, that is not less than a diameter of the rotor spacer (e.g., rotor spacer 443 in FIG. 33) that couples the rotors 442 together. Embodiments of the slot S can be defined by sidewalls 453 that are parallel to each other, and the circumferential width W can be consistent from the inner radius IR to the outer radius OR. In such versions, the slot S can be configured to remain void and unencumbered during operation of the device 401, such that no other component is located within the slot S during operation of the device 401.

Figure 36:
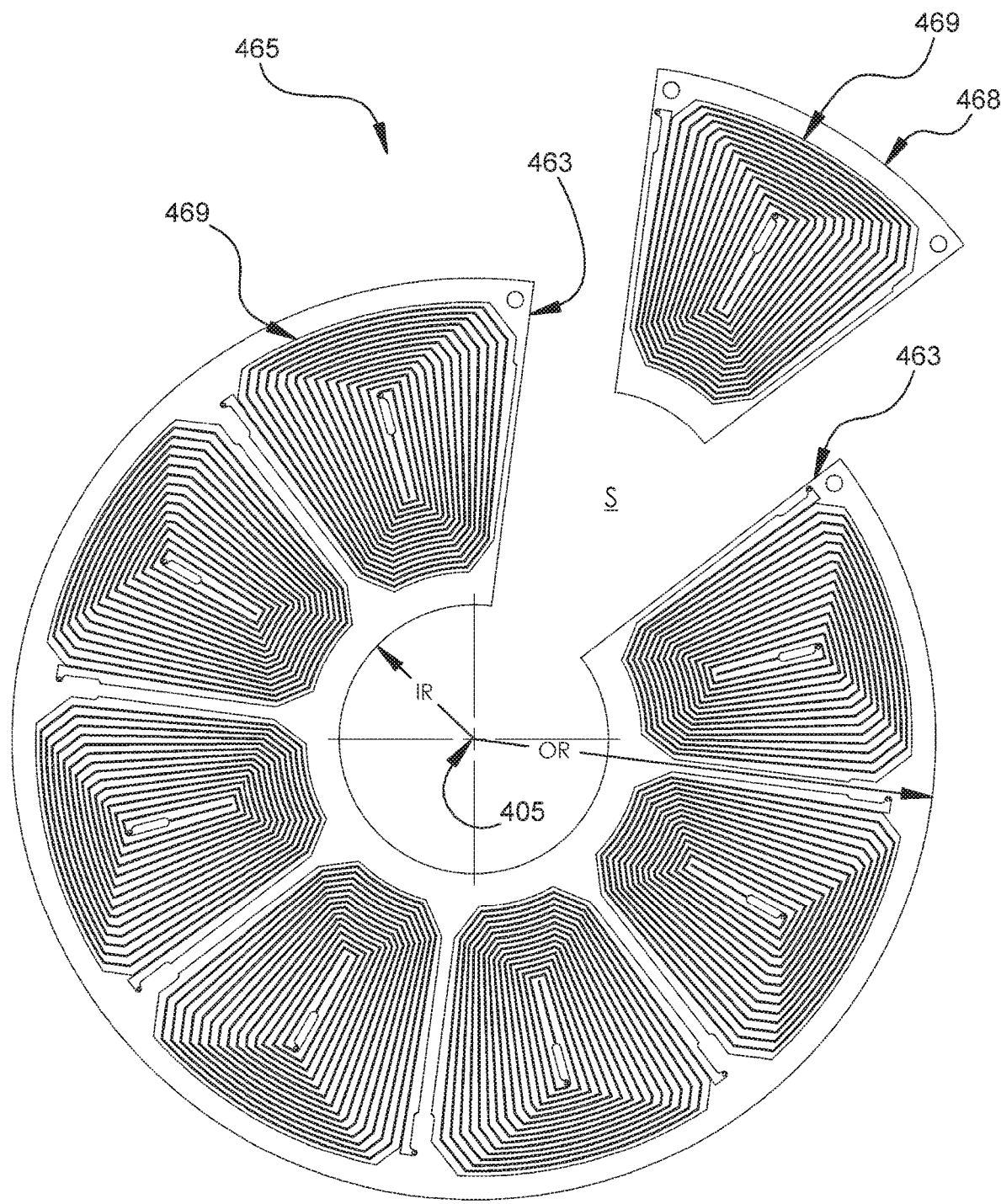
FIG. 36 is a top, exploded view of still another embodiment of a stator panel.

Alternatively, as shown in FIG. 36, an alternate embodiment of the slot S can be defined by sidewalls 463 that are not parallel, and the circumferential width W tapers from the inner radius IR to the outer radius OR. In some embodiments, at least one of the coils 469 of each of the stator panels 465 can be located on a stator panel segment 468 that include another PCB that is mechanically and electrically coupled to said each of the stator panels 465, respectively. Examples of each stator panel 465 can be configured to be individually removed from the stator assembly 411 (see, e.g., FIGS. 33 and 34) via the slot S without disassembling the rotors 442 from the axial field rotary energy device 401. In addition, respective ones of the stator panels 465 and stator panel segments 468 can be mounted to each other in a co-planar arrangement, for example.

In a particular embodiment, the device 401 can include a mismatched number of pluralities of stators panels and rotors. For example, the device can have two stator panels and one rotor, three stator panels and two rotors, five stator panels and two rotors, etc., In some versions, no rotor is interleaved within the stator assembly 411 (i.e., axially disposed between axially adjacent ones of the stator panels). Moreover, the device 401 can comprise a single electrical phase or more than one electrical phase. Other embodiments can include an enclosure with two or more devices 401 (which can be identical) located within the enclosure.

Figure 37:
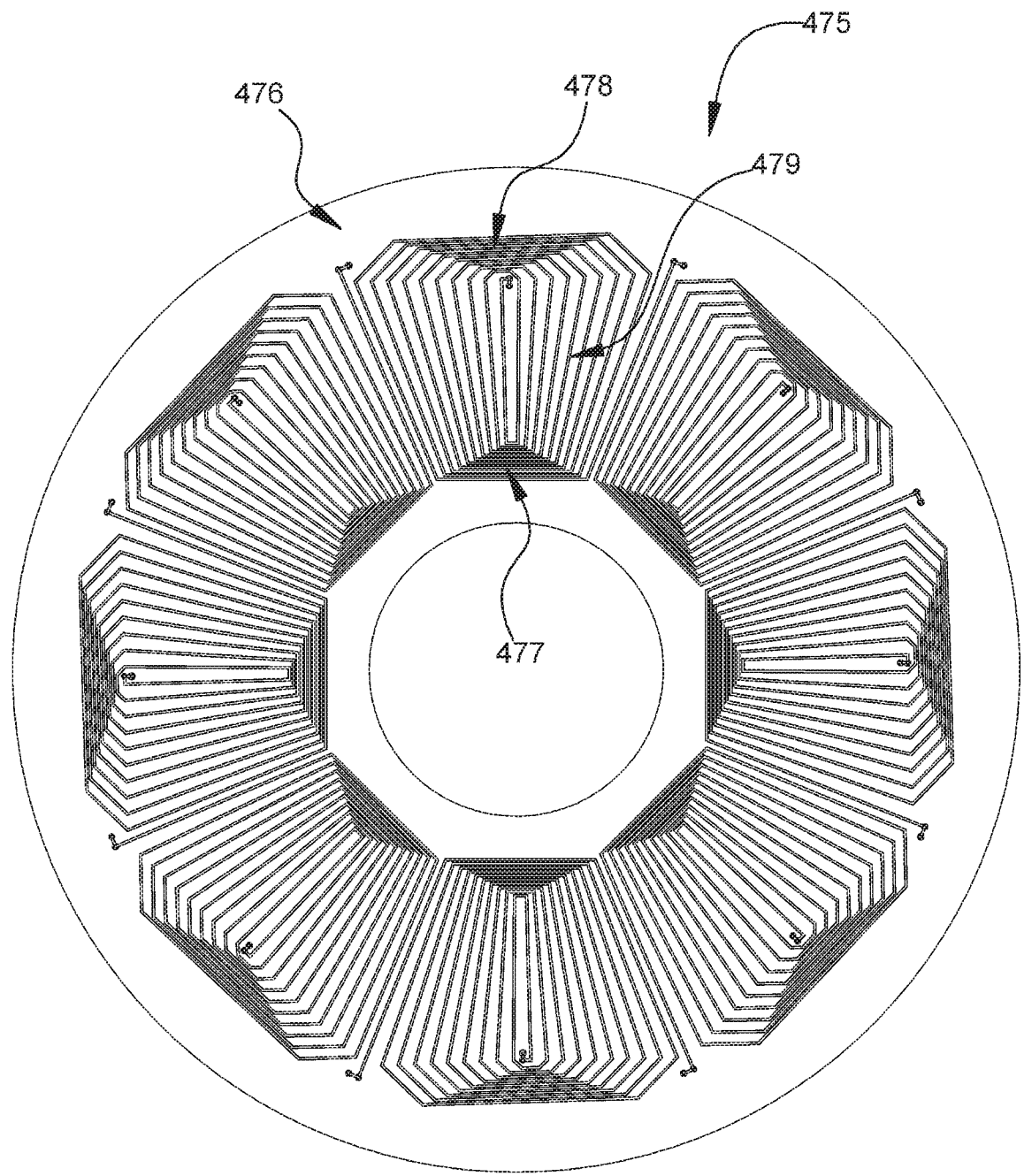
FIG. 37 is an enlarged, partial top view of yet another embodiment of a stator panel.

FIG. 37 is an enlarged, partial top view of yet another embodiment of a stator panel 475. Examples of the coils 476 of the stator panel 475 can have a higher density of copper adjacent inner and outer diameter portions 477, 478, respectively, thereof, compared to radial portions 479 thereof, which can be further spread apart than the inner and outer diameter portions 477, 478.

Figure 38:
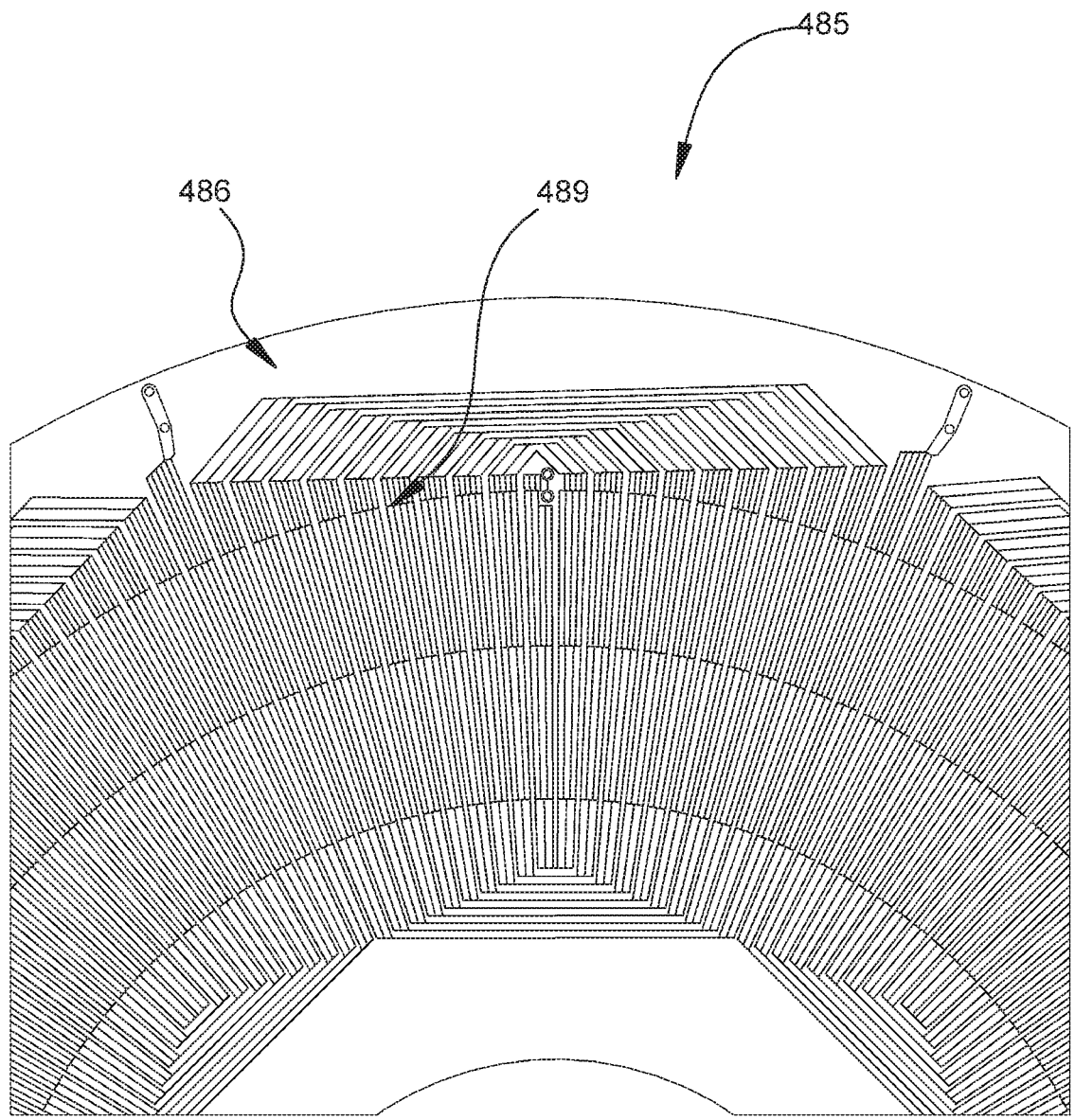
FIG. 38 is an enlarged, partial top view of an alternate embodiment of a stator panel.

FIG. 38 is an enlarged, partial top view of an alternate embodiment of a stator panel 485. Examples of the stator panel 485 can have variable numbers of slits within the radial traces 489 of its coils 486. For example, the radial traces can include two, three, four, five or more slits within the same radial trace 489, as illustrated.

FIGS. 39-46 depict still other embodiments of axial field rotary energy devices. Any of the elements, features and components described herein for other versions of the devices can be used in these embodiments as well. In some versions, an axial field rotary energy device 501 can include a housing 503 (e.g., housing shells 503*a*, 503*b* in FIG. 39) having an axis 505 with an axial direction. The housing shells 503*a*, 503*b* can be coupled together. Each of the housing shells 503*a*, 503*b* can include an internal perimeter 507 having an axial shelf 504 formed therein.

Examples can include a stator assembly 511 mounted to the housing 503. The stator assembly 511 can include a plurality of stator panels 545 that are axially-stacked and discrete panels from each other. Each stator panel 545 can include a respective printed circuit board (PCB) having a respective plurality of coils that are electrically conductive and interconnected within the respective PCB, as described elsewhere herein. The respective PCB can be configured so that an electrical current that flows through any one of the respective plurality of coils likewise flows through all of the respective plurality of coils. In one example, each stator panel 545 can consist of a single electrical phase.

Figure 44:
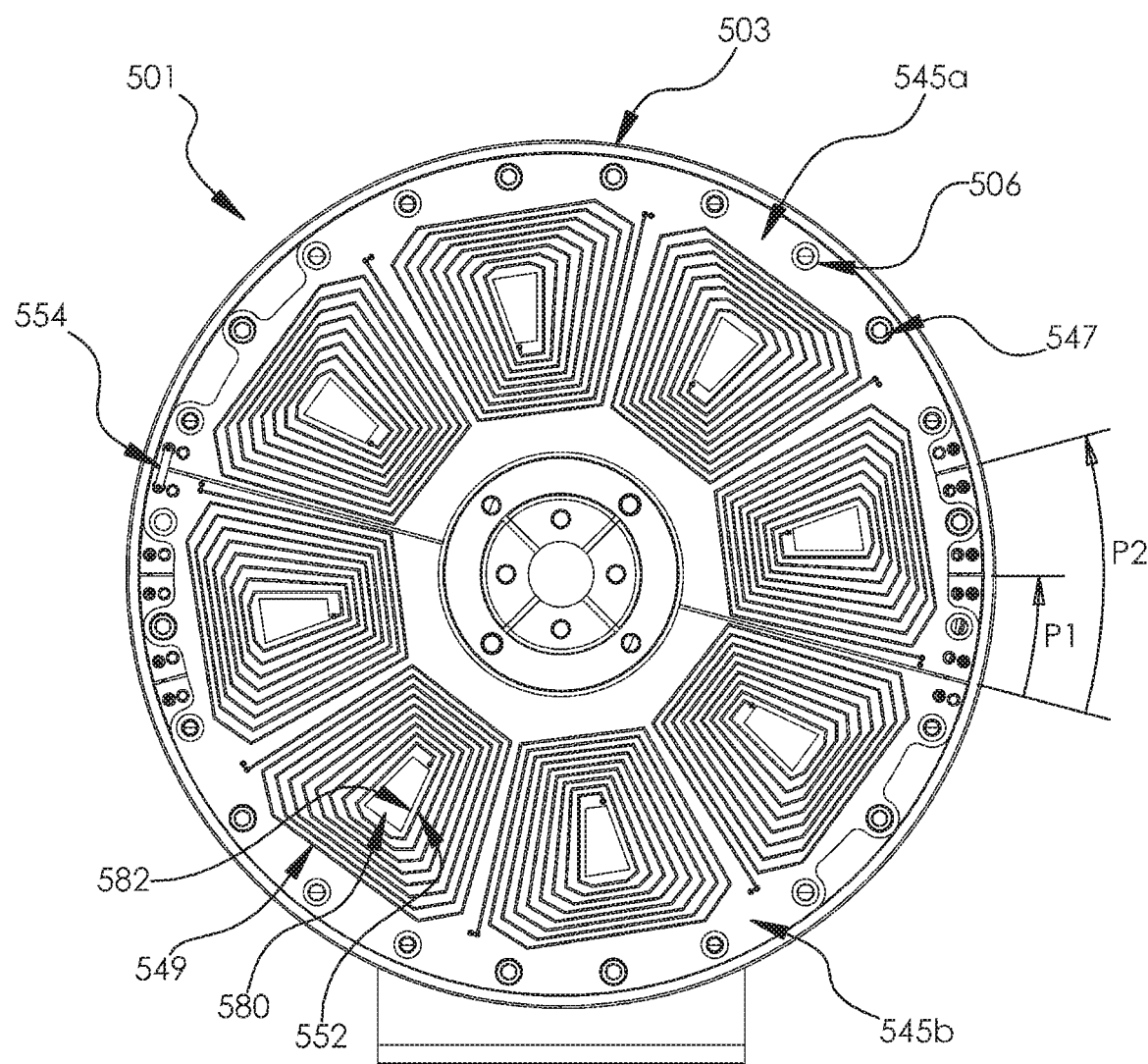
FIG. 44 is a front view of the device of FIG. 39, taken along the line 44-44, with part of the housing and a portion of the rotor assembly removed.
Figure 45:
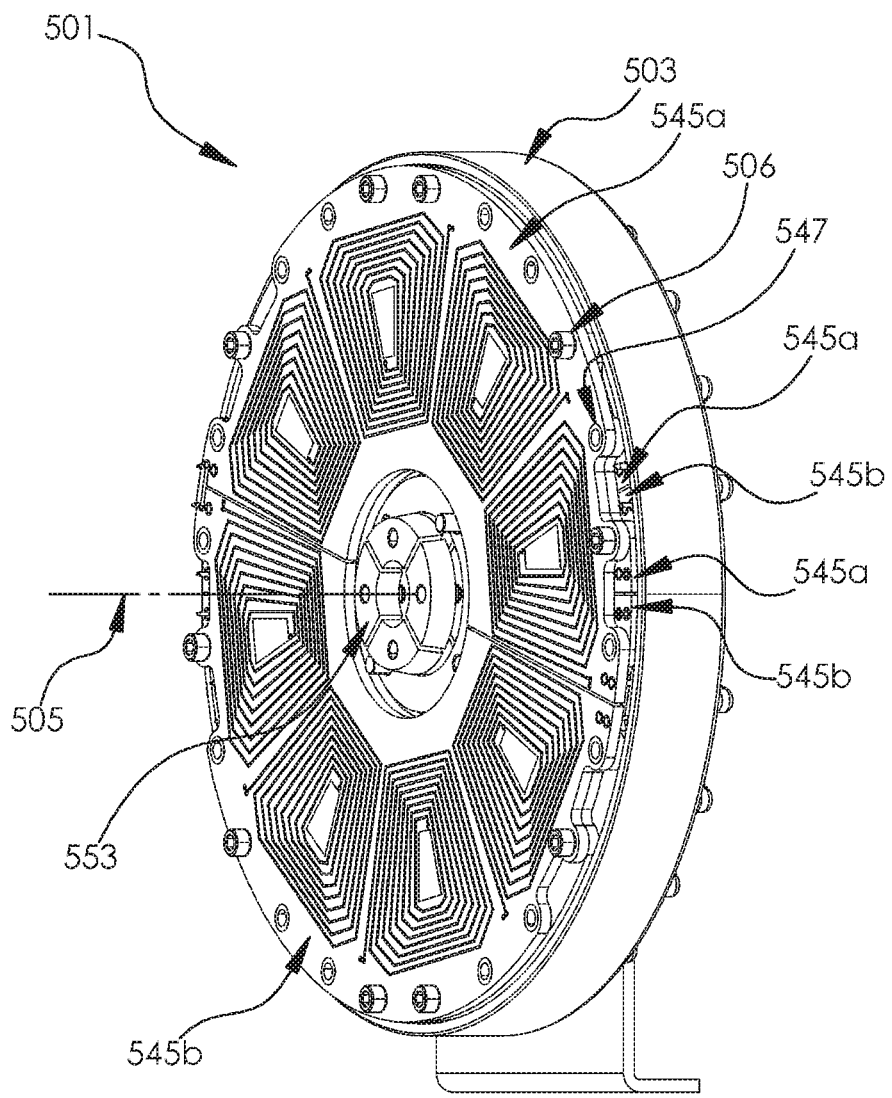
FIG. 45 is an isometric view of the device of FIG. 44.
Figure 46:
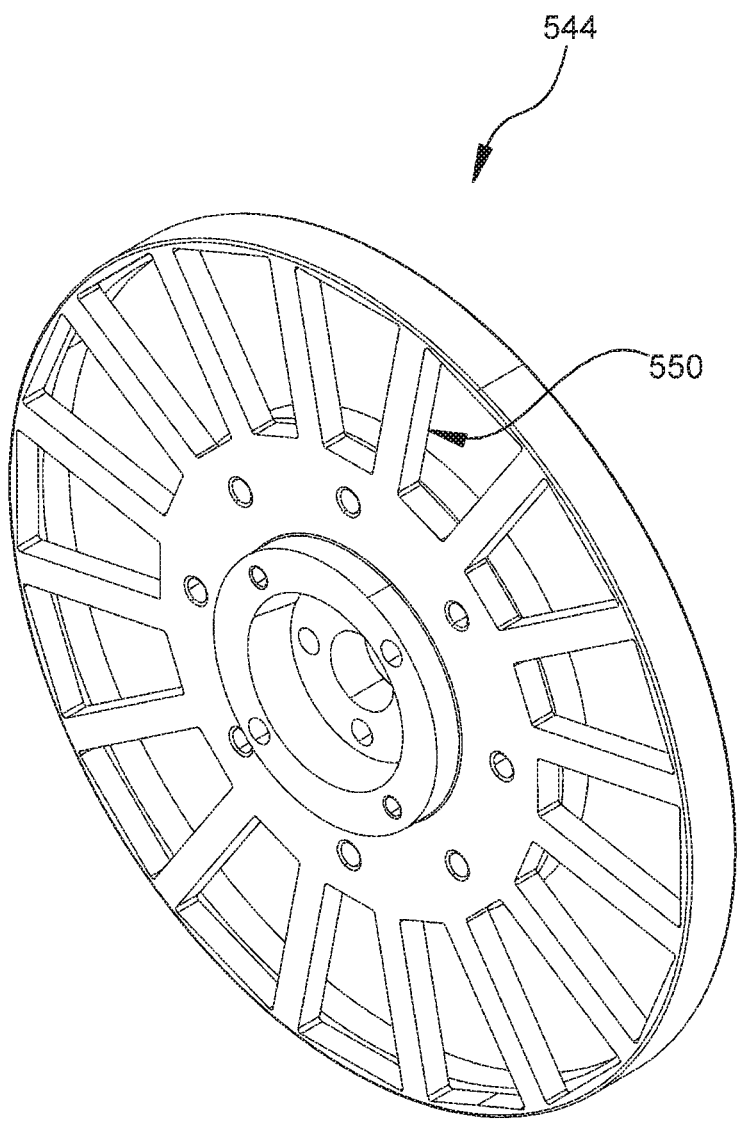
FIG. 46 is an isometric view of an embodiment of a rotor hub.

Versions of each stator panel 545 can comprise two identical, C-shaped PCB segment halves 545*a*, 545*b* (FIGS. 44 and 45). The PCB segment halves 545*a*, 545*b* can be coupled together (such as via electrical connectors 554; one shown in FIG. 44) to form a respective one of the stator panels 545. The electrical connector can be a U-shaped wire clip for each of assembly and disassembly. In the example illustrated, there are three stator panels 545 in the stator assembly 511, for a total of six PCB segment halves 545*a*, 545*b* that are identical to each other and interchangeable within the system. Also, in this drawing the three stator panels 545 can be offset by P1 and P2, which allows the wire clip area on lower stator panels 545 to be exposed to allow the connectors 554 to be inserted from above for ease of assembly and disassembly.

In some versions, the stator panels 545 are mechanically coupled directly to each other and to at least one axial shelf 504 (FIG. 39) with fasteners 506 in an axial-abutting relationship for enhanced thermal conductivity. The stator assembly 511 can be mechanically coupled to at least one of the axial shelves 504. In addition, the stator panels 545 can have outer perimeter edges that contact radial-facing inner surfaces of the housing shells 503*a*, 503*b* at the internal perimeter 507. Moreover, thermal putty also can be used at the contact surfaces to enhance thermal transfer between the PCBs and the housing 503. The housing 503 can further include external fins 508 as a substrate design to provide additional cooling for the device 501.

Each stator panel 545 can further include a plurality of perimeter mounting holes 547 (FIGS. 44 and 45) that are configured to permit the plurality of stator panels 545 to, relative to the axis 505, be: (a) rotationally aligned at a single angle with respect to the axis 505 to form a single electrical phase device, or (b) rotationally offset from each other (FIG. 44) at desired phase angles P1, P2 to form a multi-phase device.

Embodiments can further include a rotor assembly having one or more rotors 542 (FIGS. 39 and 41-43) rotatably mounted within the housing 503. The rotors 542 can be located on opposite axial ends of the stator assembly 511. The rotors 542 can be mechanically coupled together. Each rotor 542 can include a plurality of magnets 537. In some versions (FIG. 41), the magnets 537 can include leading and trailing edges 539. The leading edge 539 of one magnet can be parallel to the trailing edge of an adjacent magnet 537 to define a consistent circumferential spacing, relative to the axis 505, between adjacent ones of the magnets 537. Device 501, as configured with parallel leading and trailing edges 539 of magnets 537, can increase a magnetic flux capacity of the device 501 by about 3% compared to, for example, a device with magnets 37 (FIG. 9) having non-parallel leading and trailing edges 69 on adjacent ones of the magnets 37.

Embodiments of the magnets 537 can be trapezoidal in shape, as shown. Versions of each magnet 537 can include, relative to axis 505, an inner radial edge 538 (FIG. 41) that is parallel to an outer radial edge 540 thereof. The magnets 537 can include an even or odd number of magnets 537. Relative to the axis 505, circumferentially adjacent ones of the magnets 537 comprise opposite magnetic poles. On opposed rotors 542, diametrically opposed ones of the magnets 537 can comprise opposite magnetic poles.

Figure 42:
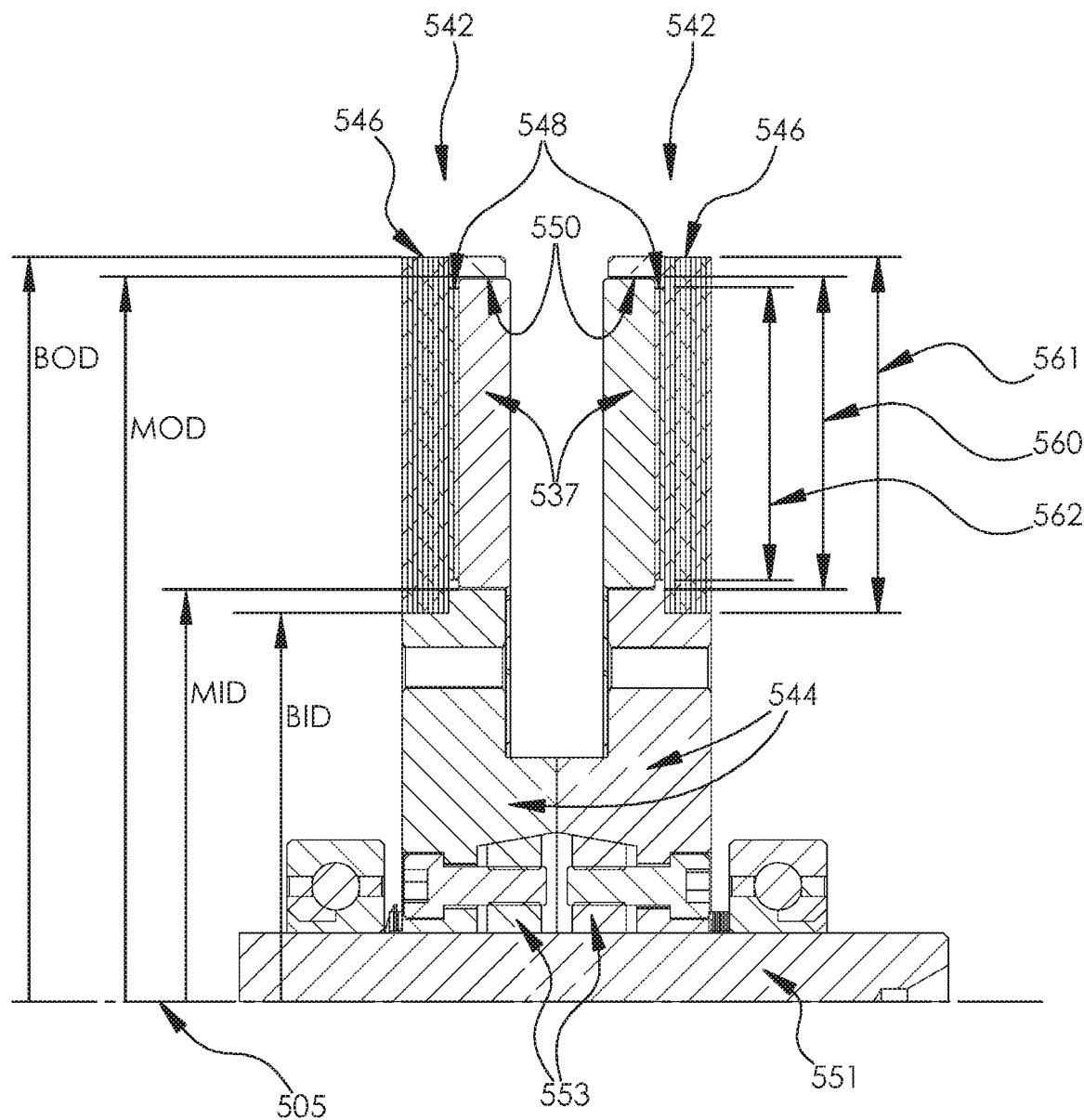
FIG. 42 is a half-sectional side view of an embodiment of a rotor assembly.
Figure 43:
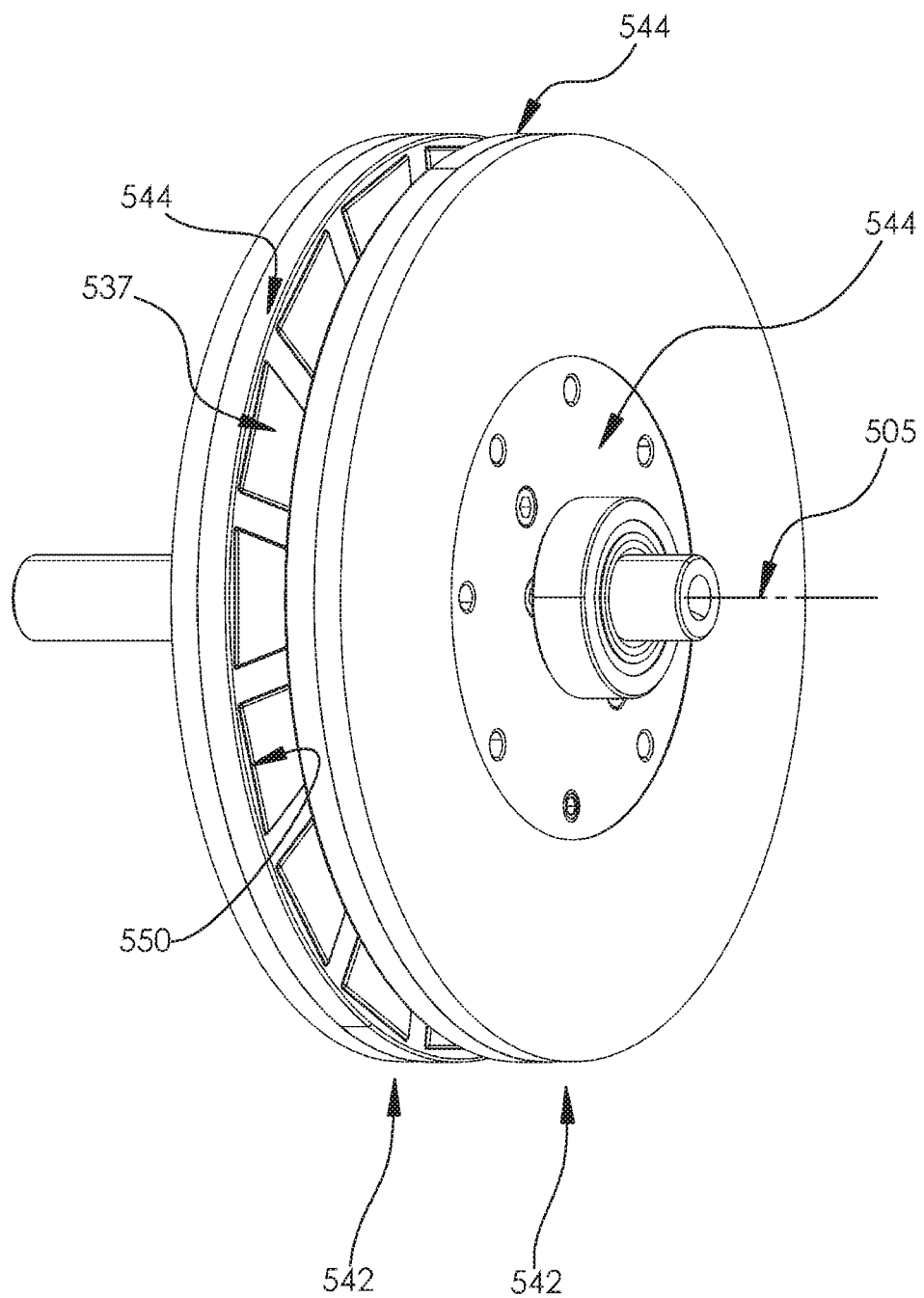
FIG. 43 is an isometric view of the rotor assembly of FIG. 42.

In some embodiments (FIGS. 42, 43 and 46), each rotor 542 can include a rotor hub 544 having a magnetic backing 546 mounted to one axial side of the rotor hub 544. The magnets 537 can be mounted to an opposite axial side of the rotor hub 544. Collectively, FIG. 42 illustrates how the magnets 537 can define a magnet inner radius or diameter (MID) and a magnet outer radius or diameter (MOD) relative to the axis 505, to define a magnet radial span 560. The magnetic backing 546 can include a backing inner radius or diameter (BID) that is less than the magnet inner diameter MID. In addition or alternatively, the magnetic backing 546 can have a backing outer diameter (BOD) that is greater than the magnet outer diameter MOD, to define a backing radial span 561. In addition, the backing outer diameter BOD can be flush with an outer perimeter of the rotor hub 544, as shown.

In another example, the rotor hubs 544 can have the larger magnetic backing 546, as well as a smaller magnetic backing 548 that is located directly between (in the axial direction) the magnets 537 and the larger magnetic backing 546. The smaller magnetic backing 548 can define a smaller backing radial span 562. The magnetic backings 546, 548 can be single monolithic layers, a plurality of stacked layers (as shown), and can comprise any magnetic material including carbon, silicon, a ferromagnetic material, etc. Versions of the rotor hub 544 can include a trapezoidal aperture 550 (FIG. 46) for each of the magnets 537. The magnets 537 can be secured to the rotor hub only by magnetic attraction to the magnetic backing 546, 548, in one version. In other versions, adhesive can be used as well.

Figure 39:
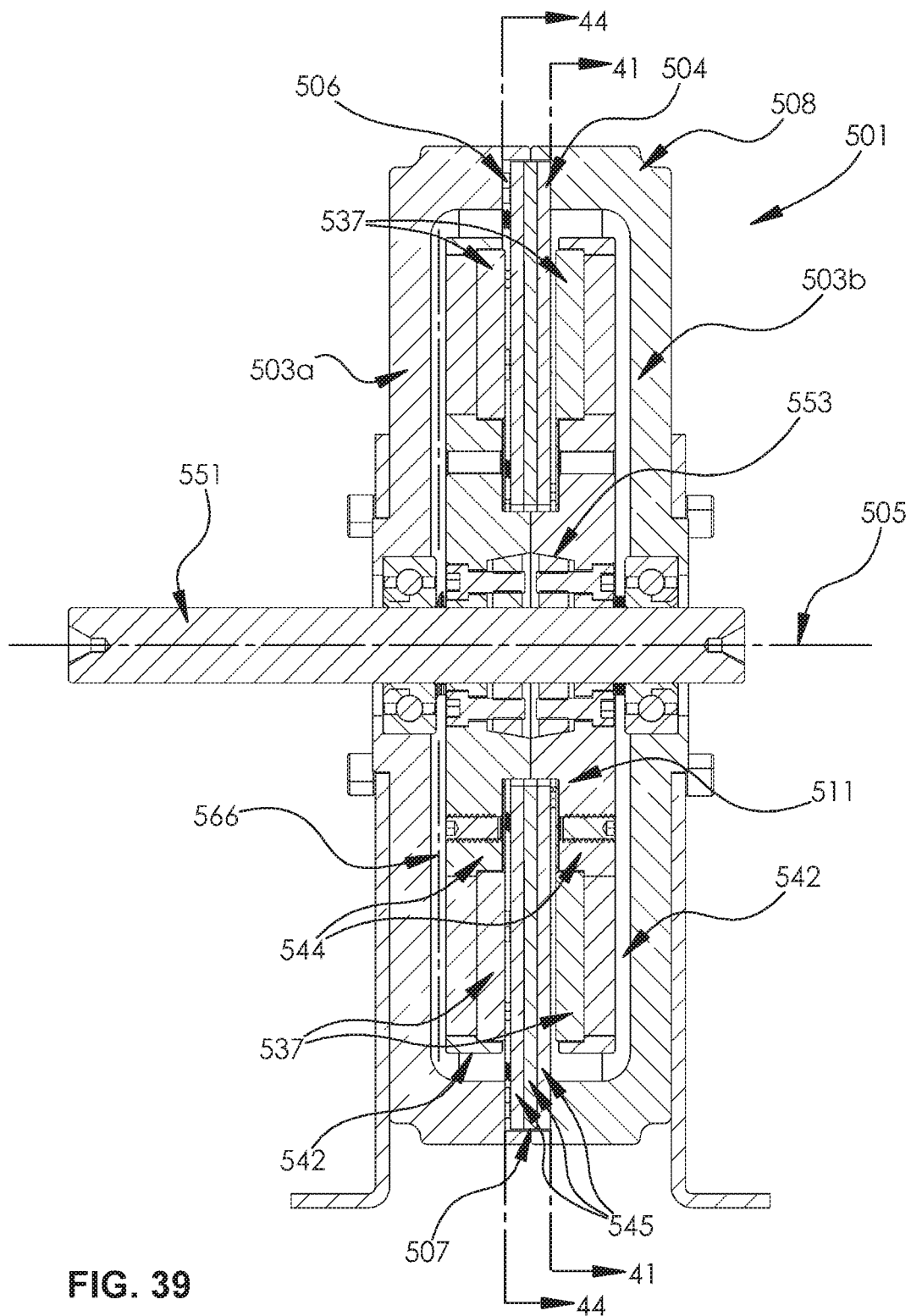
FIG. 39 is a sectional side view of another embodiment of an axial field rotary energy device.
Figure 40:
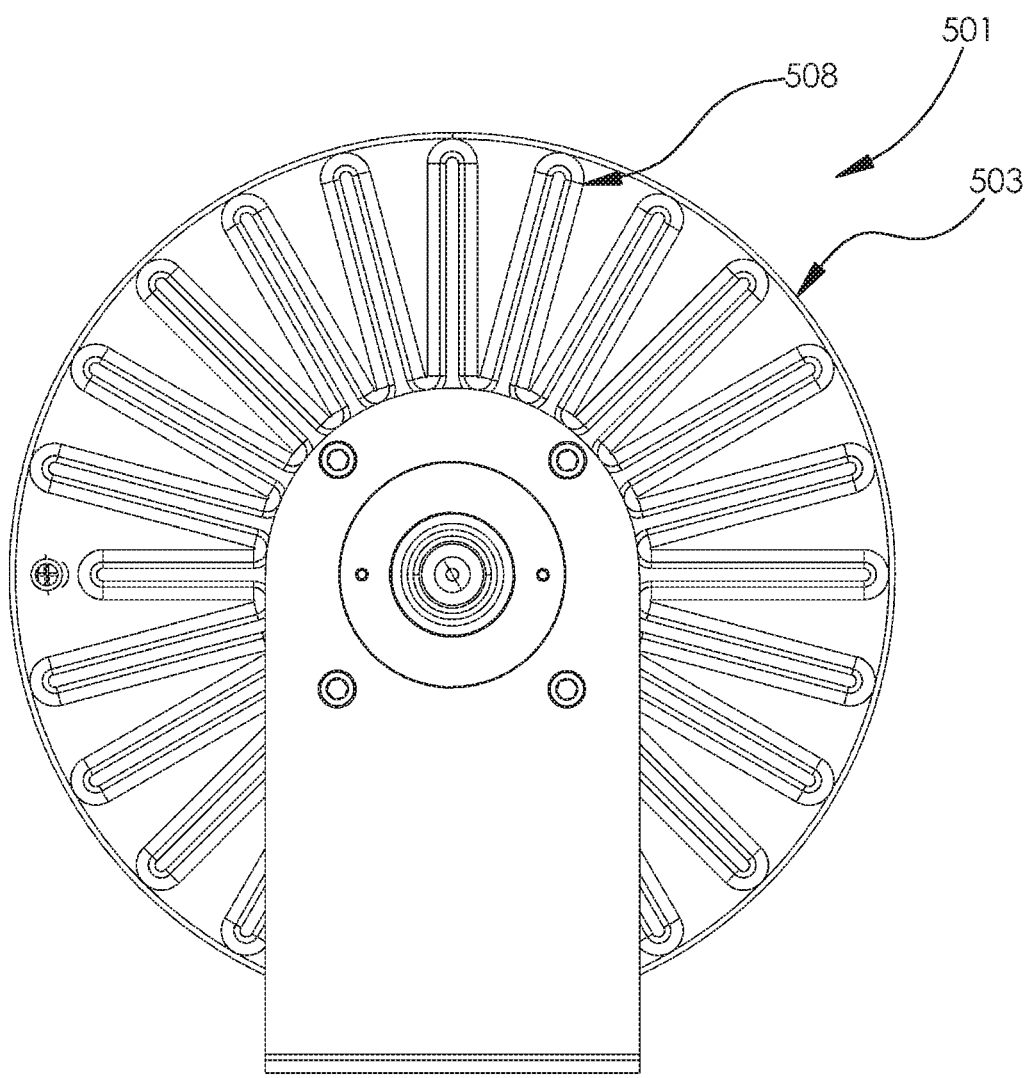
FIG. 40 is a front view of the device of FIG. 39.
Figure 41:
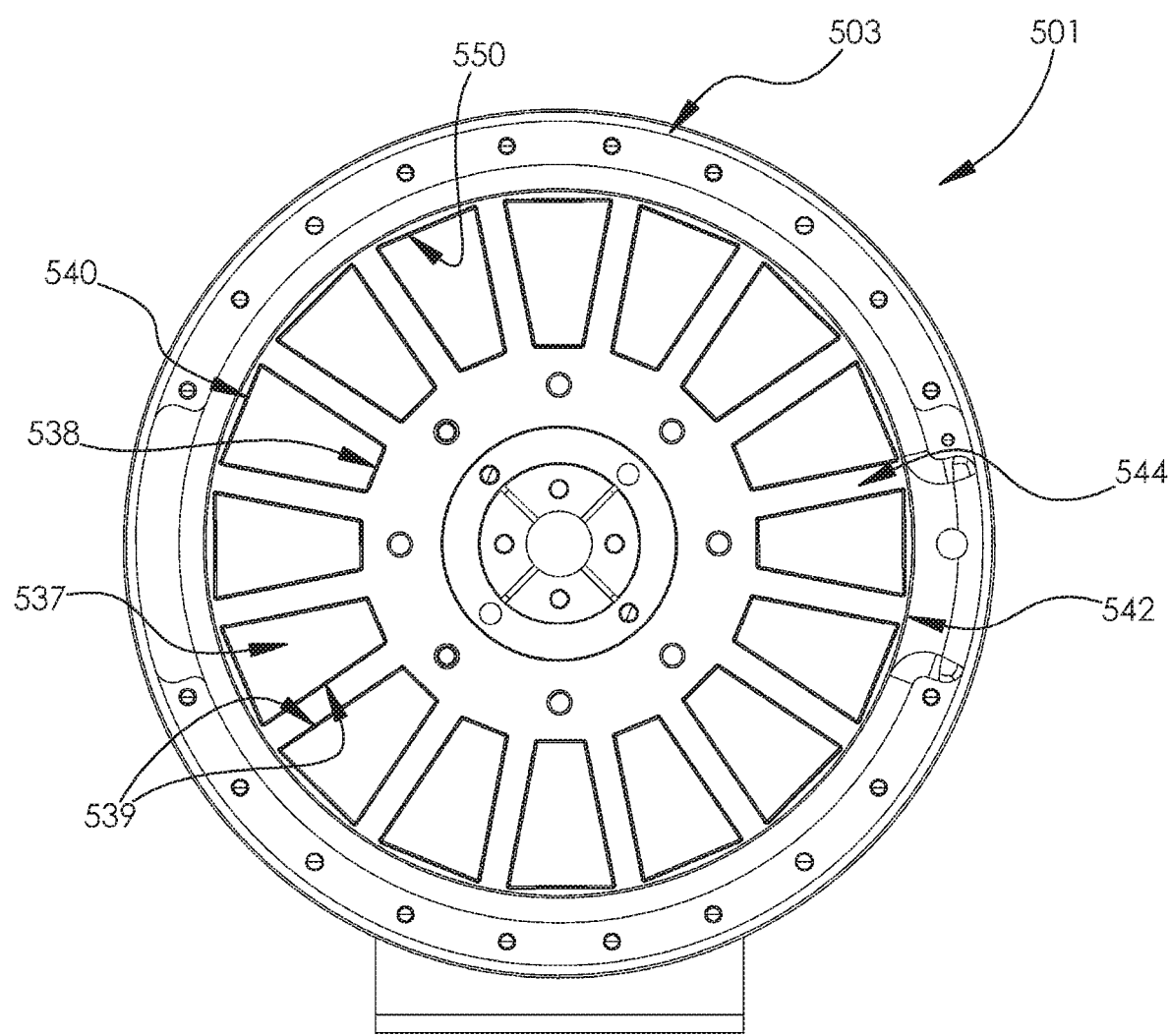
FIG. 41 is a front view of the device of FIG. 39, taken along the line 41-41, with part of the housing and the stator assembly removed.

The rotor assembly can include various hardware to connect the rotors 542 to the shaft 551. For example, FIGS. 39, 42 and 45 depict a quad-split-ring clamp structure 553 that can secure the rotor hubs 544 to the shaft 551 with fasteners. The rotor hubs 544 can include an inner bevel to receive outer beveled versions of the quad-split-ring clamp structure 553. Shaft bearings can rotatably mount the shaft 551 and the rotor assembly to the housing.

Still other embodiments of the device 501 can include the stator panel 545 having a plurality of cores 580 (FIG. 44-45). Each core 580 can comprise a magnetic material (e.g., carbon steel, iron, ferrite, etc.) and various shapes such as the trapezoids shown. Each core 580 can be located in a center 582 of a respective coil 549 of the stator panel 545. The cores 580 can be electrically insulated from the coils 549. Versions of the cores 580 can include one or both axial surfaces being flush or substantially flush with respective axial surfaces of the stator panel 545.

In some examples, the center 582 of the respective coil 549 can include a volume (such as a recessed volume) located inside an innermost trace 552 of the respective coil 549. In one version, the volume can be formed during manufacturing of the PCB of the stator panel 545, such that the cores 580 can be included during fabrication of the PCB. In another version, the volume can be removed from the PCB after the PCB is manufactured, such that the cores 580 are added to the PCB after fabrication of the PCB. The magnetic cores 580 can increase a magnetic flux capacity of the device 501, which can permit use of weaker magnets while maintaining the high efficiency of the device 501, and/or the diameter of the device 501 can be smaller without diminishing performance.

Other versions can include one or more of the following embodiments:

1. An axial field rotary energy device, comprising:
a rotor comprising an axis of rotation and a magnet;
a stator coaxial with the rotor, the stator comprising a printed circuit board (PCB) having a plurality of PCB layers that are spaced apart in an axial direction, each PCB layer comprises a coil having only two terminals for electrical connections, each coil is continuous and uninterrupted between its only two terminals, each coil consists of a single electrical phase, and one of the two terminals of each coil is electrically coupled to another coil with a via to define a coil pair; and
each coil pair is electrically coupled to another coil pair with another via.

2. The axial field rotary energy device of any of these embodiments, wherein each PCB layer comprises a plurality of coils, and the coils in each coil pair are co-planar and located on a same PCB layer.

3. The axial field rotary energy device of any of these embodiments, wherein the coils in each coil pair are located on different PCB layers.

4. The axial field rotary energy device of any of these embodiments, wherein at least two of the coils are electrically coupled in series.

5. The axial field rotary energy device of any of these embodiments, wherein at least two of the coils are electrically coupled in parallel.

6. The axial field rotary energy device of any of these embodiments, wherein at least two of the coils are electrically coupled in parallel, and at least two other coils are electrically coupled in series.

7. The axial field rotary energy device of any of these embodiments, wherein at least two of the coil pairs are electrically coupled in parallel.

8. The axial field rotary energy device of any of these embodiments, wherein at least two of the coil pairs are electrically coupled in series.

9. The axial field rotary energy device of any of these embodiments, wherein at least two of the coil pairs are electrically coupled in parallel, and at least two other coil pairs are electrically coupled in series.

10. The axial field rotary energy device of any of these embodiments, wherein each PCB layer comprises a PCB layer surface area, the coil on each PCB layer comprises a plurality of coils having a coils surface area that is in a range of at least about 75% to about 99% of the PCB layer surface area.

11. The axial field rotary energy device of any of these embodiments, wherein each PCB layer comprises a plurality of coils that are co-planar and symmetrically spaced apart about the axis, and the coils in adjacent PCB layers, relative to the axis, are circumferentially aligned with each other relative to the axis to define symmetric stacks of coils in the axial direction.

12. The axial field rotary energy device of any of these embodiments, wherein the stator consists of a single electrical phase.

13. The axial field rotary energy device of any of these embodiments, wherein the stator comprises at least two electrical phases.

14. The axial field rotary energy device of any of these embodiments, wherein each PCB layer comprises a plurality of coils for each electrical phase, and the coils for each electrical phase are angularly offset from each other with respect to the axis within each PCB layer to define a desired phase angle shift between the electrical phases.

15. The axial field rotary energy device of any of these embodiments, wherein the stator comprises a single unitary panel.

16. The axial field rotary energy device of any of these embodiments, wherein each coil is coupled to another coil with only one via.

17. The axial field rotary energy device of any of these embodiments, wherein each coil pair is coupled to another coil pair with only one via.

18. The axial field rotary energy device of any of these embodiments, wherein the via comprises a plurality of vias.

19. The axial field rotary energy device of any of these embodiments, wherein said another via comprises a plurality of vias.

20. The axial field rotary energy device of any of these embodiments, wherein the axial field rotary energy device is a generator.

21. The axial field rotary energy device of any of these embodiments, wherein the axial field rotary energy device is a motor.

22. The axial field rotary energy device of any of these embodiments, wherein the axial field rotary energy device comprises two or more electrical phases and two or more external terminals.

23. The axial field rotary energy device of any of these embodiments, wherein the coils are identical to each other.

24. The axial field rotary energy device of any of these embodiments, wherein at least two of the coils are not identical to each other and differ from each by at least one of size or shape.

25. An axial field rotary energy device, comprising:
a rotor comprising an axis of rotation and a magnet; and
a stator coaxial with the rotor, the stator comprising a printed circuit board (PCB) having a plurality of PCB layers that are spaced apart in an axial direction, each PCB layer comprises a coil, and the plurality of PCB layers comprise:
a plurality of coil layer pairs, the coils in each coil layer pair are on different PCB layers, at least two of the coil layer pairs are coupled together in parallel, and at least another two of the coil layer pairs are coupled together in series.

26. The axial field rotary energy device of any of these embodiments, wherein the stator comprises at least two electrical phases.

27. The axial field rotary energy device of any of these embodiments, wherein each PCB layer comprises a plurality of coils for each electrical phase, and the coils for each electrical phase are angularly offset from each other with respect to the axis within each PCB layer to define a desired phase angle shift between the electrical phases.

28. The axial field rotary energy device of any of these embodiments, wherein each coil consists of a single electrical phase.

29. An axial field rotary energy device, comprising:
a rotor comprising an axis of rotation and a magnet;
a stator coaxial with the rotor, the stator comprising a printed circuit board (PCB) having a first PCB layer and a second PCB layer that are spaced apart from each other in an axial direction, each PCB layer comprises a coil that is continuous, and each coil has only two terminals for electrical connections; and
only one via to electrically couple the coils through one terminal of each of the coils.

30. An axial field rotary energy device, comprising:
a rotor comprising an axis of rotation and a magnet;
a stator coaxial with the rotor, the stator comprises a printed circuit board (PCB) consisting of a single unitary panel having at least two electrical phases, the PCB comprises a plurality of PCB layers that are spaced apart in an axial direction, each PCB layer comprises a plurality of coils, each coil has only two terminals for electrical connections, each coil is continuous and uninterrupted between its only two terminals, each coil consists of a single electrical phase, and one of the two terminals of each coil is electrically coupled to another coil with only one via to define a coil pair, each coil pair is electrically coupled to another coil pair with another only one via;
the coils in each PCB layer are co-planar and symmetrically spaced apart about the axis, and the coils in adjacent PCB layers are circumferentially aligned with each other to define symmetric stacks of coils in the axial direction; and
each PCB layer comprises a plurality of coils for each electrical phase, and the coils for each electrical phase are angularly offset from each other with respect to the axis within each PCB layer to define a desired phase angle shift between the electrical phases.

1. An axial field rotary energy device, comprising:
a rotor comprising an axis of rotation and a magnet; and
a stator coaxial with the rotor, the stator comprises a plurality of stator segments coupled together about the axis, each stator segment comprises a printed circuit board (PCB) having a PCB layer comprising a coil, and each stator segment comprises only one electrical phase.

2. The axial field rotary energy device of any of these embodiments, wherein the stator consists of only one electrical phase.

3. The axial field rotary energy device of any of these embodiments, wherein the stator comprises a plurality of electrical phases.

4. The axial field rotary energy device of any of these embodiments, wherein the coils are identical to each other.

5. The axial field rotary energy device of any of these embodiments, wherein each PCB layer comprises a plurality of coils that are co-planar and angularly spaced apart from each other relative to the axis.

6. The axial field rotary energy device of any of these embodiments, wherein each stator segment comprises a plurality of PCB layers, each of which is configured to provide said only one electrical phase.

7. The axial field rotary energy device of any of these embodiments, wherein each PCB layer on each stator segment comprises a plurality of coils that are co-planar and configured to provide said only one electrical phase.

8. The axial field rotary energy device of any of these embodiments, wherein each coil comprises radial traces that extend from about an inner diameter of the PCB to about an outer diameter of the PCB.

9. The axial field rotary energy device of any of these embodiments, wherein each coil comprises a trace that is continuous from an outermost trace portion to a concentric innermost trace portion, and the coils comprise radial elements having linear sides and turns.

10. The axial field rotary energy device of any of these embodiments 9, wherein each coil comprises only linear traces that are continuous from an outermost trace to a concentric innermost trace, no trace of the PCB layers is non-linear, and said each coil comprises corners to join the only linear traces.

11. The axial field rotary energy device of any of these embodiments 0, wherein each PCB layer comprises a PCB layer surface area, the coil on each PCB layer comprises a plurality of coils having a coils surface area that is in a range of at least about 75% to about 99% of the PCB layer surface area.

12. The axial field rotary energy device of any of these embodiments 1, wherein each PCB layer comprises a plurality of coils that are co-planar and symmetrically spaced apart about the axis, and the coils in adjacent PCB layers are circumferentially aligned with each other relative to the axis to define symmetric stacks of coils in an axial direction.

13. An axial field rotary energy device, comprising:
a rotor comprising an axis of rotation and a magnet;
a stator coaxial with the rotor, the stator comprises a plurality of stator segments coupled together about the axis, each stator segment comprises a printed circuit board (PCB) having a plurality of PCB layers each comprising a coil, the PCB layers are spaced apart from each other in an axial direction, each of the PCBs has an even number of PCB layers, the PCB layers comprise layer pairs, each layer pair is defined as two PCB layers that are electrically coupled together with a via, and each layer pair is coupled to another layer pair with another via.

14. The axial field rotary energy device of any of these embodiments, wherein at least one of the PCB layers is electrically coupled to another PCB layer in series.

15. The axial field rotary energy device of any of these embodiments, wherein at least one of the PCB layers is electrically coupled to another PCB layer in parallel.

16. The axial field rotary energy device of any of these embodiments, wherein at least one layer pair is electrically coupled to another layer pair in series.

17. The axial field rotary energy device of any of these embodiments, wherein at least one layer pair is electrically coupled to another layer pair in parallel.

18. The axial field rotary energy device of any of these embodiments, wherein at least one of the layer pairs comprises two PCB layers that are axially spaced apart from and axially adjacent to each other.

19. The axial field rotary energy device of any of these embodiments, wherein at least one of the layer pairs comprises two PCB layers that are not axially adjacent to each other.

20. The axial field rotary energy device of any of these embodiments, wherein at least one of the layer pairs is axially adjacent to the layer pair to which said at least one of the layer pairs is electrically coupled.

21. The axial field rotary energy device of any of these embodiments, wherein at least one of the layer pairs is not axially adjacent to the layer pair to which said at least one of the layer pairs is electrically coupled.

22. The axial field rotary energy device of any of these embodiments, wherein the coils are identical to each other.

23. The axial field rotary energy device of any of these embodiments, wherein at least two of the coils are not identical to each other and differ from each by at least one of size, shape or architecture.

24. An axial field rotary energy device, comprising:
a rotor comprising an axis of rotation and a magnet; and
a stator coaxial with the rotor, the stator comprises a plurality of stator segments and a plurality of electrical phases, each stator segment comprises a printed circuit board (PCB) having at least one PCB layer with a coil, and each stator segment comprises only one electrical phase.

25. An axial field rotary energy device, comprising:
a rotor comprising an axis of rotation and a magnet;
a stator coaxial with the rotor, the stator comprises a plurality of stator segments coupled together about the axis, each stator segment comprises a printed circuit board (PCB) having a plurality of PCB layers each comprising coils, the PCB layers are spaced apart from each other in an axial direction, each of the PCBs has an even number of PCB layers, the PCB layers comprise layer pairs, and each layer pair is defined as two PCB layers that are electrically coupled together; and
the coils in each PCB layer are co-planar and angularly and symmetrically spaced apart from each other about the axis, and the coils in adjacent PCB layers are circumferentially aligned with each other to define symmetric stacks of coils in the axial direction.

26. The axial field rotary energy device of any of these embodiments, wherein the stator consists of only one electrical phase, and the coils are identical to each other.

27. The axial field rotary energy device of any of these embodiments, wherein the stator comprises a plurality of electrical phases.

28. The axial field rotary energy device of any of these embodiments, wherein each PCB layer is configured to provide only one electrical phase.

29. The axial field rotary energy device of any of these embodiments, wherein the coils on each PCB layer on each stator segment are configured to provide said only one electrical phase.

30. The axial field rotary energy device of any of these embodiments, wherein the axial field rotary energy devices consists of a single electrical phase.

1. A module for an axial field rotary energy device, comprising:
a housing having coupling structures configured to mechanically couple the housing to a second housing of a second module, and electrical elements configured to electrically couple the housing to the second housing;
a rotor rotatably mounted to the housing, and the rotor comprises an axis and a magnet; and
a stator mounted to the housing coaxially with the rotor, and the stator comprises a printed circuit board (PCB) having a PCB layer comprising a coil.

2. The module of any of these embodiments, wherein the rotor and the stator are located inside and surrounded by the housing.

3. The module of any of these embodiments, wherein the rotor comprises a plurality of rotors, the magnet comprises a plurality of magnets, and the stator comprises a plurality of stators, and each of the stators comprises a plurality of PCB layers, and each PCB layer comprises a plurality of coils.

4. The module of any of these embodiments, wherein the module is configured to be directly coupled to a frame, and the module is configured to be indirectly coupled to the second module.

5. The module of any of these embodiments, wherein the housing comprises a side wall that orients the stator at a desired angular orientation with respect to the axis.

6. The module of any of these embodiments, wherein the stator comprises a plurality of stators, and the side wall comprises a plurality of side wall segments that angularly offset the plurality of stators at desired angular orientations with respect to the axis.

7. The module of any of these embodiments, wherein each side wall segment comprises a radial inner surface having a slot formed therein, the slot receives and maintains the desired angular orientation of the stator with respect to the axis, and the slots, collectively, hold outer edges of the stator at an air gap spacing between the stator and the rotor.

8. The module of any of these embodiments, wherein the stator is air cooled and is not liquid cooled.

9. The module of any of these embodiments, wherein the PCB layer comprises a plurality of PCB layers, each having a plurality of coils, each coil has only two terminals, each coil is continuous and uninterrupted between its only two terminals, and each coil is electrically coupled to another coil with a via.

10. The module of any of these embodiments, wherein two coils are coupled together to define a coil pair, and each coil pair is electrically coupled to another coil pair with another via.

11. The module of any of these embodiments, wherein the coils in each coil pair are located on different PCB layers.

12. The module of any of these embodiments, wherein each coil is coupled to another coil with only one via, and each coil pair is coupled to another coil pair with only one another via.

13. The module of any of these embodiments, wherein the stator comprises a plurality of stator segments, each of which comprises a PCB.

14. The module of any of these embodiments, wherein the stator consists of only one electrical phase.

15. The module of any of these embodiments, wherein the stator comprises a plurality of electrical phases.

16. A module for an axial field rotary energy device, comprising:
a housing having coupling structures configured to mechanically couple the housing to a second housing of a second module, and electrical elements configured to electrically couple the housing to the second housing;
plurality of rotors rotatably mounted to the housing, and the rotors comprise an axis and magnets; and
a plurality of stators mounted to the housing coaxially with the rotors, each stator comprises a printed circuit board (PCB) having a PCB layer comprising a coil, the stators are electrically coupled together inside the housing.

17. A module for an axial field rotary energy device, comprising:
a housing having coupling structures configured to mechanically couple the housing to a second housing of a second module, and electrical elements configured to electrically couple the housing to the second housing;
rotors rotatably mounted to the housing relative to an axis, and each the rotor comprises magnets;
stators mounted to the housing coaxially with the rotors, each of the stators comprises a printed circuit board (PCB) having PCB layers, and each PCB layer comprises coils; and
the housing comprises a plurality of side wall segments that orient the stators at desired angular orientations with respect to the axis, and angularly offset the stators at desired phase angles, wherein the side wall segments comprise radial inner surfaces having slots formed therein, the slots maintain the desired angular orientation and axial spacing of respective ones of the stators, and the slots, collectively, hold outer edges of the stators at desired air gap spacings between the stators and rotors.

18. The module of any of these embodiments, wherein the rotors and stators are located inside and surrounded by the housing; and further comprising:
a frame, the module is configured to be directly coupled to the frame, and the module is configured to be indirectly coupled to the second module.

19. The module of any of these embodiments, wherein each coil has only two terminals, each coil is continuous and uninterrupted between its only two terminals, and each coil is electrically coupled to another coil with a via.

20. The module of any of these embodiments, wherein each coil is coupled to another coil with only one via.

21. The module of any of these embodiments, wherein two coils are coupled together to define a coil pair, and each coil pair is electrically coupled to another coil pair with another via.

22. The module of any of these embodiments, wherein the module comprises at least one of:
the coils in each coil pair are located on different PCB layers; or
each coil pair is coupled to another coil pair with only one via.

23. The module of any of these embodiments, wherein each stator comprises a plurality of stator segments, and each of the stator segments comprises a PCB.

24. The module of any of these embodiments, wherein each stator consists of only one electrical phase.

25. The module of any of these embodiments, wherein each stator comprises a plurality of electrical phases.

26. A module for an axial field rotary energy device, comprising:
a housing having an axis;
rotors rotatably mounted to the housing about the axis, and each rotor comprises a magnet;
stators mounted to the housing coaxially with the rotors, each stator comprises a printed circuit board (PCB) having a PCB layer comprising a coil, and each stator consists of a single electrical phase; and wherein
selected ones of the stators are angularly offset from each other with respect to the axis at desired phase angles, such that the module comprises more than one electrical phase.

27. The module of any of these embodiments, wherein the housing comprises a side wall having a plurality of side wall segments.

28. The module of any of these embodiments, wherein each side wall segment comprises a slot in an inner surface thereof, the side wall segments engage and orient the stators at desired angular orientations with respect to the axis, each stator is angularly offset with respect to other ones of stators at the desired phase angles, the stators seat in the slots in the side wall segments, and the slots, collectively, hold outer edges of the stators at desired air gap spacings between the stators and rotors.

29. The module of any of these embodiments, wherein each stator consists of only one PCB.

30. The module of any of these embodiments, wherein each stator comprises two or more PCBs that are coupled together to form each stator.

1. A system, comprising:
a plurality of modules comprising axial field rotary energy devices, the modules are connected together for a desired power input or output, and each module comprises:

a housing having an axis, the housing is mechanically coupled to at least one other module, and the housing is electrically coupled to said at least one other module;
rotors rotatably mounted to the housing and each rotor comprises magnets; and
stators, each comprising a printed circuit board (PCB) having PCB layers comprising coils.

2. The system of any of these embodiments, wherein the modules are identical to each other.

3. The system of any of these embodiments, wherein at least two of the modules differ from each other by at least one of: power output, number of rotors, number of magnets, number of stators, number of PCBs, number of PCB layers, number of coils or angular orientation with respect to the axis.

4. The system of any of these embodiments, wherein the modules are directly coupled to each other.

5. The system of any of these embodiments, wherein the modules are indirectly coupled to each other.

6. The system of any of these embodiments, wherein each module comprises latches that mechanically secure the modules, and the latches are symmetrically arrayed with respect to the axis.

7. The system of any of these embodiments, wherein one of the modules comprises a first module that is axially connected to another module, and the first module differs structurally from said another module.

8. The system of any of these embodiments, wherein the modules are coaxial and mounted to keyed shafts that mechanically couple the modules.

9. The system of any of these embodiments, further comprising an enclosure, and the modules are mounted and coupled together inside the enclosure.

10. The system of any of these embodiments, wherein the enclosure comprises a plurality of enclosures, each mechanically coupled to at least one other enclosure, and electrically coupled to said at least one other enclosure.

11. The system of any of these embodiments, wherein each stator consists of a single electrical phase, and selected ones of the stators are offset from each other at desired electrical phase angles with respect to the axis.

12. The system of any of these embodiments, each stator comprises a plurality of electrical phases.

13. The system of any of these embodiments, wherein each module comprises a single electrical phase, and the modules are angularly offset from each other at desired electrical phase angles with respect to the axis.

14. The system of any of these embodiments, wherein each module comprises a plurality of electrical phases, and the modules are angularly offset from each other at desired electrical phase angles with respect to the axis.

15. The system of any of these embodiments, wherein the modules are angularly aligned with each other relative to the axis, such that all respective phase angles of the modules also are angularly aligned.

16. An assembly, comprising:
modules comprising axial field rotary energy devices, the modules are mechanically and electrically connected to each other for a desired power input or output, and each module consists of a single electrical phase;
an enclosure inside which the modules are mounted and coupled; and each module comprises:
a housing having an axis and mechanically coupled to at least one other module, and electrically coupled to said at least one other module;
rotors rotatably mounted to the housing and the rotors comprise magnets; and stators, each stator comprises a printed circuit board (PCB) having PCB layers, and each PCB layer comprises coils.

17. The assembly of any of these embodiments, wherein the modules are identical to each other.

18. The assembly of any of these embodiments, wherein at least two of the modules differ from each other by at least one of: power output, number of rotors, number of magnets, number of stators, number of PCBs, number of PCB layers, number of coils or angular orientation with respect to the axis.

19. The assembly of any of these embodiments, wherein the modules are directly coupled to each other.

20. The assembly of any of these embodiments, wherein the modules are indirectly coupled to each other.

21. The assembly of any of these embodiments, wherein each module comprises latches that mechanically secure the module to another module, and the latches are symmetrically arrayed with respect to the axis.

22. The assembly of any of these embodiments, wherein one of the modules comprises a first module that is axially connected to another module, and the first module differs structurally from said another module.

23. The assembly of any of these embodiments, wherein the modules are coaxial and mounted to keyed shafts that mechanically couple the modules.

24. The assembly of any of these embodiments, wherein the enclosure comprises a plurality of enclosures, each having coupling structures that mechanically couple the enclosure to at least one other enclosure, and electrical elements that electrically couple the enclosure to said at least one other enclosure.

25. The assembly of any of these embodiments, wherein the modules are angularly offset from each other at desired electrical phase angles with respect to the axis.

26. An assembly, comprising:
a plurality of modules comprising axial field rotary energy devices, the modules are identical and interchangeably connectable to each other for a desired power input or output, and the assembly is a generator or a motor that consists of a single electrical phase;
an enclosure inside which the modules are mounted and coupled; and each module comprises:
a housing having an axis, coupling structures that mechanically couple the housing to at least one other module, and electrical elements that electrically couple the housing to at least one other module;
a plurality of rotors rotatably mounted to the housing and the rotors comprise magnets; and
a plurality of stators, each comprising a printed circuit board (PCB) having a plurality of PCB layers, and each PCB layer comprises a plurality of coils.

27. The assembly of any of these embodiments, wherein the enclosure comprises a plurality of enclosures, each having coupling structures that mechanically couple the enclosure to at least one other enclosure, and electrical elements that electrically couple the enclosure to said at least one other enclosure.

28. The assembly of any of these embodiments, wherein the modules are angularly offset from each other at desired electrical phase angles with respect to the axis.

29. A method of maintaining an axial field rotary energy device, the method comprising:
(a) providing an enclosure having a plurality of modules, each module comprising a housing, a rotor rotatably mounted to the housing, the rotor comprises an axis and a magnet, a stator mounted to the housing coaxially with the rotor, and the stator comprises a printed circuit board (PCB);
(b) mechanically and electrically coupling the modules;
(c) operating the axial field rotary energy device;
(d) detecting an issue with a first module and stopping operation of the axial field rotary energy device;
(e) opening the enclosure and disassembling the first module from the enclosure and any other module to which the first module is attached;
(f) installing a second module in the enclosure in place of the first module and attaching the second module to said any other module to which the first module was attached; and then
(g) re-operating the axial field rotary energy device.

30. The method of any of these embodiments, further comprising:
detecting an issue with a first stator in a first module and stopping operation of the axial field rotary energy device;
opening the first module and disassembling the first stator from the first module;
installing a second stator in the first module in place of the first stator; and then
re-operating the axial field rotary energy device.

1. An axial field rotary energy device, comprising:
a housing;
a rotor mounted inside the housing, the rotor having an axis of rotation and a magnet;
a stator mounted inside the housing coaxial with the rotor, the stator comprising a printed circuit board (PCB) having a PCB layer with a coil; and
a sensor integrated within the housing, wherein the sensor is configured to monitor, detect or generate data regarding operation of the axial field rotary energy device.

2. The axial field rotary energy device of any of these embodiments, wherein the operational data comprises at least one of power, temperature, rate of rotation, rotor position, or vibration data.

3. The axial field rotary energy device of any of these embodiments, wherein the sensor comprises at least one of a Hall effect sensor, encoder, optical sensor, thermocouple, accelerometer, gyroscope or vibration sensor.

4. The axial field rotary energy device of any of these embodiments, wherein:
the axial field rotary energy device is a motor;
the sensor is configured to provide information regarding a position of the rotor in the motor; and
the sensor is mounted to the housing.

5. The axial field rotary energy device of any of these embodiments, wherein the sensor includes a wireless communication circuit.

6. The axial field rotary energy device of any of these embodiments, wherein the sensor is configured to transmit operational data of the axial field rotary energy device to an external device.

7. The axial field rotary energy device of any of these embodiments, wherein the sensor is integrated with the PCB.

8. The axial field rotary energy device of any of these embodiments, wherein the sensor is embedded directly in the coil and is configured to be electrically powered directly by the coil.

9. The axial field rotary energy device of any of these embodiments, wherein the sensor is configured to be powered and connected to the coil through a separate electrical connection that is disposed on or within the PCB.

10. The axial field rotary energy device of any of these embodiments, further comprising a secondary coil integrated with the PCB that is coupled to the sensor.

11 The axial field rotary energy device of any of these embodiments, wherein the secondary coil is configured to utilize magnetic flux developed during operation to provide power for the sensor.

12. An axial field rotary energy device, comprising:
a housing;
a rotor mounted inside the housing, the rotor having an axis of rotation and a magnet;
a stator mounted inside the housing coaxial with the rotor, the stator comprising a printed circuit board (PCB) having a PCB layer with a coil; and
a control circuit mounted within the housing, wherein the control circuit is coupled to the coil and comprises at least one of an input coupled to receive a current flowing through the coil, or an output coupled to provide the current flowing through the coil.

13. The axial field rotary energy device of any of these embodiments, wherein the control circuit is integrated with the PCB.

14. The axial field rotary energy device of any of these embodiments, wherein:
the axial field rotary energy device is a generator; and
the control circuit comprises an input coupled to receive the current flowing through the coil, and further comprises an output coupled to generate an external power source.

15. The axial field rotary energy device of any of these embodiments, wherein:
the axial field rotary energy device is a motor; and
the control circuit comprises an input coupled to receive an external power source, and further comprises an output coupled to provide the current flowing through the coil.

16. The axial field rotary energy device of any of these embodiments, further comprising a sensor integrated within the housing, wherein:
the sensor is configured to provide information regarding a position of the rotor in the motor; and
the sensor is mounted to the housing.

17. An axial field rotary energy device, comprising:
a housing;
a rotor mounted inside the housing, the rotor having an axis of rotation and a magnet;
a stator mounted inside the housing coaxial with the rotor, the stator comprising a printed circuit board (PCB) having a PCB layer with a coil;
a sensor integrated with the PCB; and
a secondary coil disposed on or within the PCB and coupled to the sensor.

18. The axial field rotary energy device of any of these embodiments, wherein the sensor is configured to be powered and connected to the coil through a separate electrical connection that is disposed on or within the PCB; and the sensor is configured to transmit operational data of the axial field rotary energy device to an external device using the secondary coil.

19. The axial field rotary energy device of any of these embodiments, wherein the secondary coil is configured to utilize magnetic flux developed during operation to provide power for the sensor, and wherein the sensor is not otherwise connected to the coil.

20. The axial field rotary energy device of any of these embodiments, wherein:
the sensor comprises at least one of a Hall effect sensor, encoder, optical sensor, thermocouple, accelerometer, gyroscope or vibration sensor; and
the sensor includes a wireless communication circuit.

1. An axial field rotary energy device, comprising:
a rotor comprising an axis of rotation and a plurality of magnets, each magnet extends in a radial direction relative to the axis, and each magnet comprises a magnet radial edge;
a stator coaxial with the rotor, the stator comprises a plurality of printed circuit board (PCB) layers each having a plurality of coils, and each coil comprises a coil radial edge; and
when radial edge portions of the magnets and coils rotationally align relative to the axis, the magnet radial edges and coil radial edges are not parallel and are angularly skewed relative to each other.

2. The axial field rotary energy device of any of these embodiments, wherein the angular skew is at least about 0.1 degrees.

3. The axial field rotary energy device of any of these embodiments, wherein the angular skew is at least about 1 degree.

4. The axial field rotary energy device of any of these embodiments, wherein the angular skew is not greater than about 25 degrees.

5. The axial field rotary energy device of any of these embodiments, wherein the magnet radial edges and coil radial edges are leading radial edges or trailing radial edges of the magnets and coils, respectively.

6. The axial field rotary energy device of any of these embodiments, wherein each of the magnet radial edges and coil radial edges are linear, and no portions of the magnet radial edges and coil radial edges are parallel when the radial edge portions of the magnets and coils rotationally align with respect to the axis.

7. The axial field rotary energy device of any of these embodiments, wherein when the radial edge portions of the magnets and coils rotationally align, at least some portions of the magnet radial edges and coil radial edges are parallel to each other.

8. The axial field rotary energy device of any of these embodiments, wherein the magnet radial edges and coil radial edges are not entirely linear.

9. An axial field rotary energy device, comprising:
a rotor comprising an axis of rotation and magnets, and each magnet has a magnet radial edge;
a stator coaxial with the rotor, the stator comprises a plurality of stator segments coupled together about the axis, each stator segment comprises a printed circuit board (PCB) having a PCB layer comprising a coil, and each coil has a coil radial edge; and
when radial edge portions of the magnets and coils rotationally align relative to the axis, the magnet radial edges and coil radial edges are not parallel and are angularly skewed relative to each other.

10. The axial field rotary energy device of any of these embodiments, wherein the angular skew is at least about 0.1 degrees.

11. The axial field rotary energy device of any of these embodiments, wherein the angular skew is at least about 1 degree.

12. The axial field rotary energy device of any of these embodiments, wherein the angular skew is not greater than about 25 degrees.

13. The axial field rotary energy device of any of these embodiments, wherein said at least portions of the magnet radial edges and coil radial edges are leading radial edges or trailing radial edges of the magnets and coils, respectively.

14. The axial field rotary energy device of any of these embodiments, wherein each of the magnet radial edges and coil radial edges are linear, and no portions of the magnet radial edges and coil radial edges are parallel when said at least portions of the magnets and coils rotationally align.

15. The axial field rotary energy device of any of these embodiments, wherein when said at least portions of the magnets and coils rotationally align, at least portions of the magnet radial edges and coil radial edges are parallel to each other.

16. The axial field rotary energy device of any of these embodiments, wherein the magnet radial edges and coil radial edges are not entirely linear.

17. A module for an axial field rotary energy device, comprising:
a housing configured to mechanically couple the housing to a second housing of a second module, and electrically couple the housing to the second housing;
a rotor rotatably mounted to the housing, the rotor comprises an axis and a magnet, and the magnet has a magnet radial edge;
a stator mounted to the housing coaxially with the rotor, the stator comprises a printed circuit board (PCB) having a PCB layer with a coil, and the coil has a coil radial edge; and
when radial edge portions of the magnet and coil rotationally align relative to the axis, at least radial edge portions of the magnet radial edge and coil radial edge are not parallel and are angularly skewed relative to each other.

18. The axial field rotary energy device of any of these embodiments, wherein the angular skew is at least about 0.1 degrees, and the angular skew is not greater than about 25 degrees.

19. The axial field rotary energy device of any of these embodiments, wherein the magnet radial edge and coil radial edge are a leading radial edge or trailing radial edge of the magnet and coil, respectively.

20. The axial field rotary energy device of any of these embodiments, wherein the magnet radial edge and coil radial edge are linear, and no portions of the magnet radial edge and coil radial edge are parallel when the radial edge portions of the magnet and coil rotationally align.

1. An axial field rotary energy device, comprising:
a housing;
a rotor mounted inside the housing, the rotor having an axis of rotation and a magnet;
a stator mounted inside the housing coaxial with the rotor, the stator comprising a printed circuit board (PCB) having a PCB layer with a trace that is electrically conductive, the trace comprises radial traces that extend in a radial direction relative to the axis and end turn traces that extend between the radial traces, and the trace comprises slits that extends through at least some portions of the trace.

2. The axial field rotary energy device of any of these embodiments, wherein the slits are in only the radial traces.

3. The axial field rotary energy device of any of these embodiments, wherein each of the slits is linear.

4. The axial field rotary energy device of any of these embodiments, wherein each of the slits is only linear, and the slits comprise no non-linear portions.

5. The axial field rotary energy device of any of these embodiments, wherein the trace is tapered in the radial direction relative to the axis.

6. The axial field rotary energy device of any of these embodiments, wherein the trace comprises an outer width that is adjacent an outer diameter of the PCB and in a plane that is perpendicular to the axis, the trace comprises an inner width that is adjacent an inner diameter of the PCB and in the plane, and the outer width is greater than the inner width.

7. The axial field rotary energy device of any of these embodiments, wherein the trace comprises inner and outer opposing edges, and entireties of the inner and outer opposing edges are not parallel to each other.

8. The axial field rotary energy device of any of these embodiments, wherein only the radial traces are tapered.

9. The axial field rotary energy device of any of these embodiments, wherein the trace comprises inner and outer opposing edges that are parallel to each outer.

10. The axial field rotary energy device of any of these embodiments, wherein the end turn traces are tapered.

11. The axial field rotary energy device of any of these embodiments, wherein the PCB layer comprises a PCB layer surface area, the trace on the PCB layer comprises a trace surface area that is in a range of at least about 75% to about 99% of the PCB layer surface area.

12. An axial field rotary energy device, comprising:
a housing;
a rotor mounted inside the housing, the rotor having an axis of rotation and a magnet; and
a stator mounted inside the housing coaxial with the rotor, the stator comprising a printed circuit board (PCB) having a PCB layer with coils, each coil comprises traces, at least some of the traces are tapered with inner and outer opposing edges that are not parallel to each other, and the traces comprise an outer width that is adjacent an outer diameter of the PCB and in a plane that is perpendicular to the axis, the traces comprise an inner width that is adjacent an inner diameter of the PCB and in the plane, and the outer width is greater than an inner width.

13. The axial field rotary energy device of any of these embodiments, the coils comprise slits that extend through at least some portions of the traces.

14. The axial field rotary energy device of any of these embodiments, the traces comprise radial traces that extend in a radial direction relative to the axis and end turn traces that extend between the radial traces.

15. The axial field rotary energy device of any of these embodiments, wherein only the radial traces are tapered.

16. The axial field rotary energy device of any of these embodiments, further comprising slits only in the radial traces.

17. The axial field rotary energy device of any of these embodiments, wherein each of the slits is only linear, and the slits comprise no non-linear portions.

18. An axial field rotary energy device, comprising:
a housing;
a rotor mounted inside the housing, the rotor having an axis of rotation and a magnet; and
a stator mounted inside the housing coaxial with the rotor, the stator comprising a printed circuit board (PCB) having a PCB layer with coils, each coil comprises traces, at least some of the traces are tapered, the traces comprise radial traces that extend in a radial direction relative to the axis and end turn traces that extend between the radial traces, and only the radial traces are tapered.

19. The axial field rotary energy device of any of these embodiments, further comprising linear slits only in the radial traces, the linear slits are only linear, and the linear slits comprise no non-linear portions.

20. The axial field rotary energy device of any of these embodiments, wherein at least some of the tapered radial traces comprise inner and outer opposing edges that are not parallel to each other, the traces comprise an outer width that is adjacent an outer diameter of the PCB and in a plane that is perpendicular to the axis, the traces comprise an inner width that is adjacent an inner diameter of the PCB and in the plane, and the outer width is greater than an inner width.

1. An axial field rotary energy device, comprising:
a housing having an axis with an axial direction;
a stator assembly comprising a plurality of stator panels that are axially-stacked and discrete panels from each other, the stators panels are mechanically and stationarily coupled to the housing, each stator panel comprises a respective printed circuit board (PCB) having a respective plurality of coils that are electrically conductive and interconnected within the respective PCB, wherein the respective PCB is configured so that an electrical current that flows through any one of the respective plurality of coils likewise flows through all of the respective plurality of coils, such that each stator panel consists of a single electrical phase; and
rotors rotatably mounted within the housing on opposite axial ends of the stator assembly, the rotors are mechanically coupled together with a rotor spacer, each rotor comprises magnets, and no rotor is disposed between axially adjacent ones of the stator panels.

2. The device of any of these embodiments, wherein the stator panels are coupled in a substantially axially abutting relationship.

3. The device of any of these embodiments, wherein the stator panels are mechanically coupled directly to each other in an axially abutting relationship.

4. The device of any of these embodiments, wherein the stator panels are rotationally aligned at a single angle with respect to the axis.

5. The device of any of these embodiments, wherein the stator panels are electrically coupled together to form a single electrical circuit for the device.

6. The device of any of these embodiments, wherein no axial spacer is disposed between axially adjacent ones of the stator panels.

7. The device of any of these embodiments, wherein the coils extend in a generally radial direction with respect to the axis, each coil comprises edges that extend in the radial direction, and the coil edges are substantially parallel to each other.

8. The device of any of these embodiments, wherein the stator assembly comprises a plurality of electrical phases, and the stator panels are rotationally offset from each other, relative to the axis, at a desired angle.

9. The device of any of these embodiments, wherein the stator panels are configured to not be electrically coupled together to form a single electrical circuit for the device.

10. The device of any of these embodiments, wherein the stator assembly consists of only three stator panels.

11. The device of any of these embodiments, wherein the rotors consist of only two rotors.

12. The device of any of these embodiments, further comprising:
a respective spacer disposed between axially adjacent ones of the stator panels; and
axial spacers between the stator assembly and the rotors, wherein the axial spacers set axial air gap spacings between the stator assembly and the rotors.

13. The device of any of these embodiments, wherein each respective PCB comprises PCB layers, each coil on a respective stator panel is formed by a single, concentric, electrically-conductive trace on a single PCB layer of the respective PCB, the coils on each PCB layer are rotationally aligned, with respect to the axis, with the coils on other ones of the PCB layers, and each trace is connected serially or in parallel within the respective PCB to other traces on a same PCB layer and on different PCB layers of the respective PCB.

14. An axial field rotary energy device, comprising:
a housing having an axis with an axial direction;
a stator assembly comprising a plurality of single-phase stator panels that are axially-stacked and discrete panels from each other, the stators panels are mechanically and stationarily coupled to the housing, the stator panels are coupled in a substantially axially abutting relationship, each stator panel comprises a respective printed circuit board (PCB) having respective coils that are electrically conductive and serially-connected within the respective PCB; and
each respective PCB comprises PCB layers, each coil on a respective stator panel is formed by a single, concentric, electrically-conductive trace on a single PCB layer of the respective PCB, the coils on each PCB layer are rotationally aligned, with respect to the axis, with the coils on other ones of the PCB layers, and each trace is connected serially within the respective PCB to other traces on a same PCB layer and on different PCB layers of the respective PCB; and
rotors rotatably mounted within the housing on opposite axial ends of the stator assembly, the rotors are mechanically coupled together with a rotor spacer, each rotor comprises magnets, and no rotor is disposed between axially adjacent ones of the stator panels.

15. The device of any of these embodiments, wherein the stator panels are mechanically coupled directly to each other in an axially abutting relationship.

16. The device of any of these embodiments, wherein the stator panels are rotationally aligned at a single angle with respect to the axis, such that the stator panels are electrically coupled together to form a single electrical circuit for the device.

17. The device of any of these embodiments, wherein no axial spacer is disposed between axially adjacent ones of the stator panels.

18. The device of any of these embodiments, wherein the coils extend in a generally radial direction with respect to the axis, each coil comprises edges that extend in the radial direction, and the coil edges are substantially parallel to each other.

19. The device of any of these embodiments, wherein the stator assembly comprises a plurality of electrical phases, the stator panels are rotationally offset from each other, relative to the axis, at a desired angle, and the stator panels are configured to not be electrically coupled together to form a single electrical circuit for the device.

20. The device of any of these embodiments, wherein the stator assembly consists of only three stator panels, the rotors consist of only two rotors; and the device further comprises:
a respective spacer disposed between axially adjacent ones of the stator panels; and
axial spacers between the stator assembly and the rotors, wherein the axial spacers set axial air gap spacings between the stator assembly and the rotors.

1. An axial field rotary energy device, comprising:
a housing having an axis with an axial direction;
a stator assembly mounted to the housing and comprising a plurality of stator panels that are axially-stacked and discrete panels from each other, each stator panel comprises a respective printed circuit board (PCB) having a respective plurality of coils that are electrically conductive and interconnected within the respective PCB, wherein the respective PCB is configured so that an electrical current that flows through any one of the respective plurality of coils likewise flows through all of the respective plurality of coils, such that each stator panel consists of a single electrical phase; and a rotor assembly comprising a plurality of rotors rotatably mounted within the housing on opposite axial ends of the stator assembly, the rotors are mechanically coupled together, each rotor comprises magnets, the magnets comprise leading and trailing edges, and the trailing edge of one magnet and the leading edge of an adjacent magnet are parallel to each other to define a consistent circumferential spacing, relative to the axis, between adjacent ones of the magnets.

2. The device of any of these embodiments, wherein each stator panel comprises two identical, C-shaped PCB segment halves that are electrically coupled together to form a respective one of the stator panels.

3. The device of any of these embodiments, wherein the stator panels axially abut one another and are collectively mechanically coupled to the housing with fasteners in an axial-abutting relationship.

4. The device of any of these embodiments, wherein each stator panel comprises a plurality of perimeter mounting holes that are configured to permit the plurality of stator panels to, relative to the axis, be: (a) rotationally aligned at a single angle with respect to the axis to form a single electrical phase device, or (b) rotationally offset from each other at desired phase angles to form a multi-phase device.

5. The device of any of these embodiments, where each of the magnets is trapezoidal in shape.

6. The device of any of these embodiments, wherein each magnet, relative to the axis, comprises an inner radial edge that is parallel to an outer radial edge thereof.

7. The device of any of these embodiments, wherein the magnets comprise an even number of magnets and, relative to the axis, circumferentially adjacent ones of the magnets comprise opposite magnetic poles and, on opposed rotors, diametrically opposed ones of the magnets comprise opposite magnetic poles.

8. The device of any of these embodiments, wherein each rotor comprises a rotor hub, a magnetic backing is mounted to one axial side of the rotor hub, the magnets are mounted to an opposite axial side of the rotor hub, collectively the magnets define a magnet inner diameter and a magnet outer diameter relative to the axis, the magnetic backing has a backing inner diameter that is less than the magnet inner diameter, and the magnetic backing has a backing outer diameter that is greater than the magnet outer diameter.

9. The device of any of these embodiments, wherein the rotor hub comprises a trapezoidal aperture for each of the magnets, and the magnets are secured to the rotor hub only by magnetic attraction to the magnetic backing.

10. The device of any of these embodiments, wherein the backing outer diameter is flush with an outer perimeter of the rotor hub.

11. The device of any of these embodiments, wherein each stator panel comprises a plurality of cores comprising magnetic material, and each core is located in a center of a respective coil of the stator panel, and the cores are electrically insulated from the coils.

12. The device of any of these embodiments, wherein the cores comprise axial surfaces that are substantially flush with axial surfaces of the stator panel.

13. The device of any of these embodiments, wherein the center of the respective coil comprises a volume located inside an innermost trace of the respective coil.

14. The device of any of these embodiments, wherein the volume is formed during manufacturing of the PCB, such that the cores are included during fabrication of the PCB.

15. The device of any of these embodiments, wherein the volume is removed from the PCB after the PCB is manufactured, such that the cores are added to the PCB after fabrication of the PCB.

16. The device of any of these embodiments, wherein the housing comprises housing shells coupled together, each of the housing shells respectively comprises an internal perimeter having an axial shelf formed therein, and the stator assembly is mechanically coupled to at least one of the axial shelves; and the stator panels comprise outer perimeter edges that contact radial-facing inner surfaces of the housing shells at the internal perimeter.

17. The device of any of these embodiments, wherein the stator assembly comprises three stator panels, each configured to operate with a respective electrical phase, and together configured to operate with a plurality of electrical phases.

18. The device of any of these embodiments, further comprising a control circuit integrated within the housing, the control circuit comprises a circular, donut-like shape that is complementary to a shape of the stator panels to facilitate retention of a form factor of the device.

19. An axial field rotary energy device, comprising:
a housing having an axis with an axial direction;
a stator assembly mounted to the housing and comprising
a plurality of stator panels that are axially-stacked and discrete panels from each other, each stator panel comprises a respective printed circuit board (PCB) having a respective plurality of coils that are electrically conductive and interconnected within the respective PCB, wherein the respective PCB is configured so that an electrical current that flows through any one of the respective plurality of coils likewise flows through all of the respective plurality of coils, such that each stator panel consists of a single electrical phase;
a rotor assembly comprising a plurality of rotors rotatably mounted within the housing on opposite axial ends of the stator assembly, the rotors are mechanically coupled together, each rotor comprises magnets, the magnets comprise leading and trailing edges, and the trailing edge of one magnet and the leading edge of an adjacent magnet are parallel to each other to define a consistent circumferential spacing, relative to the axis, between adjacent ones of the magnets; and
each rotor comprises a rotor hub, a magnetic backing is mounted to one axial side of the rotor hub, the magnets are mounted to an opposite axial side of the rotor hub, collectively the magnets define a magnet inner diameter and a magnet outer diameter relative to the axis, the magnetic backing has a backing inner diameter that is less than the magnet inner diameter, and the magnetic backing has a backing outer diameter that is greater than the magnet outer diameter.

20. An axial field rotary energy device, comprising:
a housing having an axis with an axial direction;
a stator assembly mounted to the housing and comprising
a plurality of stator panels that are axially-stacked and discrete panels from each other, each stator panel comprises a respective printed circuit board (PCB) having a respective plurality of coils that are electrically conductive and interconnected within the respective PCB, wherein the respective PCB is configured so that an electrical current that flows through any one of the respective plurality of coils likewise flows through all of the respective plurality of coils, such that each stator panel consists of a single electrical phase;

each stator panel comprises a plurality of cores comprising magnetic material, and each core is located in a center of a respective coil of the stator panel, and the cores are electrically insulated from the coils; and a rotor assembly comprising a plurality of rotors rotatably mounted within the housing on opposite axial ends of the stator assembly, the rotors are mechanically coupled together, each rotor comprises magnets, the magnets comprise leading and trailing edges, and the trailing edge of one magnet and the leading edge of an adjacent magnet are parallel to each other to define a consistent circumferential spacing, relative to the axis, between adjacent ones of the magnets.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities can be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

A printed circuit board (PCB) is also known as a printed wiring board (PWB), since such a board, as manufactured, usually contains wiring on one or more layers, but no actual circuit elements. Such circuit elements are subsequently attached to such a board. As used herein, no distinction between PCB and PWB is intended. As used herein, a coil on a PCB is an electrically conductive coil. As used herein, a component or object "integrated with" a structure can be disposed on or within the structure. Such a component or object can be mounted, attached to, or added to the structure after the structure itself is manufactured, or the component or object can be embedded within or fabricated with the structure.

Some embodiments described herein utilize one via to couple together two coils. In other embodiments a plurality of vias can be provided instead of a single via to couple together such coils.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any subcombination. Further, references to values stated in ranges include each and every value within that range.

We claim:

1. An axial field rotary energy device, comprising:

a housing having an axis with an axial direction;

a stator assembly mounted to the housing and comprising
a plurality of stator panels that are co-axial, each stator panel comprises a respective printed circuit board (PCB) having a respective plurality of coils that are electrically conductive and interconnected within the respective PCB, wherein each stator panel is configured to be connected to a single electrical phase; and a rotor assembly comprising rotors rotatably mounted within the housing, the rotors are mechanically coupled together, each motor comprises magnets, the magnets comprise leading and trailing edges, and the trailing edge of each magnet and the leading edge of an adjacent magnet are parallel to each other to define a consistent circumferential spacing of the magnets, relative to axis; and wherein each respective PCB comprises PCB layers, each coil on a respective stator panel is formed by a single, concentric, electrically conductive trace on a single PCB layer of the respective PCB, the coils on each PCB layer are rotationally aligned, with respect to the axis, with the coils on other ones of the PCB layers, and each coil is coupled within the respective PCB to other coils on the same PCB layer and to coils on different PCB layers of the respective PCB.

2. The device of claim 1, wherein the stator assembly is configured to be connected to a plurality of electrical phases, and the stator panels are rotationally offset from each other, relative to the axis, at a desired angle.

3. The device of claim 1, wherein the rotors and stator panels are interleaved axially.

4. The device of claim 3, wherein the rotor assembly comprises four rotors interleaved axially with three stator panels.

5. The device of claim 1, wherein each stator panel comprises two identical, C-shaped PCB segment halves that are electrically coupled together to form a respective one of the stator panels.

6. The device of claim 1, wherein the stator panels are axially stacked and collectively mechanically coupled to the housing with fasteners in an axially-abutting relationship.

7. The device of claim 1, wherein each stator panel comprises a plurality of perimeter mounting holes that enable the plurality of stator panels to, relative to the axis, be rotationally offset from each other at desired phase angles as a multi-phase device.

8. The device of claim 1, wherein each rotor comprises a rotor hub, a magnetic backing is mounted to one axial side of the rotor hub, the magnets are mounted to an opposite axial side of the rotor hub, and the magnets are attached to the magnetic backing.

9. The device of claim 8, wherein collectively the magnets define a magnet inner diameter and a magnet outer diameter relative to the axis, the magnet backing has a backing inner diameter that is less than the magnet inner diameter, and the magnetic backing has a backing outer diameter that is greater than the magnet outer diameter.

10. The device of claim 8, wherein the rotor hub comprises a trapezoidal aperture for each of the magnets.

11. The device of claim 1, wherein the housing comprises housing shells that are coupled together, each of the housing shells respectively comprises an internal perimeter having a shelf formed therein, and the stator assembly is mechanically coupled to at least one of the shelves.

12. The device of claim 1, wherein each of the stator panels is configured to operate with a respective electrical phase, and the device is configured to operate with a source having a same number of electrical phases as the device.

13. The device of claim 1, wherein the rotors are mounted on opposite axial ends of the stator assembly.

14. An axial field rotary energy device, comprising:
a housing having an axis with an axial direction, the housing comprises housing shells that are coupled together, and each of the housing shells respectively comprises an internal perimeter having a shelf formed therein;
a stator assembly mounted to the housing and comprising a plurality of stator panels that are co-axial, each stator panel comprises a respective printed circuit board (PCB) having a respective plurality of coils that are electrically conductive and interconnected within the respective PCB, wherein each stator panel is configured to be connected to a single electrical phase;
a rotor assembly comprising rotors rotatably mounted within the housing, the rotors are mechanically coupled together, each motor comprises magnets, the magnets comprise leading and trailing edges, and the trailing edge of each magnet and the leading edge of an adjacent magnet are parallel to each other to define a consistent circumferential spacing of the magnets, relative to axis;
the stator assembly is mechanically coupled to at least one of the shelves; and wherein
each respective PCB comprises PCB layers, each coil on a respective stator panel is formed by a single, concentric, electrically conductive trace on a single PCB layer of the respective PCB, the coils on each PCB layer are rotationally aligned, with respect to the axis, with the coils on other ones of the PCB layers, and each coil is coupled within the respective PCB to other coils on the same PCB layer and to coils on different PCB layers of the respective PCB.

15. The device of claim 14, wherein the stator assembly is configured to be connected to a plurality of electrical phases, and the stator panels are rotationally offset from each other, relative to the axis, at a desired angle.

16. The device of claim 14, wherein the stator panels are axially stacked and collectively mechanically coupled to the housing with fasteners in an axially-abutting relationship.

17. The device of claim 14, wherein each rotor comprises a rotor hub, a magnetic backing is mounted to one axial side of the rotor hub, the magnets are mounted to an opposite axial side of the rotor hub, and the magnets are attached to the magnetic backing.

18. The device of claim 1, wherein each of the stator panels is configured to operate with a respective electrical phase, and the device is configured to operate with a source having a same number of electrical phases as the device.

* * * * *